United States Patent
Guedes-Pinto et al.

(10) Patent No.: US 8,350,432 B2
(45) Date of Patent: Jan. 8, 2013

(54) ELECTRIC MACHINE

(75) Inventors: Paulo Guedes-Pinto, Brea, CA (US);
Daniel M. Saban, Corona, CA (US);
John Stout, Long Beach, CA (US);
Venkateshwaran Krishnan, Seal Beach, CA (US); Dennis Strouse, Orange, CA (US); Alex Ivaschenko, Edison, NJ (US)

(73) Assignee: Direct Drive Systems, Inc., Cerritos, CA (US)

( * ) Notice: Subject to any disclaimer, the term of this patent is extended or adjusted under 35 U.S.C. 154(b) by 546 days.

(21) Appl. No.: 12/496,364

(22) Filed: Jul. 1, 2009

(65) Prior Publication Data
US 2010/0019590 A1   Jan. 28, 2010

Related U.S. Application Data

(60) Provisional application No. 61/084,238, filed on Jul. 28, 2008, provisional application No. 61/096,290, filed on Sep. 11, 2008.

(51) Int. Cl.
*H02K 1/28* (2006.01)
*H02K 5/132* (2006.01)

(52) U.S. Cl. .......... 310/156.28; 310/156.12; 310/87; 310/262

(58) Field of Classification Search .......... 310/156.28, 310/156.01, 156.08, 156.12, 156.29, 156.31, 310/156.74, 156.75, 87
See application file for complete search history.

(56) References Cited

U.S. PATENT DOCUMENTS

| | | | |
|---|---|---|---|
| 1,269,537 A | 6/1918 | Holcombe | |
| 2,742,582 A | 4/1956 | Bahn et al. | |
| 2,761,985 A * | 9/1956 | Schaefer | 310/87 |
| 2,783,393 A | 2/1957 | Lindahl et al. | |
| 2,920,218 A | 1/1960 | Beckwith | |
| 3,439,202 A | 4/1969 | Wanke | |
| 3,751,699 A | 8/1973 | Gleichman | |
| 3,809,934 A | 5/1974 | Baer et al. | |
| 3,933,535 A | 1/1976 | Becker | |
| 3,955,112 A | 5/1976 | Sell | |
| 3,979,619 A | 9/1976 | Whiteley | |
| 3,999,092 A | 12/1976 | Whiteley | |

(Continued)

FOREIGN PATENT DOCUMENTS
DE   29610872   8/1996

(Continued)

OTHER PUBLICATIONS

International Search Report and Written Opinion from the Korean Intellectual Property Office for PCT/US2009/052005; mailed Mar. 12, 2010 (14 pages).

(Continued)

*Primary Examiner* — Burton Mullins
(74) *Attorney, Agent, or Firm* — Fish & Richardson P.C.

(57) ABSTRACT

An electric machine system includes an electric machine and a companion device. The electric machine has a stationary member and a movable member that, by interaction of magnetic fields, at least one of moves relative to the stationary member or generates electricity when moved relative to the stationary member. One of the stationary member and the movable member includes a permanent magnet. The companion device is coupled to the electric machine to communicate mechanical movement with the movable member. In certain instances, the electric machine system has adaptations for operation of the electric machine system subsea and/or in a corrosive environment.

16 Claims, 66 Drawing Sheets

U.S. PATENT DOCUMENTS

| | | | |
|---|---|---|---|
| 4,025,840 A | 5/1977 | Brissey et al. | |
| 4,088,177 A | 5/1978 | Armstrong et al. | |
| 4,100,382 A | 7/1978 | Hollitscher | |
| 4,141,137 A | 2/1979 | De Wolf et al. | |
| 4,150,312 A | 4/1979 | Armstrong et al. | |
| 4,233,960 A | 11/1980 | Johnson | |
| 4,259,026 A | 3/1981 | Hanaoka et al. | |
| 4,262,226 A * | 4/1981 | Erickson | 310/87 |
| 4,308,479 A | 12/1981 | Richter | |
| 4,348,604 A | 9/1982 | Thode | |
| 4,361,791 A | 11/1982 | Plunkett | |
| 4,371,799 A | 2/1983 | De Wolf et al. | |
| 4,371,801 A | 2/1983 | Richter | |
| 4,388,545 A | 6/1983 | Honsinger et al. | |
| 4,405,873 A | 9/1983 | Nondahl | |
| 4,417,168 A | 11/1983 | Miller et al. | |
| 4,433,261 A * | 2/1984 | Nashiki et al. | 310/156.28 |
| 4,443,723 A | 4/1984 | Ohkubo | |
| 4,443,934 A | 4/1984 | Hickey | |
| 4,460,834 A | 7/1984 | Gottfried | |
| 4,464,596 A | 8/1984 | Miller et al. | |
| 4,469,970 A | 9/1984 | Neumann | |
| 4,472,651 A | 9/1984 | Jones | |
| 4,476,408 A | 10/1984 | Honsinger | |
| 4,480,207 A | 10/1984 | Miller et al. | |
| 4,486,679 A | 12/1984 | Jones | |
| 4,506,181 A | 3/1985 | Jones et al. | |
| 4,510,680 A | 4/1985 | Miller et al. | |
| 4,525,925 A | 7/1985 | Jones | |
| 4,544,855 A | 10/1985 | Prenner et al. | |
| 4,570,333 A | 2/1986 | Jones | |
| 4,578,610 A | 3/1986 | Kliman et al. | |
| 4,633,113 A * | 12/1986 | Patel | 310/156.28 |
| 4,649,331 A | 3/1987 | Jahns | |
| 4,678,954 A | 7/1987 | Takeda et al. | |
| 4,723,188 A | 2/1988 | McMurray | |
| 4,759,116 A | 7/1988 | Jones | |
| 4,811,375 A | 3/1989 | Klostermann | |
| 4,814,677 A | 3/1989 | Plunkett | |
| 4,857,755 A | 8/1989 | Comstock | |
| 4,862,009 A | 8/1989 | King | |
| 4,872,307 A | 10/1989 | Nakhamkin | |
| 4,888,749 A | 12/1989 | Schwartz et al. | |
| 4,893,040 A | 1/1990 | Turner et al. | |
| 4,912,618 A | 3/1990 | Krinickas | |
| 4,916,346 A | 4/1990 | Kliman | |
| 4,918,831 A | 4/1990 | Kliman | |
| 4,920,293 A | 4/1990 | Kanda | |
| 4,928,553 A | 5/1990 | Wagner | |
| 4,936,098 A | 6/1990 | Nakhamkin | |
| 4,952,852 A | 8/1990 | Bando et al. | |
| 5,017,087 A | 5/1991 | Sneddon | |
| 5,031,746 A | 7/1991 | Koivunen | |
| 5,040,286 A | 8/1991 | Stark | |
| 5,055,764 A | 10/1991 | Rozman et al. | |
| 5,057,697 A | 10/1991 | Hammond et al. | |
| 5,081,368 A | 1/1992 | West | |
| 5,083,905 A | 1/1992 | Mohn | |
| 5,122,704 A * | 6/1992 | Blakeley et al. | 310/54 |
| 5,137,286 A | 8/1992 | Whitford | |
| 5,142,180 A | 8/1992 | Moore et al. | |
| 5,144,735 A | 9/1992 | Stark | |
| 5,152,679 A | 10/1992 | Kanemitsu et al. | |
| 5,175,461 A | 12/1992 | Zigler et al. | |
| 5,179,308 A | 1/1993 | Malsky | |
| 5,216,308 A | 6/1993 | Meeks | |
| 5,225,712 A | 7/1993 | Erdman | |
| 5,229,650 A | 7/1993 | Kita et al. | |
| 5,237,737 A | 8/1993 | Zigler et al. | |
| 5,250,867 A | 10/1993 | Gizaw | |
| 5,257,872 A | 11/1993 | Morgen et al. | |
| 5,280,766 A | 1/1994 | Mohn | |
| 5,283,471 A | 2/1994 | Raad | |
| 5,285,699 A | 2/1994 | Walls et al. | |
| 5,288,447 A | 2/1994 | Day | |
| 5,309,081 A | 5/1994 | Shah et al. | |
| 5,327,069 A | 7/1994 | Radun et al. | |
| 5,345,129 A | 9/1994 | Molnar | |
| 5,345,130 A | 9/1994 | Kliman et al. | |
| 5,345,669 A | 9/1994 | Zigler et al. | |
| 5,348,451 A | 9/1994 | Mohn | |
| 5,379,589 A | 1/1995 | Cohn et al. | |
| 5,398,571 A | 3/1995 | Lewis | |
| 5,417,544 A | 5/1995 | Mohn | |
| 5,434,454 A | 7/1995 | Farkas | |
| 5,485,045 A | 1/1996 | Canders et al. | |
| 5,491,969 A | 2/1996 | Cohn et al. | |
| 5,537,822 A | 7/1996 | Shnaid et al. | |
| 5,548,172 A | 8/1996 | Kliman et al. | |
| 5,552,640 A | 9/1996 | Sutton et al. | |
| 5,563,463 A | 10/1996 | Stark | |
| 5,602,462 A | 2/1997 | Stich et al. | |
| 5,602,957 A | 2/1997 | Wille et al. | |
| 5,604,654 A | 2/1997 | Wille et al. | |
| 5,605,193 A * | 2/1997 | Bearden et al. | 166/370 |
| 5,610,456 A | 3/1997 | Wille et al. | |
| 5,611,516 A | 3/1997 | Reinicke et al. | |
| 5,627,744 A | 5/1997 | Baker et al. | |
| 5,637,036 A | 6/1997 | Hepworth | |
| 5,637,049 A | 6/1997 | Zentmyer et al. | |
| 5,640,064 A | 6/1997 | Boyd et al. | |
| 5,646,458 A | 7/1997 | Bowyer et al. | |
| 5,668,429 A | 9/1997 | Boyd et al. | |
| 5,670,838 A | 9/1997 | Everton | |
| 5,689,174 A | 11/1997 | Pacheco | |
| 5,694,026 A | 12/1997 | Blanchet | |
| 5,729,118 A | 3/1998 | Yanagisawa et al. | |
| 5,744,887 A | 4/1998 | Itoh | |
| 5,759,126 A | 6/1998 | Zentmyer et al. | |
| 5,759,129 A | 6/1998 | Zentmyer et al. | |
| 5,767,591 A | 6/1998 | Pinkerton | |
| 5,769,069 A | 6/1998 | Caffell | |
| 5,774,976 A | 7/1998 | Stark | |
| 5,783,932 A | 7/1998 | Namba et al. | |
| 5,795,135 A | 8/1998 | Nyilas et al. | |
| 5,796,194 A | 8/1998 | Archer et al. | |
| 5,801,470 A | 9/1998 | Johnson et al. | |
| 5,811,960 A | 9/1998 | Van Sickle et al. | |
| 5,816,971 A | 10/1998 | Zentmyer et al. | |
| 5,821,630 A | 10/1998 | Schutten | |
| 5,845,479 A | 12/1998 | Nakhamkin et al. | |
| 5,852,338 A | 12/1998 | Boyd et al. | |
| 5,856,709 A | 1/1999 | Ibaraki et al. | |
| 5,859,513 A | 1/1999 | Stephens et al. | |
| 5,880,533 A | 3/1999 | Arai et al. | |
| 5,881,447 A | 3/1999 | Molnar | |
| 5,881,448 A | 3/1999 | Molnar | |
| 5,889,659 A | 3/1999 | Emmerich | |
| 5,894,182 A | 4/1999 | Saban et al. | |
| 5,911,453 A | 6/1999 | Boyd, Jr. et al. | |
| 5,918,360 A | 7/1999 | Forbes et al. | |
| 5,923,111 A * | 7/1999 | Eno et al. | 310/156.25 |
| 5,929,538 A | 7/1999 | O'Sullivan et al. | |
| 5,934,063 A | 8/1999 | Nakhamkin | |
| 5,949,173 A | 9/1999 | Wille et al. | |
| 5,952,757 A | 9/1999 | Boyd, Jr. | |
| 5,982,045 A | 11/1999 | Tabata et al. | |
| 5,984,173 A | 11/1999 | Edwards | |
| 5,986,419 A | 11/1999 | Archer et al. | |
| 5,990,588 A | 11/1999 | Kliman et al. | |
| 5,994,794 A | 11/1999 | Wehrlen | |
| 6,002,191 A | 12/1999 | Saban | |
| 6,011,324 A | 1/2000 | Kohlstruck et al. | |
| 6,018,198 A | 1/2000 | Tsuzuki et al. | |
| 6,018,207 A | 1/2000 | Saban et al. | |
| 6,020,657 A | 2/2000 | Liran | |
| 6,023,152 A | 2/2000 | Briest et al. | |
| 6,025,666 A | 2/2000 | Kliman | |
| 6,029,336 A | 2/2000 | Kliman et al. | |
| 6,046,554 A | 4/2000 | Becerra | |
| 6,047,461 A | 4/2000 | Miura et al. | |
| 6,059,539 A | 5/2000 | Nyilas et al. | |
| 6,084,330 A | 7/2000 | Fisher et al. | |
| 6,088,905 A | 7/2000 | Boyd et al. | |
| 6,098,584 A | 8/2000 | Ahner et al. | |
| 6,098,735 A | 8/2000 | Sadarangani et al. | |
| 6,104,113 A | 8/2000 | Beifus | |

| | | | | | | |
|---|---|---|---|---|---|---|
| 6,107,693 | A | 8/2000 | Mongia et al. | 6,967,461 B1 | 11/2005 | Markunas et al. |
| 6,108,206 | A | 8/2000 | Criniti et al. | 6,969,922 B1 | 11/2005 | Welches et al. |
| 6,120,620 | A | 9/2000 | Benz et al. | 6,991,362 B1 | 1/2006 | Seaman |
| 6,133,716 | A | 10/2000 | Schutten | 6,998,724 B2 | 2/2006 | Johansen et al. |
| 6,140,719 | A | 10/2000 | Kalsi | 7,023,309 B2 | 4/2006 | Laskaris et al. |
| 6,160,722 | A | 12/2000 | Thommes et al. | 7,042,108 B2 | 5/2006 | Farkas |
| 6,169,390 | B1 | 1/2001 | Jungreis | 7,053,743 B2 | 5/2006 | Laskaris et al. |
| 6,175,163 | B1 | 1/2001 | Rinaldi et al. | 7,071,581 B2 | 7/2006 | Eisenhaure et al. |
| 6,175,217 | B1 | 1/2001 | Da Ponte et al. | 7,075,204 B2 * | 7/2006 | Shiao et al. ............. 310/156.22 |
| 6,175,495 | B1 | 1/2001 | Batchelder | 7,075,399 B2 | 7/2006 | Saban et al. |
| 6,184,593 | B1 | 2/2001 | Jungreis | 7,093,661 B2 | 8/2006 | Olsen |
| 6,192,687 | B1 | 2/2001 | Pinkerton et al. | 7,105,964 B2 | 9/2006 | Miyazaki et al. |
| 6,198,176 | B1 | 3/2001 | Gillette | 7,108,095 B1 | 9/2006 | Washington et al. |
| 6,198,803 | B1 | 3/2001 | Osama et al. | 7,119,641 B2 | 10/2006 | Petrov et al. |
| 6,204,572 | B1 | 3/2001 | Liran | 7,129,593 B2 | 10/2006 | King et al. |
| 6,219,623 | B1 | 4/2001 | Wills | 7,137,450 B2 | 11/2006 | Johansen et al. |
| 6,223,417 | B1 | 5/2001 | Saban et al. | 7,148,689 B2 | 12/2006 | Huang et al. |
| 6,232,671 | B1 | 5/2001 | Gottfried, Jr. | 7,156,183 B2 | 1/2007 | Williams |
| 6,239,513 | B1 | 5/2001 | Dean et al. | 7,156,627 B2 | 1/2007 | Lenderink et al. |
| 6,241,486 | B1 | 6/2001 | Sloteman | 7,208,854 B2 | 4/2007 | Saban et al. |
| 6,255,743 | B1 | 7/2001 | Pinkerton et al. | 7,218,195 B2 | 5/2007 | Laskaris et al. |
| 6,261,455 | B1 | 7/2001 | Brown et al. | 7,226,277 B2 * | 6/2007 | Dooley ........................ 417/356 |
| 6,278,194 | B1 | 8/2001 | Nakagawa et al. | 7,228,615 B2 | 6/2007 | Nilson |
| 6,281,595 | B1 | 8/2001 | Sinha et al. | 7,228,616 B2 | 6/2007 | Stephens |
| 6,288,456 | B1 | 9/2001 | Cratty | 7,230,344 B2 | 6/2007 | Pollack et al. |
| 6,296,765 | B1 | 10/2001 | Brown et al. | 7,256,526 B1 | 8/2007 | Perkins et al. |
| 6,320,279 | B1 | 11/2001 | López Jimenez | 7,287,595 B2 | 10/2007 | Johansen et al. |
| 6,321,539 | B1 | 11/2001 | Bronicki et al. | 7,313,840 B2 | 1/2008 | Watkins |
| 6,324,494 | B1 | 11/2001 | Saban | 7,345,560 B2 | 3/2008 | Laskaris et al. |
| 6,365,983 | B1 | 4/2002 | Masberg et al. | 7,358,620 B2 | 4/2008 | Melfi |
| 6,376,958 | B1 | 4/2002 | Koharagi et al. | 7,400,052 B1 | 7/2008 | Badger |
| 6,388,356 | B1 | 5/2002 | Saban | 7,407,371 B2 | 8/2008 | Leone et al. |
| 6,397,946 | B1 | 6/2002 | Vail, III | 7,417,343 B2 | 8/2008 | Lindberg et al. |
| 6,404,655 | B1 | 6/2002 | Welches | 7,423,431 B2 | 9/2008 | Amm et al. |
| 6,411,002 | B1 | 6/2002 | Smith et al. | 7,438,538 B2 | 10/2008 | Dooley |
| 6,437,533 | B1 | 8/2002 | Du et al. | 7,471,009 B2 | 12/2008 | Davis et al. |
| 6,445,079 | B1 | 9/2002 | Gale et al. | 7,521,835 B2 | 4/2009 | Qu et al. |
| 6,462,976 | B1 | 10/2002 | Olejniczak et al. | 7,541,705 B2 | 6/2009 | Shah et al. |
| 6,463,738 | B1 | 10/2002 | Pinkerton et al. | 7,568,896 B2 | 8/2009 | Dooley |
| 6,488,401 | B1 | 12/2002 | Seaman | 7,573,144 B1 | 8/2009 | Saban et al. |
| 6,494,042 | B2 | 12/2002 | Bronicki | 7,573,168 B2 | 8/2009 | Carl, Jr. et al. |
| 6,504,337 | B1 | 1/2003 | Saban et al. | RE41,627 E * | 9/2010 | Bevington ........................ 310/87 |
| 6,507,128 | B2 | 1/2003 | King et al. | 7,791,237 B2 | 9/2010 | Shah et al. |
| 6,518,867 | B2 | 2/2003 | Laskaris et al. | 7,834,504 B2 * | 11/2010 | Shibui et al. ............. 310/156.28 |
| 6,525,634 | B2 | 2/2003 | Laskaris et al. | 7,839,040 B2 | 11/2010 | Hayasaka et al. |
| 6,557,642 | B2 | 5/2003 | Head | 2001/0054748 A1 | 12/2001 | Wikborg et al. |
| 6,559,559 | B2 | 5/2003 | Cratty | 2002/0171526 A1 | 11/2002 | Laskaris et al. |
| 6,563,153 | B2 | 5/2003 | Wikborg et al. | 2002/0180573 A1 | 12/2002 | Laskaris et al. |
| 6,563,229 | B2 | 5/2003 | Farkas | 2003/0070729 A1 | 4/2003 | Carl et al. |
| 6,573,626 | B1 | 6/2003 | Gosebruch et al. | 2003/0074165 A1 | 4/2003 | Saban et al. |
| 6,596,096 | B2 | 7/2003 | Carl et al. | 2003/0077191 A1 | 4/2003 | Knoll et al. |
| 6,614,132 | B2 | 9/2003 | Hockney et al. | 2003/0085787 A1 | 5/2003 | Laskaris et al. |
| 6,624,542 | B1 | 9/2003 | Gabrys et al. | 2003/0090354 A1 | 5/2003 | Laskaris et al. |
| 6,628,012 | B2 | 9/2003 | Reuter | 2004/0021396 A1 | 2/2004 | Ehrhart et al. |
| 6,655,830 | B1 | 12/2003 | Seaman | 2004/0051416 A1 | 3/2004 | Yamada et al. |
| 6,657,321 | B2 | 12/2003 | Sinha | 2004/0074083 A1 | 4/2004 | Laskaris et al. |
| 6,662,434 | B2 | 12/2003 | Laskaris et al. | 2004/0119473 A1 | 6/2004 | Askel et al. |
| 6,700,214 | B2 | 3/2004 | Ulinski et al. | 2004/0135655 A1 | 7/2004 | Petrov et al. |
| 6,700,233 | B2 | 3/2004 | Cordiale | 2004/0189429 A1 | 9/2004 | Saban et al. |
| 6,707,169 | B2 | 3/2004 | Shimizu et al. | 2005/0062572 A1 | 3/2005 | Marte et al. |
| 6,710,579 | B2 | 3/2004 | Ebel et al. | 2005/0068138 A1 | 3/2005 | Amm et al. |
| 6,727,600 | B1 | 4/2004 | Abdurachmanov | 2005/0068140 A1 | 3/2005 | Huang et al. |
| 6,737,762 | B2 | 5/2004 | Koenig | 2005/0073383 A1 | 4/2005 | Laskaris et al. |
| 6,744,240 | B2 | 6/2004 | Koelle et al. | 2006/0043811 A1 | 3/2006 | Ong et al. |
| 6,748,977 | B2 | 6/2004 | Berto | 2007/0018516 A1 | 1/2007 | Pal et al. |
| 6,751,842 | B2 | 6/2004 | Roesel et al. | 2007/0046115 A1 * | 3/2007 | Tetzlaff et al. ................... 310/71 |
| 6,753,619 | B2 | 6/2004 | Stevenson et al. | 2007/0090711 A1 | 4/2007 | Carl, Jr. et al. |
| 6,777,847 | B1 | 8/2004 | Saban et al. | 2007/0228845 A1 | 10/2007 | Yamashita |
| 6,787,931 | B2 | 9/2004 | Nakagawa et al. | 2007/0241699 A1 | 10/2007 | Osada et al. |
| 6,813,328 | B2 | 11/2004 | Kitch et al. | 2007/0273225 A1 * | 11/2007 | Head ................................ 310/87 |
| 6,825,666 | B2 | 11/2004 | Askel et al. | 2008/0054736 A1 | 3/2008 | Miyata et al. |
| 6,831,384 | B2 | 12/2004 | Ries et al. | 2008/0103632 A1 | 5/2008 | Saban et al. |
| 6,841,912 | B2 | 1/2005 | Yamada et al. | 2008/0129422 A1 | 6/2008 | Alford et al. |
| 6,844,706 | B2 | 1/2005 | Pinkerton, III et al. | 2008/0157622 A1 | 7/2008 | Shah et al. |
| 6,868,906 | B1 | 3/2005 | Vail, III et al. | 2008/0224551 A1 | 9/2008 | Saban et al. |
| 6,879,053 | B1 | 4/2005 | Welches et al. | 2008/0238217 A1 | 10/2008 | Shah et al. |
| 6,883,328 | B2 | 4/2005 | Bronicki | 2008/0238220 A1 | 10/2008 | El-Rafaie et al. |
| 6,934,666 | B2 | 8/2005 | Saban et al. | 2008/0238233 A1 | 10/2008 | El-Rafai et al. |
| 6,963,151 | B2 * | 11/2005 | Van Dine ........................ 310/87 | 2008/0238234 A1 | 10/2008 | Saban et al. |

| | | | |
|---|---|---|---|
| 2009/0009012 | A1 | 1/2009 | Stephens et al. |
| 2009/0189477 | A1 | 7/2009 | Yamamoto |
| 2009/0200809 | A1 | 8/2009 | Saban et al. |
| 2009/0218977 | A1 | 9/2009 | Pan et al. |
| 2009/0232664 | A1 | 9/2009 | Qu et al. |

FOREIGN PATENT DOCUMENTS

| | | | |
|---|---|---|---|
| EP | 0212552 | | 3/1987 |
| EP | 1 392 981 | | 7/2008 |
| EP | 1392981 | | 7/2008 |
| GB | 2271672 | | 4/1994 |
| GB | 2323217 | | 9/1998 |
| JP | 61001246 | | 1/1986 |
| JP | 03011948 | | 1/1991 |
| JP | 04-17545 | * | 1/1992 |
| JP | 06-090538 | | 3/1994 |
| JP | 06-205555 | | 7/1994 |
| JP | 07-231591 | | 8/1995 |
| JP | 61-094550 | | 5/1996 |
| JP | 9019093 | | 1/1997 |
| JP | 09-200984 | | 7/1997 |
| JP | 2001-211584 | | 8/2001 |
| JP | 2002-315246 | | 10/2002 |
| JP | 2007-282412 | | 10/2007 |
| JP | 2007-325358 | | 12/2007 |
| KR | 10-1988-0014715 | | 12/1988 |
| KR | 10-0673925 | | 1/2007 |
| WO | WO02056442 A2 | | 7/2002 |
| WO | WO2007/141907 | | 12/2007 |
| WO | 2008/012637 | | 1/2008 |

OTHER PUBLICATIONS

International Search Report and Written Opinion from the Korean Intellectual Property Office for PCT/US2009/052011; mailed Mar. 15, 2010 (14 pages).
International Search Report and Written Opinion from the Korean Intellectual Property Office for PCT/US2009/052012; mailed Mar. 8, 2010 (13 pages).
International Search Report and Written Opinion from the Korean Intellectual Property Office for PCT/US2009/052007; mailed Mar. 2, 2010 (13 pages).
Direct Drive Systems, High Speed, High Power Permanent Magnet Motors & Generators, publicly available on or about Aug. 24, 2007 (4 pages).
U.S. Appl. No. 12/496,452, filed Jul. 1, 2009 and entitled *Slot Configuration of an Electric Machine*.
U.S. Appl. No. 12/496,519, filed Jul. 1, 2009 entitled *Hybrid Winding Configuration of an Electric Machine*.
U.S. Appl. No. 12/496,488, filed Jul. 1, 2009 and entitled *End Turn Configuration of an Electric Machine*.
U.S. Appl. No. 12/496,414, filed Jul. 1, 2009 and entitled *Stator for an Electric Machine*.
U.S. Appl. No. 12/496,619, filed Jul. 1, 2009 and entitled *Rotor for an Electric Machine*.
U.S. Appl. No. 12/496,552, filed Jul. 1, 2009 and entitled *Rotor for an Electric Machine*.
U.S. Appl. No. 12/496,621, filed Jul. 1, 2009 and entitled *Rotor for an Electric Machine*.
U.S. Appl. No. 12/496,581, filed Jul. 1, 2009 and entitled *Rotor for an Machine Having a Sleeve With Segmented Layers*.
U.S. Appl. No. 12/496,614, filed Jul. 1, 2009 and entitled *Thermally Matched Composite Sleeve*.
U.S. Appl. No. 12/496,662, filed Jul. 1, 2009 and entitled *Rotor for Electric Machine Having a Sleeve With Segmented Layers*.
U.S. Appl. No. 12/496,458, filed Jul. 1, 2009 and entitled *Stator Wedge for an Electric Machine*.
U.S. Appl. No. 12/496,495, filed Jul. 1, 2009 and entitled *Wrapped Rotor Sleeve for an Electric Machine*.
Weeber, K.; Stephens, C; Vandam, J.; Yagielski, J; Gravame, A.; Messervey, D.; *High-Speed Permanent-Magnet Motors for the Oil & Gas Industry*, Proceedings of GT 2007 ASME Turbo Expo 2007: Power for Land, Sea and Air, May 14-17, 2007, Montreal Canada; 2007 Copyright by ASME. (10 pages).
Davey, K.R.; Herbst, J.D.; Bravo, J.; Ricket, R.; Gamble, B., *High Speed Generator Trade Study*, Electric Machine Technology Symposium 2006 (EMTS 2006), Philadelphia, Pennsylvania, May 22-24, 2006 (8 pages).
Bailey, Cassandra (IEEE); Saban, Daniel (Senior Member IEEE), Guedes-Pinto, Paulo (Member IEEE); *Design of High-Speed Direct-Connected Permanent-Magnet Motors and Generators for the Petrochemical Industry*, IEEE Transactions on Industry Applications, vol. 45, No. 3, May/Jun. 2009 (pp. 1159-1165). (7 pages).
Saban, Daniel; Bailey, Cassandra; Gonzalez-Lopez, Delvis; Luca, Ladislau, *Experimental Evaluation of a High-Speed Permanent Magnet Machine*, IEEE Paper No. PCIC-( ), 2008 (Publication Date and Reference Obtained Online At http://www.directdrivesystems.net/tech-papers.asp). (9 pages).
Saban, Daniel; Artinian, Herman; *Permanent-Magnet Motors for Sub-Sea Applications*, 2008 (Publication Date and Reference Obtained Online At http://www.directdrivesystems.net/tech-papers.asp). (8 pages).
Pan, Zhiguo "Zach"; Ahmad, Raed; Saban, Daniel M., *Space-Shifted Split-Phase High-Speed Motor/Converter Topology With Fault-Tolerance Capability*; IEEE, 2008. (7 pages).
Saban, Daniel; Lipo, Thomas A.; *Hybrid Approach for Determining Eddy-Current Losses in High-Speed PM Rotors*, IEEE Xplore, 2007 (pp. 658-661). (4 pages).
Ahmad, Raed a.; Pan, Zhiguo "Zach"; Saban, Dan M.; *On-Board Electrical Network Topology Using High Speed Permanent Magnet Generators*, IEEE 2007 (pp. 356-362). (7 pages).
Millward, Brian; *Practical Challenges of Manufacturing A 2500 kW Subsea Motor*; Hayward Tyler Engineered Products, 2007. (15 pages).
Saban, Daniel; *Eddy-Current Losses in the Sleeves of High-Speed Synchronous Permanent-Magnet Machines*, Dissertation submitted in partial fulfillment of requirements for degree of Doctor of Philosophy (Electrical Engineering), University of Wisconsin-Madison 2006. (234 pages).
Bailey, Cassandra; Saban, Daniel M.; Guedes-Pinto, Paulo; *Design of High-Speed, Direct-Connected, Permanent-Magnet Motors and Generators for the Petrochemical Industry*, IEEE Paper No. PCIC-2007-26, 2007. (5 pages).
Van der Veen, J.L.F.; Offringa, L.J.J.; Vandenput, A.J.A, *Minimising Roter Losses in High-Speed High-Power Permanent Magnet Synchronous Generators With Rectifier Load*, IEEE Proc.-Electr. Power Appl., vol. 144, No. 5, Sep. 1997 (pp. 331-33). (7 pages).
Littlefield, Andrew; Hyland, Edward; *Prestressed Carbon Fiber Composite Overwrapped Gun Tube*, US Army RDECOM-ARDEC Benet Laboratories, Nov. 2006 (Publication Date Obtained online at <http://www.stormingmedia.us/56/5601/A560184.html>. (7 pages).
International Preliminary Report on Patentability issued in International Application No. PCT/US2009/052005 on Dec. 23, 2010; 8 pages.
Notice of Allowance issued in U.S. Appl. No. 12/496,581 on Dec. 23, 2011.
Office Action issued in U.S. Appl. No. 12/496,614 on Feb. 22, 2012; 9 pages.
Office Action issued in U.S. Appl. No. 12/496,495 on Dec. 19, 2011; 8 pages.
European Search Report issued in EP Application No. 09803505.8 on Nov. 9, 2012, 3 pages.
European Search Report issued in EP Application No. 11169229.9 on Nov. 9, 2012, 3 pages.
European Search Report issued in EP Application No. 11169242.2 on Nov. 9, 2012, 9 pages.
European Search Report issued in EP Application No. 11169245.5 on Nov. 9, 2012, 9 pages.
European Search Report issued in EP Application No. 11169248.9 on Nov. 9, 2012, 3 pages.

* cited by examiner

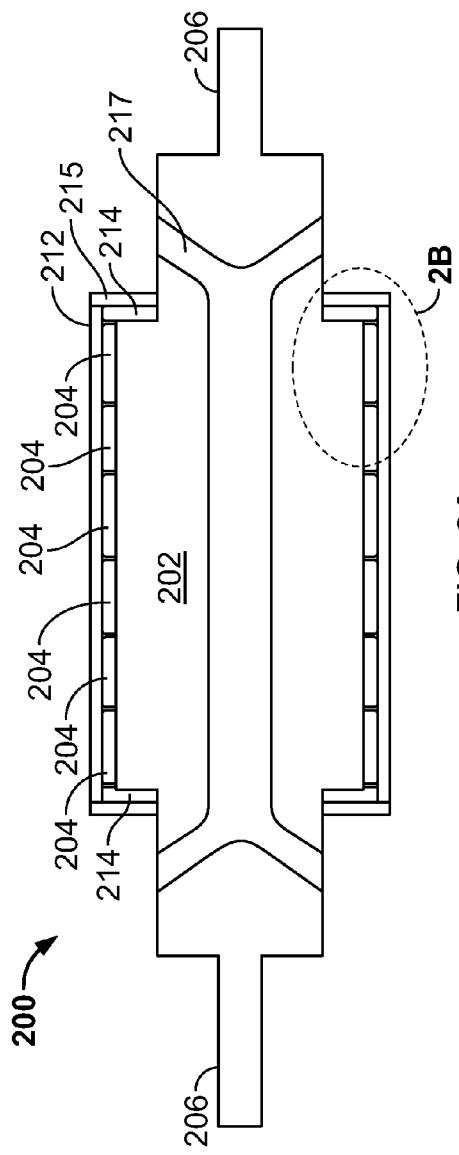
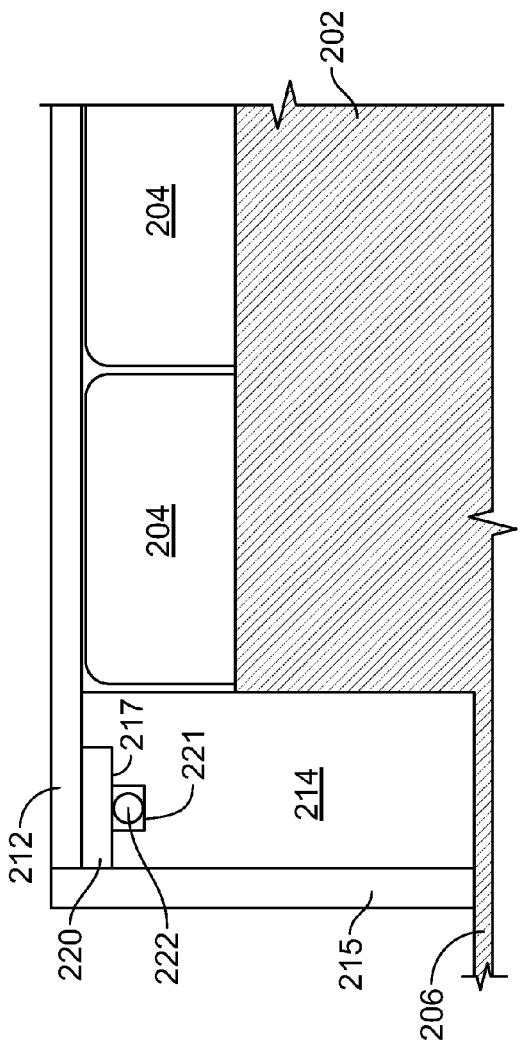
FIG. 2A
FIG. 2B

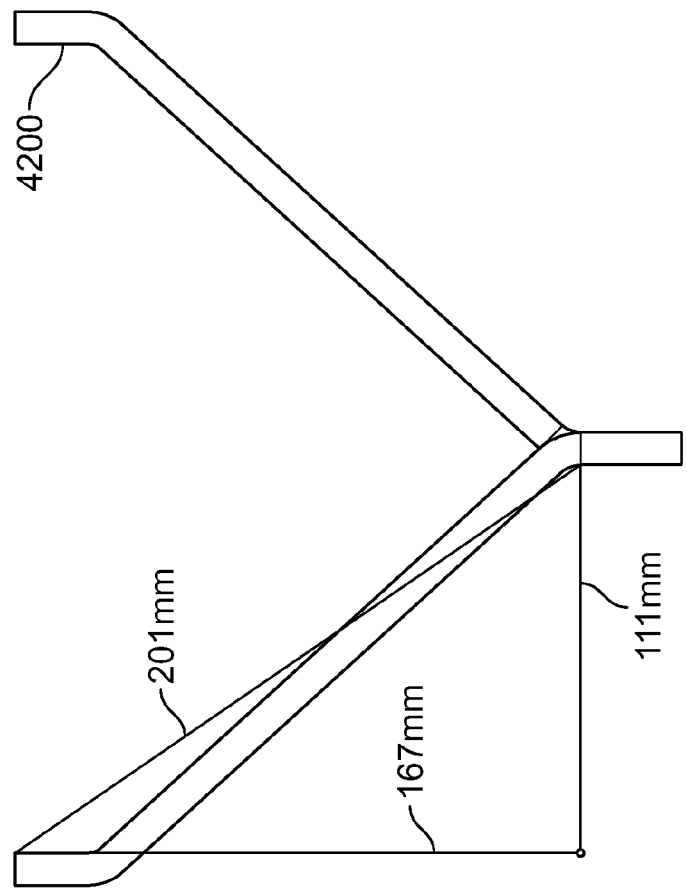
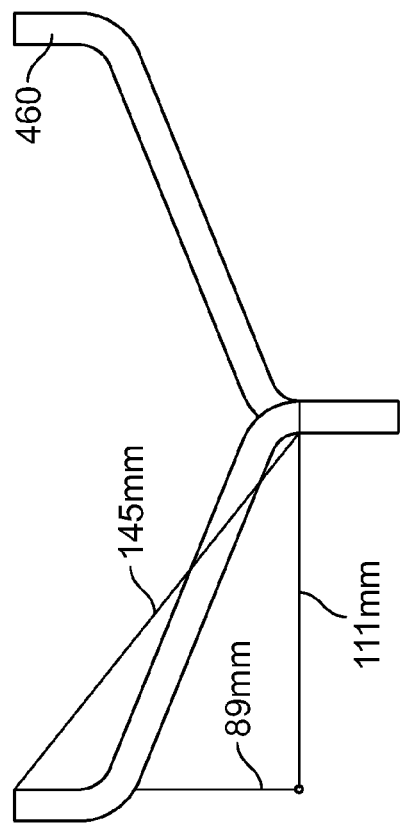
FIG. 4L

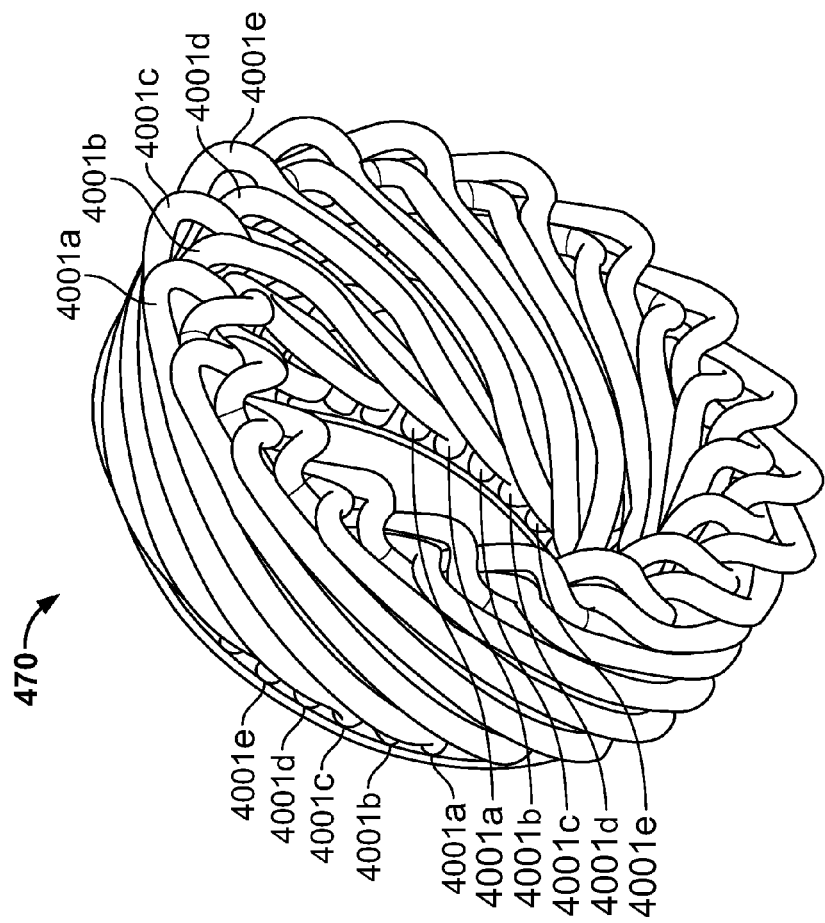
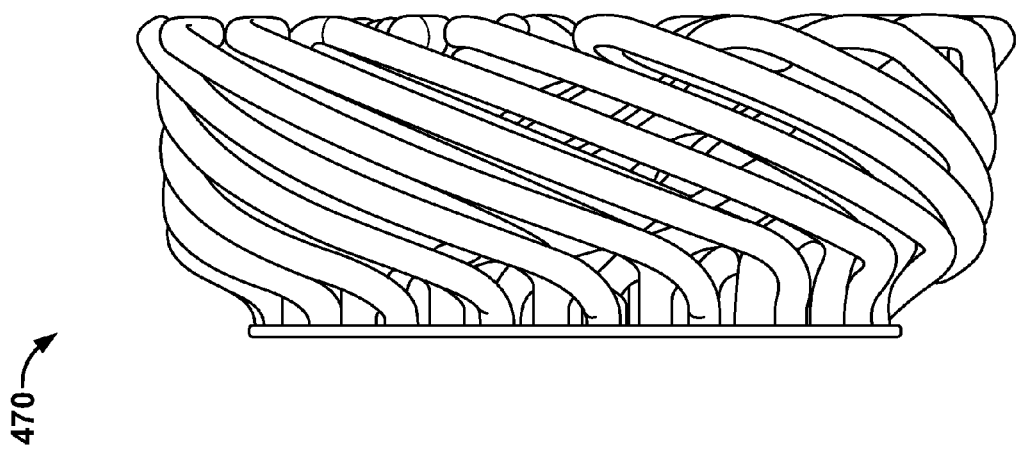
FIG. 4Q
FIG. 4P

Hybrid Winding Wiring Diagram Showing Connections for One Phase "1-1-1" Concentric Coils Hybrid Winding Wiring Diagram
Showing Connections for One Phase
"2-1-1" Concentric Coils Hybrid Winding Wiring Diagram
Showing Connections for One Phase
"2-1-0" Concentric Coils

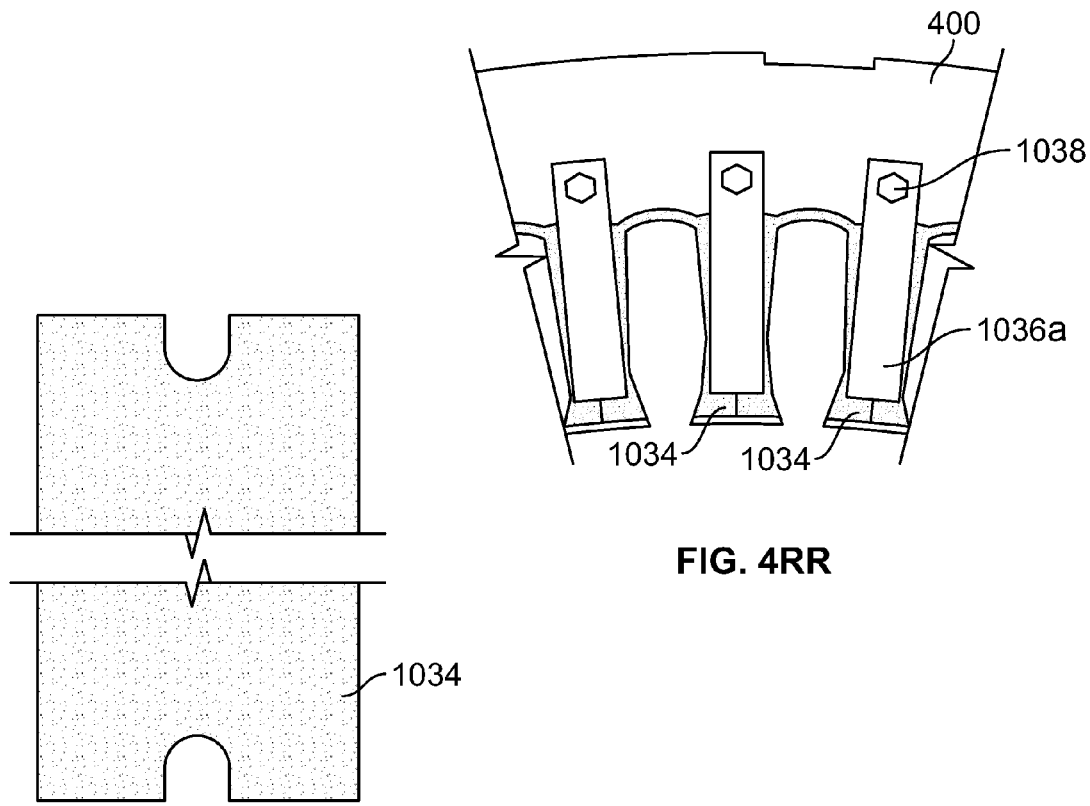
FIG. 4RR
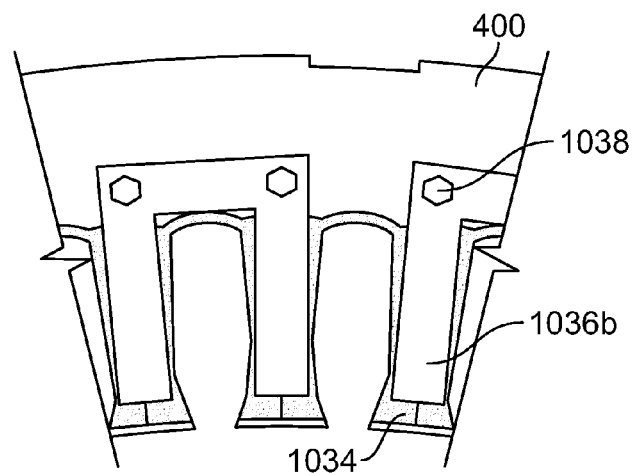
FIG. 4QQ
FIG. 4SS

ELECTRIC MACHINE

CROSS-REFERENCE TO RELATED APPLICATIONS

This application claims the benefit of U.S. Provision Application No. 61/084,238, filed Jul. 28, 2008 and U.S. Provisional Application No. 61/096,290, filed Sep. 11, 2008, the entire disclosures of which are incorporated by reference herein.

BACKGROUND

Some electric machines operate to convert mechanical movement (e.g., kinetic energy) into electrical power, convert electrical power into mechanical movement, or both. For example, an electric machine system that operates to convert mechanical movement into electrical power (i.e., generate electrical power) can include an electric machine coupled to a companion device that is a prime mover. The prime mover supplies mechanical movement to the electric machine, which converts the mechanical movement into electrical power. An electric machine system configured to convert electrical power into mechanical movement (i.e., motor) can include an electric machine coupled to a companion device that is driven by the mechanical movement output from the electric machine. In certain instances, electric machine systems configured to both generate electrical power and mechanical movement can include an electric machine coupled to a companion device (e.g., a prime mover) that may be driven by the electric machine and that may drive the electric machine.

SUMMARY

One aspect of the present disclosure encompasses a subsea electric machine system. The system has a main housing adapted to contain a fluid at a pressure above an ambient pressure about the main housing. An electric machine is in the main housing. The electric machine includes a stator and a rotor supported in the stator. The rotor, by interaction of magnetic fields between the stator and the rotor, at least one of moves relative to the stator or generates electricity when moved relative to the stator. The rotor has an elongate rotor core, a plurality of permanent magnets arranged around the rotor core, and a sleeve around the permanent magnets that provides primary radial support for retaining the permanent magnets to the rotor core during operation of the electric machine. The sleeve is sealed to the rotor core to isolate the magnets from the fluid in the main housing. A companion device is coupled to the rotor of the electric machine.

An aspect of the present disclosure encompasses a rotor for use in a fluid filled housing of an electric machine. The rotor includes an elongate cylindrical rotor core, a plurality of permanent magnets arranged around a circumference of the rotor core, and a covering around the permanent magnets. The covering is adapted to seal the permanent magnets against contact with the fluid in the housing.

An aspect of the present disclosure encompasses an electric machine system. The electric machine system includes a main housing adapted to contain a fluid at a pressure above an ambient pressure about the main housing. An electric machine is in the main housing. The electric machine includes a stator housing around at least a portion of the stator, and a rotor supported in the stator. The stator housing is sealed to prevent contact of fluid in the main housing with the stator. The rotor, by interaction of magnetic fields between the stator and the rotor, at least one of moves relative to the stator or generates electricity when moved relative to the stator. The rotor has a plurality of permanent magnets arranged around the rotor core and a covering that is sealed to prevent fluid in the main housing from contacting the permanent magnets. A compressor is coupled to the rotor of the electric machine.

One or more of the aspects can include some, none or all of the following features. The stator housing can include a non-conductive material in at least a portion proximate the permanent magnets of the rotor. The rotor can include an end plate about an end of the rotor core, and a perimeter surface of the end plate sealed with the sleeve. The end plate includes a seal sealed to a fiber and polymer composite hoop carried on the end plate, and the sleeve is formed around the composite hoop. The sleeve can be, at least in part, a fiber and polymer composite and an innermost layer of the composite can be a layer of axially oriented fibers. An intermediate housing can be provided within the main housing. The intermediate housing can be removable from the main housing while carrying at least the stator and the rotor. At least a portion of the stator is coated or treated for corrosive resistance with one or more of epoxy, polyetheretherketone, ethylene chlorotrifluoroethylene copolymer.

The details of one or more implementations are set forth in the accompanying drawings and the description below. Other features, objects, and advantages will be apparent from the description and drawings, and from the claims.

DESCRIPTION OF DRAWINGS

FIG. 2A is a cross-sectional view of an example rotor.

FIG. 2B is a detail cross-sectional view of an end of the example rotor of FIG. 2A.

FIG. 4Q is a schematic perspective view of example end turns of a stator for an electric machine.

FIG. 4AA is a partial schematic end view of an example core of a stator for an electric machine.

FIG. 4BB is a partial schematic end view of an example core of a stator for an electric machine.

FIG. 4CC is a partial schematic end view of an example core of a stator for an electric machine.

FIG. 4DD is a partial schematic end view of an example core of a stator for an electric machine.

FIG. 4EE is a schematic end view of example end turns of a stator for an electric machine.

FIG. 4FF is a schematic end view of example end turns of a stator for an electric machine.

FIG. 4GG is a schematic end view of example end turns of a stator for an electric machine.

FIG. 4HH is a schematic side view of example end turns of a stator for an electric machine.

FIG. 4II is a schematic cross-sectional view of an example stator for an electric machine.

FIG. 4JJ is a schematic cross-sectional view of an example stator core for an electric machine.

FIG. 4KK is a schematic cross-sectional view of an example stator core for an electric machine.

FIG. 4LL is a perspective view of an example wedge for insertion into one or more stator core slots.

FIG. 4MM is a perspective view of an example wedge for insertion into one or more stator core slots.

FIG. 4NN is a schematic end view of an example stator core for an electric machine.

FIG. 4OO is a perspective view of an example wedge for insertion into one or more stator core slots.

FIG. 4PP is a schematic end view of an example stator core for an electric machine.

FIG. 4QQ is an example slot liner for a stator slot of an electric machine.

FIG. 4RR is an end view of an example stator core for an electric machine showing the slot liner of FIG. 4QQ residing in the slot and retained by a liner clamp.

FIG. 4SS is an end view of an example stator core for an electric machine showing the slot liner of FIG. 4QQ residing in the slot and retained by an alternate liner clamp.

FIG. 4TT is a partial perspective view of an example stator for an electric machine.

FIG. 4UU is an end view of an example stator for an electric machine.

FIG. 4VV is a partial perspective view of an example stator for an electric machine.

FIG. 4WW is a partial side view of an example stator for an electric machine.

FIG. 4XX is a partial perspective view of an example stator for an electric machine.

DETAILED DESCRIPTION

Figure 1A:
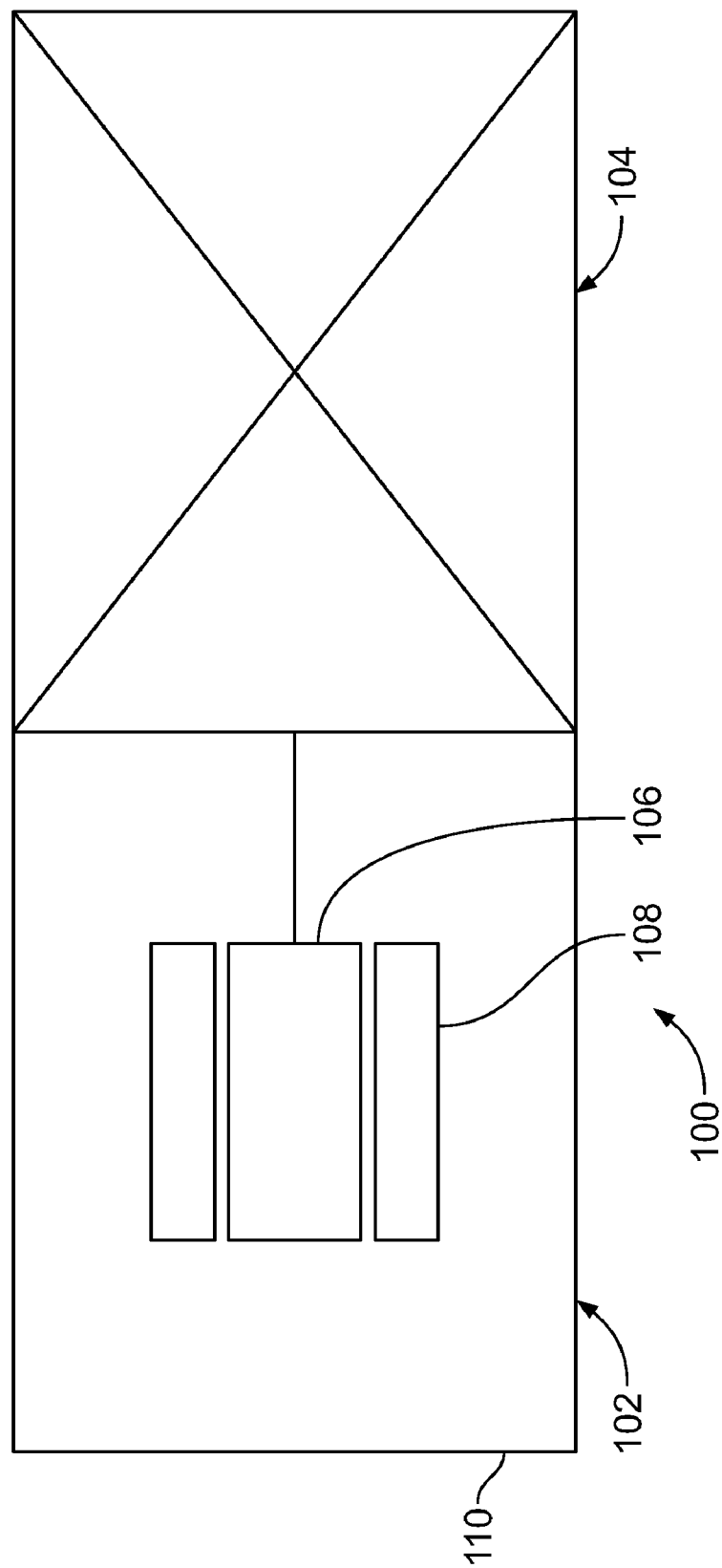
FIG. 1A is a schematic of an example electric machine system.

Referring to FIG. 1A, an electric machine system 100 includes an electric machine 102 coupled to a companion device 104. The electric machine 102 can operate as a generator, producing electrical power from mechanical movement, operate as a motor producing mechanical movement from electricity, or alternate between generating electrical power and motoring. In generating electrical power, a prime mover supplies mechanical movement to the electric machine 102, and the electric machine 102 converts the mechanical movement into electrical power. In certain instances, the companion device 104 may be the prime mover. In motoring, the mechanical movement output from the electric machine 102 can drive another device. In certain instances, the electric machine 102 can drive the companion device 104. In certain instances, the electric machine 102 can operate to motor and drive the prime mover during specified conditions, and switch to generating electrical power and be driven by the prime mover during specified conditions. The electric machine 102 can be configured for primarily generating electrical power, primarily motoring, or to be reasonably efficient at both generating electrical power and motoring.

In general terms, the electric machine 102 includes a stationary member and a movable member that, by interaction of magnetic fields, generates electrical power as the movable member moves relative to the stationary member and/or moves the movable member as electrical power is applied to the stationary member. For convenience of reference herein, the electric machine 102 is described as a rotating electric machine, where the movable member is a rotor 106 supported to rotate in the stationary member, a stator 108. Rotor 106 is coupled to the companion device 104 to drive the companion device 104 and/or be driven by the companion device 104. While FIG. 1A illustrates a horizontally-oriented electric machine coupled to a horizontally-oriented companion device 104, other implementations may provide for a vertically-oriented electric machine coupled to and capable of driving vertically-oriented companion devices, among other orientations. Additionally, in other instances, the electric machine 102 can be another type of electric machine. For example, the electric machine 102 can be a linear electric machine, where the movable member is a linearly reciprocating shaft. The linearly reciprocating shaft may be coupled to the companion device 104 to drive and/or be driven by the companion device 104. As described in more detail below, the electric machine 102 is an alternating current (AC), synchronous, permanent magnet (PM) electric machine having a rotor 106 that includes permanent magnets and stator 108 that includes a plurality of formed or cable windings about a core. In other instances, the electric machine can be an other type of electric machine, such as an AC, asynchronous, induction machine where both the rotor and the stator include windings or another type of electric machine. In certain instances, the electric machine 102 is carried by and contained within a housing 110. The housing 110 can be wholly separate from the companion device 104, separate from and coupled to the companion device 104, or partially or wholly shared with the companion device 104 (i.e., the electric machine 102 and companion device 104 carried by and contained within a common housing).

In certain instances, the electric machine system 100 may be a subsea electric machine configured for subsea operation, submerged in the open sea (i.e., outside of a well or a pipeline). To this end, the housing 110 is a pressure vessel sealed against passage of fluid between the interior of the housing 110 and the surrounding environment (e.g., the surrounding seawater). The housing 110 is constructed to withstand the ambient pressures about the electric machine system 100 and thermal loads exerted by the surrounding environment, as well as pressures and thermal loads incurred in operating the electric machine 102 and companion device 104. The housing 110 may be constructed of a material that resists corrosion, for example, stainless steel, nickel alloys such as INCONEL a registered trademark of Special Metals Corporation, and/or other materials. The housing 110 may additionally or alternatively be plated or coated with a material that resists corrosion, for example, INCONEL, epoxy, polyetheretherketone, ethylene chlorotrifluoroethylene and/or other materials. In certain instances, the housing 110 may carry anodes (not shown) to assist in resisting corrosion. In certain instances, the housing 110 may be coupled to a skid or other structure that aligns with and engages (e.g., by way of guide tubes that receive guide cones) other subsea structures.

In instances where the companion device 104 is a prime mover, the companion device can include a number of different possible devices. For example, the prime mover may include one or more of a fluid motor operable to convert fluid (gas/liquid) flow into mechanical energy, a gas turbine system operable to combust an air/fuel mixture and convert the energy from combustion into mechanical energy, an internal combustion engine, and/or other type of prime mover. In instances where the companion device 104 is driven by the electric machine 102, the companion device can include a number of different possible devices. For example, the companion device 104 can include one or more of a rotating and/or reciprocating pump, rotating and/or reciprocating compressor, mixing device, or other device. Some examples of pumps include centrifugal pump, axial pump, rotary vane pump, gear pump, screw pump, lobe pump, progressive cavity pump, reciprocating positive displacement or plunger pump, diaphragm pump, and/or other types of pumps. Some examples of compressors include centrifugal compressor, axial compressor, rotary vane compressor, screw compressor, reciprocating positive displacement compressor and/or other types of compressors. The electric machine 102 can be coupled to two or more companion devices 104 at the same time.

Although shown with a single companion device 104, the electric machine 102 can also be coupled to two or more companion devices 104 (to drive and/or be driven by the devices 104). In certain instances, one or more companion devices 104 can be provided at each end of the electric machine 102. For example, in a configuration with two companion devices 104, one may be provided at one end of the electric machine 102 and another provided at an opposing end of the electric machine. In another example, a configuration with two companion devices 104 can have one provided at one end of the electric machine 102, and another coupled to the first companion device. Also, if multiple companion devices 104 are provided, they need not all be of the same type of companion device.

Figure 1B:
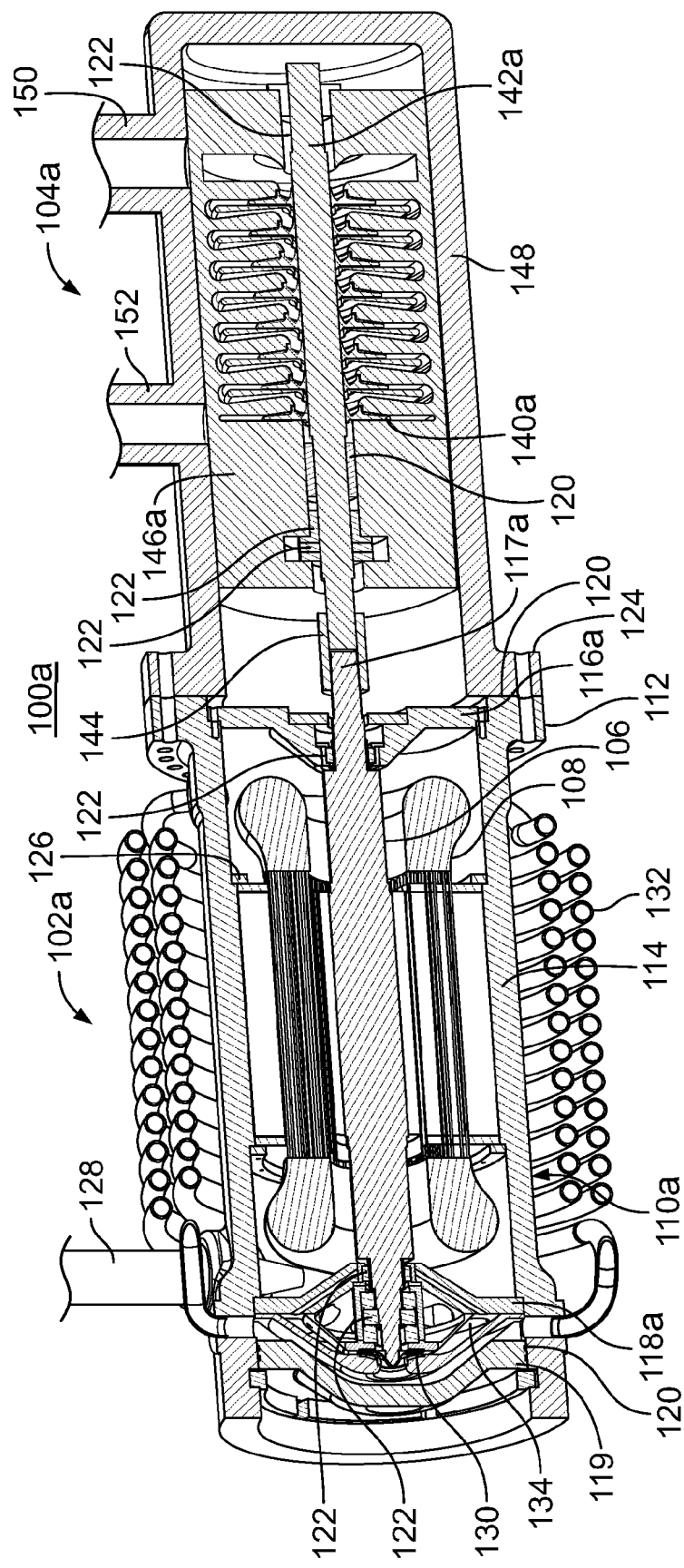
FIG. 1B is a cross-sectional view of an example electric machine system including a subsea pump.

FIG. 1B depicts an example electric machine system 100*a* where the companion device 104*a* is a pump driven by the electric machine 102*a*. One pump companion device 104*a* is shown. In other instances, more pump companion devices 104*a* can be provided. For example, two pump companion devices 104*a* could be provided on opposing ends of the electric machine 102*a* (e.g., in a configuration similar to the compressor companion devices 104*b* shown below). In certain instances, two or more pump companion devices 104*a* could be provided on the same side of the electric machine 102*a*. The example electric machine system 100*a* is configured for subsea operation, submerged in the open sea (i.e., outside of a well). In other words, the example electric machine system 100*a* is a subsea pump system.

The housing 110*a* is a pressure vessel sealed against passage of fluid between the interior of the housing 110*a* and the surrounding environment (e.g., the surrounding seawater). In certain instances, the housing is flooded with a heat transfer fluid that is communicated to both the rotor 106 and the stator 108. In certain instances, the heat transfer fluid includes a liquid, is primarily a liquid and/or is entirely liquid. The heat transfer fluid can include water, mono-ethylene glycol (MEG), mono-propylene glycol (MPG), an oil, a fluid similar to or the same as that being pumped by the pump companion device 104*a*, and/or other fluid. Although referred to herein as a heat transfer fluid, the fluid may perform functions other than to provide heat transfer with the electric machine 102*a*. In certain instances, the fluid lubricates bearing surfaces and/or performs other functions. In certain instances, the heat transfer fluid is maintained at pressure above the maximum operating pressure attained by the pump companion device 104*a*. Because the heat transfer fluid is at a pressure above the maximum operating pressure attained by the pump companion device 104*a*, leakage between the electric machine 102*a* and the pump companion device 104 tends to be leakage of the heat transfer fluid towards the pump companion device 104*a*. In certain instances, the pressure of the heat transfer fluid is above the ambient pressure about the exterior of the electric machine system 100*a* by an amount substantially greater than the incidental pressure incurred in circulating the heat transfer fluids through the electric machine system 100*a*. The housing 110*a* has a flange 112 proximate the drive end of the electric machine 102*a*. Flange 112 is configured to be sealingly joined, by bolts and/or otherwise, to the companion device 104*a*, for example, at a corresponding flange 124 of the companion device 104*a*. In certain instances, a seal (e.g., ring gasket, o-ring and/or other) may be provided between flange 112 and flange 124. FIG. 1B depicts a close-coupled subsea pump system, in that the housing 110*a* of the electric machine 102*a* attaches directly to the housing 148 of the pump companion device 104*a*. In other instances, the subsea pump system can be of an integrated configuration where the electric machine and companion device have a common housing and/or common shaft. For example, in some common housing configurations, the housing body that surrounds both the electric machine and the companion device can be a unitary piece (i.e., not readily separable, such as by removal of fasteners). In some common shaft configurations, the rotor of the electric machine can be unitary with the drive shaft of the companion device (i.e., not readily separable, such as by removal of fasteners or by release of the drive coupling). In other instances, subsea pump system can be of a non-integrated configuration having the housing of electric machine 102*a* wholly separate (not coupled and/or substantially coupled) from the housing of the pump companion device 104*a*.

The housing 110*a* as shown is configured in four main elements including a housing body 114, a drive end plate 116*a* proximate the drive end of the electric machine 102*a*, a non-drive end plate 118*a* opposite the drive end of the electric machine 102*a*, and an end cap 119 at the end of the housing body 114 adjacent the non-drive end plate 118*a*. In certain instances, the housing 110*a* may be configured in fewer or more elements. One or more seals 120 (e.g. gaskets, o-rings and/or other) may be provided between the end cap 119 and the housing body 114 to seal against passage of fluid into and/or out of the housing 110*a*. In certain instances, seals may additionally or alternatively be provided between the drive end plate 116*a* and the housing body 114 and/or between the non-drive end plate 118*a* and the housing body 114. A drive stub 117*a* of the rotor 106 extends through the drive end plate 116*a* to communicate mechanical movement with the companion device 104*a*.

The end plates 116*a*, 118*a* carry bearings 122 that receive and support the rotor 106 to rotate about a rotational axis in the stator 108. The bearings 122 can be a number of different possible types of bearings, and the number and types of bearings carried by the drive end plate 116*a* can be different from the number and types of bearing carried by the non-drive end plate 118*a*. The bearings 122 can include one or more of journal bearings (e.g., a tilt-pad journal bearing and/or other type), magnetic bearings (e.g., such as that described in U.S. Pat. Nos. 6,700,258, 6,727,617, U.S. Patent Publication No. 2002/0175578 and/or other type), hybrid magnetic bearings, ball bearings and/or other types of bearing. One or more of the bearings 122 is a thrust bearing (e.g., a tilt-pad thrust pad and/or other type). In certain instances, non-drive end plate 118*a* includes at least one axial or thrust bearing to axially retain the rotor 106 relative to the housing 110*a* and at least one radial bearing to provide radial support to the rotor 106 relative to the housing 110*a*, and the drive end plate 116*a* includes at least one radial bearing to provide radial support to the rotor 106 relative to housing 110*a*.

The stator 108 is generally cylindrical and the outer diameter thereof is closely received in the inner diameter of the housing 110*a* to support the stator 108 relative to the housing 110*a*. The outer diameter of the stator 108 may be keyed (using a protruding male key received in a female receptacle), bolted and/or otherwise secured to the inner diameter of the housing 110*a* to rotationally affix the stator 108 relative to the housing 110*a*. In certain instances, the stator 108 is axially retained with end rings 126 that are bolted and/or otherwise affixed to the housing 110*a*. One or more penetrators 128 (one shown for simplicity of illustration) are provided through and sealed or substantially sealed with the housing 110*a* to communicate fluid and/or electrical power into the interior thereof. In certain instances, for example in connection with a three phase electric machine 102*a*, at least three penetrators 128 are provided to conduct electrical conductors from a power electronics system (i.e., control system for the electric machine) to the windings of the stator 108. Another penetrator 128 may be provided that includes a conduit coupled to a supply heat transfer fluid to replenish any heat transfer fluid leaked from the housing 110*a*.

The non-drive end of the rotor 106 carries a fluid circulation pump 130 that circulates the heat transfer fluid in the housing 110*a* and through an external heat exchanger 132. The pump 130 is coupled to the non-drive end of the rotor 106 to rotate with the rotor 106. The pump 130 can be a number of different types of pumps, including a shrouded or unshrouded centrifugal impeller pump, radial impeller pump, rotary vane pump, gear pump, screw pump, lobe pump and/or other type of pump. In certain instances, the external heat exchanger 132 includes a continuous conduit helically coiled around the exterior of the housing 110*a*. The external heat exchanger has an outlet proximate the drive end of the electric machine 102*a* and an inlet proximate the pump 130. The pump 130 pumps heat transfer fluid through ports 134 in the non-drive end plate 118*a* into the external heat exchanger 132. The fluid flows toward the drive end of the electric machine 102*a* over the stator 108 and through the gap between the stator 108 and the rotor 106 and through gaps between the stator 108 and the housing 110*a*. In instances where the heat transfer fluid is cooler than the stator 108 and/or rotor 106, the fluid extracts heat from (i.e., cools) the stator 108 and/or rotor 106. In some instances, when the shaft-driven circulation pump is mounted on the drive end, the fluid at the drive end of the electric machine 102*a* flows into the heat exchanger 132, is cooled as it is circulated through the helical coil and is returned to the non-drive end of the electric machine 102*a* over the stator 108 and through the gap between the stator 108 and the rotor 106 and through axial gaps between the stator 108 and the housing 110a, and back to the pump 130 to repeat circulation. In other instances, the fluid circulation gaps between the stator 108 and the housing 110a can be omitted. In instances where the electric machine system 100a is subsea, seawater helps cool the heat transfer fluid circulated through the helical coil of the heat exchanger 132. Although shown as cooling the heat transfer fluid from within the housing 110a, the external heat exchanger 132 could additionally or alternatively receive and cool process fluids being acted upon by the companion device. Additionally, as described below the heat transfer fluid in the housing 110a and the process fluids can be one in the same. In certain instances, the heat exchanger 132 could be used for cooling fluids from within the housing 110a and an additional external heat exchanger (not shown) can be provided about the housing 110a to receive and cool process fluids being acted upon by the companion device.

Although the pump companion device 104a can be a number of different types of pumps, FIG. 1B depicts a multistage centrifugal pump. Eight centrifugal impellers 140a are depicted arranged on central drive shaft 142a of the pump companion device 104a. In other instances fewer or more impellers can be provided. The drive shaft 142a is shown coupled to the drive stub 117a of rotor 106 by a drive coupling 144. Although drive coupling 144 is shown as having two female ends that internally receive male ends of the drive stub 117a and drive shaft 142a, in other instances the drive coupling 144 can be a male coupling received into female receptacles provided in the drive stub 117a and the drive shaft 142a. In certain instances, the manner of coupling the drive stub 117a and the drive shaft 142a can include a combination of both male and female drive coupling configurations and/or other configurations. In certain instances, the drive shaft 142a could be integral with the rotor 106 (i.e., constructed as unitary part with the rotor 106, having no coupling, gear box, screw thread or other mechanical connection). The drive shaft 142a is supported on bearings 122 carried in a pump body 146a secured to the companion machine housing 148. As above, the bearings 122 can be a number of different possible types of bearings, and the number and types of bearings can be different at different locations along the drive shaft 142a. The bearings 122 can include one or more of journal bearings (e.g., a tilt-pad journal bearing and/or other type), magnetic bearings, hybrid magnetic bearings, ball bearings and/or other types of bearing. One or more of the bearings 122 is a thrust bearing (e.g., a tilt-pad thrust pad and/or other type). In certain instances, drive end of the drive shaft 142a (nearest drive coupling 144) includes at least one axial or thrust bearing to axially retain the drive shaft 142a relative to the pump body 146a and at least one radial bearing to provide radial support to the drive shaft 142a relative to the companion machine housing 148, and the non-drive end of the drive shaft 142a includes at least one radial bearing to provide radial support to the drive shaft 142a relative to the companion machine housing 148. A seal 120 may be provided about the drive shaft 142a to seal or substantially seal against flow of fluids from the centrifugal impellers 140a towards the electric machine 102a.

The companion machine housing 148 includes an inlet 150 through which the process fluid being pumped is communicated to the centrifugal impellers 140a. Rotating the centrifugal impellers 140a pumps the fluid towards an outlet 152 of the companion machine housing 148. In other implementations, the fluid flow may be reversed such that the centrifugal impellers 140a are adapted to produce a fluid flow from the outlet 152 through the machine housing 148 and out through the inlet 150.

In operation of the electric machine system 100a, three phase AC electric current is provided to the stator 108 of the electric machine 102a via the penetrators 128. The electrical current energizes windings of the stator 108, and causes the rotor 106 to rotate. Rotating the rotor 106 drives the drive shaft 142a of the pump companion device 104a and pumps process fluid from the inlet 150 to the outlet 152. Rotating the rotor 106 also drives the fluid circulation pump 130 to pump fluid from non-drive end of the electric machine 102a into the heat exchanger 132, towards the drive end, over the stator 108 and through the gap between the stator 108 and the rotor 106, towards the non-drive end of the electric machine 102a. Fluid proximate the non-drive end of the electric machine 102a flows into the heat exchanger 132 and is cooled as it passes through the helical coil of the heat exchanger 132 to drive end of the electric machine 102a. Depending on the configuration of the shaft-driven fluid circulation pump, fluid can alternatively flow in the reverse direction (i.e., through the heat exchanger 132 toward the non-drive end).

Figure 1C:
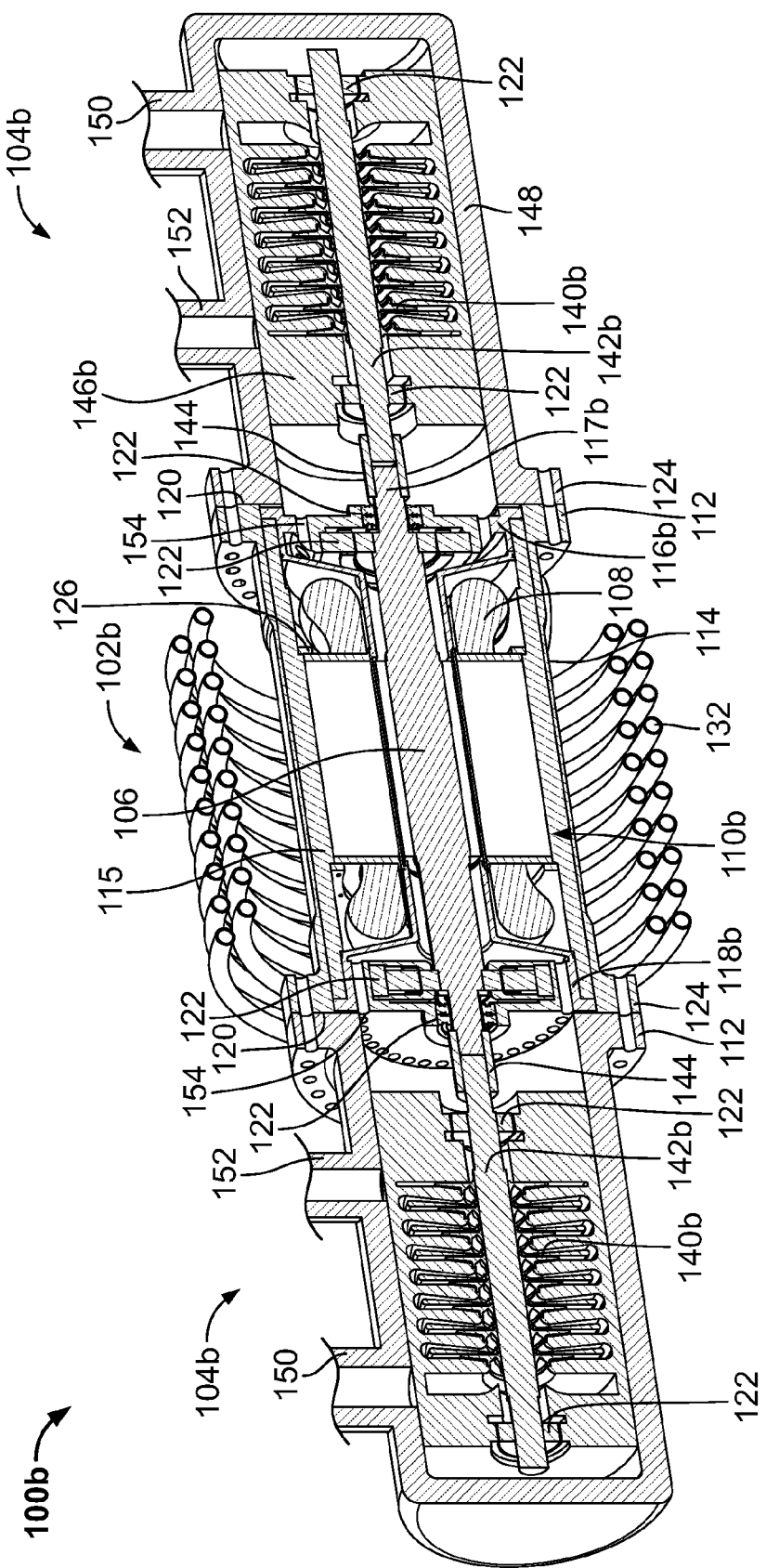
FIG. 1C is a cross-sectional view of an example electric machine system including a subsea compressor.
Figure 1D:
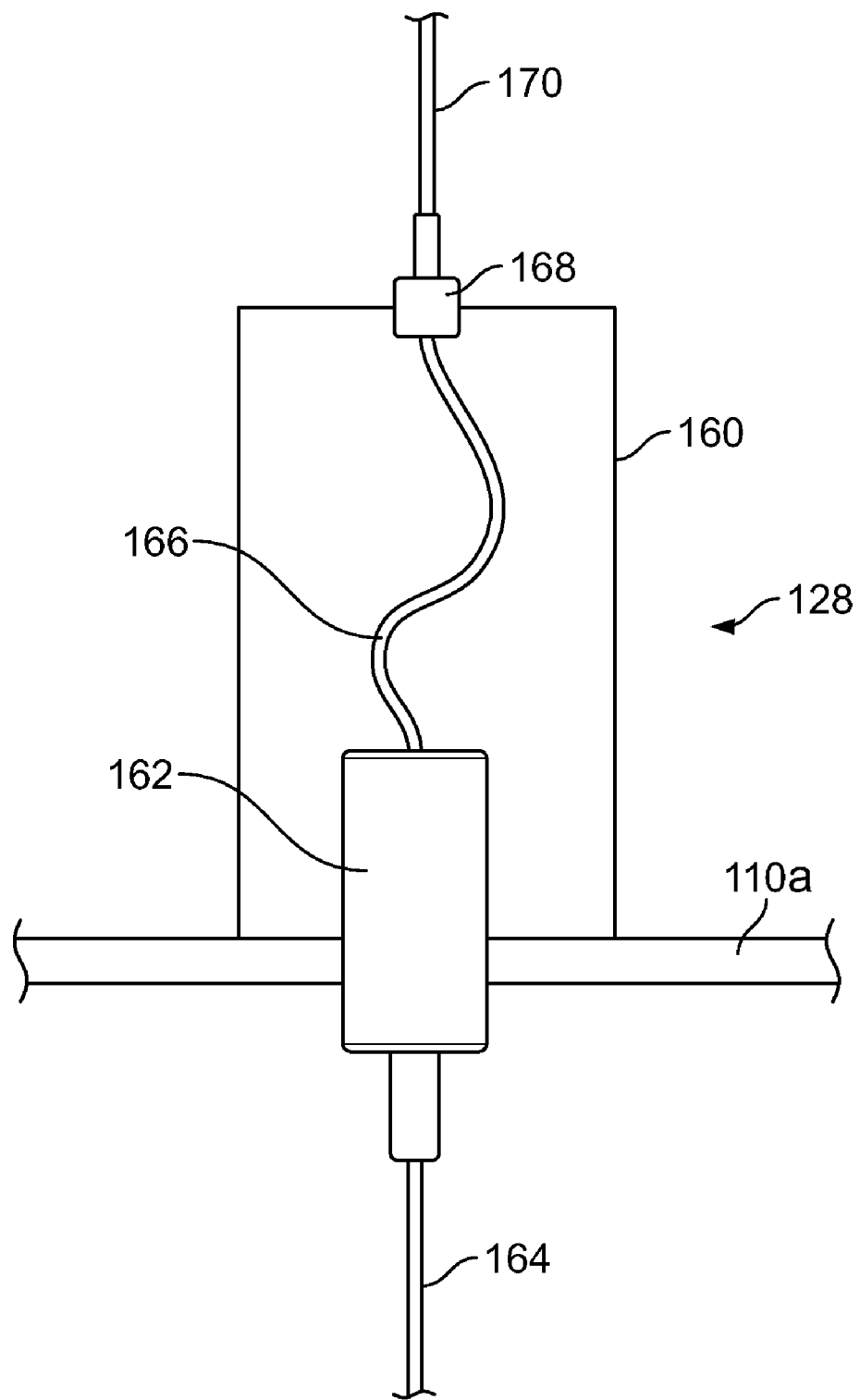
FIG. 1D is a cross-sectional view of an example penetrator.

FIG. 1C depicts an example electric machine system 100b where the companion device is a compressor 104b. In FIG. 1C, the example electric machine system 100b includes two compressor companion devices 104b arranged on opposing ends of the electric machine 102b. In other instances, fewer or more compressor companion devices 104b can be provided. In certain instances, two or more pump companion devices 104a could be provided on the same side of the electric machine 102a. The example electric machine system 100b is configured for subsea operation, submerged in the open sea (i.e., outside of a well). In other words, the example electric machine system 100b is a subsea compressor system.

In general, the configuration of the electric machine system 100b is similar to that of the electric machine system 100a discussed above. FIG. 1C shows the system 100b configured for a cartridge type installation/removal of the electric machine 102. To this end, all or a majority of the electric machine 102, including the stator 108 and the rotor 106, is carried in an intermediate housing 115 that is received by the housing 110b. The intermediate housing 115 carrying electric machine 102 components can be installed into or removed from the main housing 110b as a unit or cartridge. The cartridge type installation/removal simplifies service or replacement of the electric machine 102, because the electric machine 102 need not be assembled/disassembled piece by piece into the main housing 110b. Moreover, the electric machine 102 can be assembled into the intermediate housing 115 and tested prior to installation into the main housing 110b.

Also notable, the interior of the housing 110b is in communication with the process fluids on which the compressor companion devices 104b are operating. Thus, the components of the electric machine are exposed to the process fluids during operation of the electric machine system 100b. The process fluids are under pressure, because they have been compressed by the compressor companion devices 104b. In certain instances, the process fluids are above the ambient pressure about the exterior of the electric machine system 100b by an amount substantially greater than the incidental pressure incurred in circulating the process fluids through the electric machine system 100b. In certain instances, communication is established by omitting a seal or providing an imperfect seal about the drive shaft 142b of the compressor companion device 104b and/or providing other fluid communication paths from the compressor companion device 104b.

The end plates 116b, 118b may be additionally provided with ports 154 to facilitate communication of process fluids into the gap between the rotor 106 and stator 108. The electric machine 102b may also be provided without an integrated fluid circulation pump 130.

In certain instances, the fluids used in operation of the electric machine, including heat exchange fluids and other process fluids, can contain constituents that may be corrosive, reactive and/or otherwise harmful to one or more of the components of the electric machine 102b. As described in more detail below, the rotor 106 and stator 108 may be fortified against exposure to the process fluids. In certain instances, as described in more detail below, the rotor 106 and/or stator 108 may be sealed against exposure to the process fluids and/or coated with protective coatings.

Although the compressor companion device 104b can be a number of different types of compressors, FIG. 1C depicts multistage centrifugal compressors. Eight centrifugal impellers 140b are depicted arranged on central drive shaft 142b of the compressor companion device 104b. In other instances fewer or more impellers can be provided. As above, the drive shaft 142b is shown coupled to the drive end of rotor 106 by a drive coupling 144. In other instances, the drive shaft 142b could be integral with the rotor 106 (i.e., constructed as unitary part with the rotor 106, having no coupling, gear box, screw thread or other mechanical connection).

FIG. 1C depicts an electric machine system 100b incorporating magnetic bearings 122. In certain instances, one end of the rotor 106 may be supported by an axial and radial magnetic bearing 122 carried in the end plate 118b and the other end of the rotor 106 supported by a radial magnetic bearing 122 carried in end plate 116b. Additional conventional bearings, for example cartridge ball bearings and/or another type, may be provided to provide secondary and/or contingency support the rotor 106. The companion devices 104b can also be provided with magnetic bearings 122 carried in the compressor body 146b.

In operation of the electric machine system 100b, three phase AC electric current is provided to the stator 108 of the electric machine 102b via the penetrators. The electric current energizes windings of the stator 108, and causes the rotor 106 to rotate. Rotating the rotor 106 drives the drive shaft 142b of the compressor companion devices 104b and compresses process fluid from the inlet 150 to the outlet 152. A portion of the process fluids is communicated with the interior of housing 110b, causing process fluid to circulate over the stator 108 and through the gap between the stator 108 and the rotor 106. An additional flow of fluid may be provided through the heat exchanger 132 to be cooled as it passes through the helical coil of the heat exchanger 132.

Figure 2C:
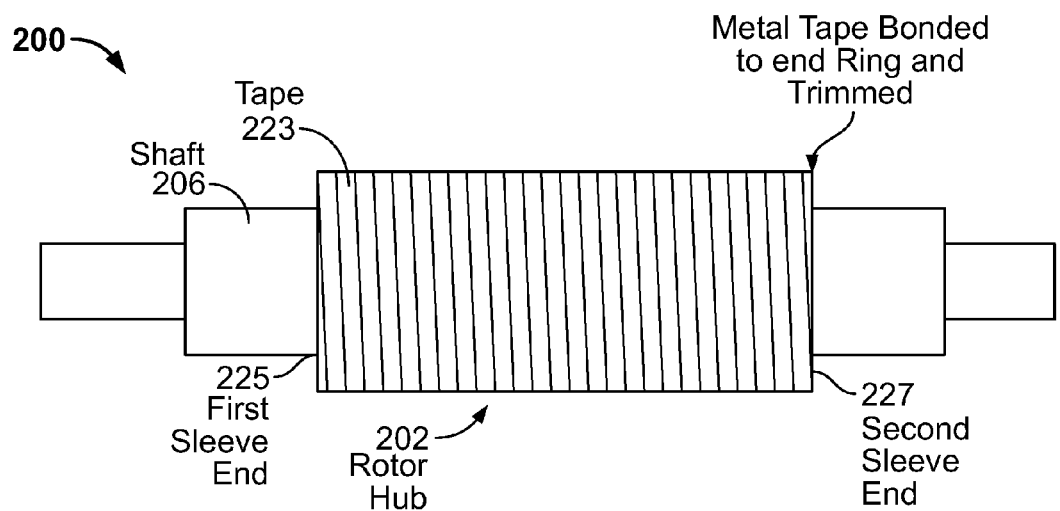
FIG. 2C shows an example rotor with a composite sleeve formed by a metallic tape wrapped around an outer jacket of the rotor.

FIG. 2A depicts a cross-sectional view of an example rotor 200 for use in an electric machine system, such as a motor and/or a generator. Rotor 200 could be used as rotor 106 described above. Additionally, implementations of the rotor 200 can be adapted for subsea operation and/or operation in corrosive environments. In certain instances, portions of the rotor 200 and rotor components can be coated or treated for corrosive resistance with INCONEL, epoxy, polyetheretherketones (PEEK), ethylene chlorotrifluoroethylene copolymer and/or other treatments. The rotor 200 can include rotor core having a rotor hub 202 and rotor shaft 206. The rotor hub 202 is adapted to support permanent magnets 204 positioned so as to magnetically interact with a stator provided in the electric machine system. The magnets 204 can be bonded or otherwise connected to the rotor hub 202. High energy permanent magnets 204 can be used, for example neodymium-iron-boron based, or samarium-cobalt based magnets. In certain instances, the permanent magnets 204 are bonded to the rotor hub 202. A rotor shaft 206 can be provided, forming a rotational axis of the rotor 200. The rotor shaft 206 extends axially from both ends of the rotor hub 202. The rotor shaft 206 may be constructed as a single piece or modularly from a plurality of shaft segments. In certain instances, the rotor shaft 206 can be hollow, including the rotor hub, to promote rotor cooling or to facilitate flow of fluid through the electric machine. The rotor 200 can further include one or more cooling passages 217 through the interior thereof to communicate fluid through the interior of the rotor. In FIG. 2A, a central passage 217 through center of rotor, entering on circumferential surface of the rotor hub 202, is shown.

A rotor sleeve 212 can serve to enclose the outer surface of the entire rotor 200 or portions of the rotor 200, such as the rotor hub 202 and magnets 204. The rotor sleeve 212 can be manufactured from material that allows the sleeve to protect rotor components as well as provide structural support to rotor components, such as the rotor hub 202. In certain instances, the rotor sleeve 212 can be constructed from a fiber reinforced composite, such as a carbon fiber composite, aramid fiber composite (e.g., KEVLAR a registered trademark of I. E. Dupont De Nemours), or fiber glass composite, a metal (e.g., INCONEL, stainless steel, MP35N a registered trademark of SPS Technologies, Inc. and/or other metal), and/or other material. For instance, a sleeve covering 212 can serve to provide radial support for the rotor hub 202 and magnets 204 positioned thereon, preventing loosening or detachment of magnets 204 from the rotor hub 202 during operation of the rotor 200 at high rotational speeds.

In certain instances, the sleeve 212 can also serve to insulate the rotor 200 and rotor components from outside elements. For example, in rotors adapted for subsea and/or exposure to corrosive environments operation, the sleeve 212 can be adapted to be air- or water-tight, in order to seal the rotor components. For example, the electric machine system in which the rotor 200 is disposed may contain heat transfer fluid, process fluids, and/or other fluids harmful to the rotor 200. The sleeve 212 may cover and isolate those portions of the rotor 200 sensitive to corrosion or otherwise adverse to contact with the fluid.

In certain instances, the rotor 200 may incorporate rotor elements and techniques for mounting the rotor sleeve 212 to the rotor 200 so as to seal at least the rotor hub 202. As shown in the example of FIG. 2B, rotor 200 can include end rings 214 positioned at one or both ends of the rotor hub 202 and mounted coaxially on the rotor shaft 206. In this example, the end ring 214 is bonded or otherwise attached to the rotor 200 so that the inner surface of the end ring 214 abuts the end of the rotor hub 202, extending radially so as to provide axial support to magnets 204 positioned on the rotor hub 202. The end rings 214 are positioned at each end of the rotor hub 202. The end ring 214 can be of metallic material (e.g., INCONEL, MP35N and/or other material). In certain instances, the material can be selected for its ferromagnetic properties as well, so as to enhance or avoid interference with the electromagnetic function of the magnetic rotor hub 202. Additionally, certain instances of the end ring 214 may be constructed so as to make the end ring corrosion-resistant, for example, through galvanization or anodization of the end ring material. In other instances, the end rings 214 can be built into or integrated into the rotor hub 202 itself. For example, a rotor hub 202 may be provided with an inset for mounting the magnets, resulting in the end sections of the hub having a larger diameter than the inset.

A ledge 217 can be provided circumferentially on the outside diameter of the end ring 214. The ledge 217 serves as a landing platform for the positioning of an end treatment strip 220 around the outside diameter of the end ring 214, the end treatment strip 220 forming a cylinder or a hoop. In certain instances, the outer diameter of the thin end treatment strip 220 is equal or approximately equal to the diameter of the rotor hub 202, including the magnets 204 mounted thereon. The end treatment strip 220 can be a composite material capable of bonding to the sleeve 212. In certain instances, the end treatment strip 220 and sleeve 212 are constructed from similar materials, such as pre-impregnated carbon fiber or other material. A circumferential groove 221 can also be provided on the ledge 217 of the end ring 214, in order to provide for a seal 222 (e.g., an o-ring, gasket and/or other seal) to be positioned on the ledge surface 217. The seal 222 seals or substantially seals between the end ring 214 and the end treatment strip 220 wrapped around the end ring's ledge 217. Of note, in certain instances, the circumferential groove 221 can be machined onto the end rings 214 before and/or after the end rings 214 are installed to the rotor 200 (as discussed below).

In one example, the sleeve 212 can be sealed to the rotor 200 by sliding and/or threading the end rings 214 onto the shaft 206 so as to abut the ends of the rotor hub 202. In certain instances, a seal (e.g., o-ring, gasket and/or other seal) and/or sealant (e.g. thread sealant, sealant applied to the juncture between the shaft 206 and end rings 214, and/or other sealant) can be provided between the shaft 206 and the end rings 214. The seal 222 can be positioned in the end ring 214 before or after positioning and connecting the end ring 214 to the shaft 206. In an instance where the end rings 214 are threaded onto the shaft 206, the respective threads of the end rings 214 can be oriented so that the end rings 214 are tightened to the shaft 206 when the rotor 200 is rotated in normal operation. In some instances, the end rings 214 can additionally be affixed to the rotor hub 202 with an adhesive.

After rigidly connecting the end ring 214 to the shaft 206 (e.g., by threading, welding and/or otherwise), the end treatment strip 220 is positioned on the outside diameter of the end ring 214 on the ledge 217. The end treatment strip 220 may then be wound onto the ledge 217, to position the strip 220 on the end ring 214, or may simply be slipped over the end ring 214 into position on the ledge 217. With the end rings 214, seals 222, and end treatment strips 220 in place, the construction of the sleeve 212 can be completed. Winding or otherwise securely wrapping the sleeve 212 onto the rotor hub 202 and on top of the end treatment strip 220 can press the end treatment strip 220 radially down onto the ledge surface 217, causing the strip 220 to shrink tightly onto the end ring 214. This pressure, in turn, compresses the seal 222 into the groove 221 to form a seal between the strip 220 and the end ring 214. As the sleeve 212 is wound onto the rotor 200 the sleeve 212 is bonded to the strip 220. This bonding extends the seal between the strip 220 and end ring 214 to the sleeve 212, thereby sealing the rotor hub 202 covered by sleeve 212. In certain instances, clamps may be employed to secure the strip 220 to the end ring 214 while the sleeve is wrapped to the rotor 200 and bonded to the strip 220. Additionally, the bonding of the strip 220 to the sleeve 212 can occur at an elevated temperature, to allow for a bond that will be less temperature sensitive.

Alternative techniques can be employed to seal the sleeve to the rotor assembly. For example, in some implementations, the end treatment strips 220, the seal 222, and seal grove 221 may be omitted. In some instances, the sleeve may be securely wound onto the rotor hub 202 and the circumferential surfaces of the end rings 214. The sleeve 212 may be fabricated from carbon fiber impregnated with thermoplastic material such as polyetheretherketone (PEEK). Thermoplastic material, such as PEEK, may also be applied to or pre-coated on the outer diameter of the end rings 214 prior to having the sleeve 212 wound on the hub assembly. Where grinding of the rotor assembly may be required, pre-coated end rings 214 may be provided with sufficient material so that a coating formed from PEEK (or other material), for example, remains on the end rings 214 following grinding and before the sleeve 212 is wound over both the end rings 214 and rotor hub assembly. With the sleeve in contact with the PEEK-coated end rings, heat or pressure may be applied to bond the sleeve to the end ring, forming a seal with the PEEK at each end of the sleeve 212, thereby isolating the rotor hub, magnet segments, and other components covered by the sleeve from contact with potentially hazardous external fluids and/or other materials.

After the sleeve 212 is wrapped on the rotor 220 secondary end rings 215 may be slid and/or threaded onto the shaft 206 so as to abut the end rings 214. The secondary end rings 215 have a diameter substantially equal to the sleeve 212 diameter, and serve to protect the outer surface of the sleeve 212 and/or to provide a location for rotor balancing (either by material removal or addition). In certain instances, a seal (e.g., o-ring, gasket and/or other seal) and/or sealant (e.g. thread sealant, sealant applied to the juncture between the shaft 206 and secondary end rings 215, and/or other sealant) can be provided between the shaft 206 and the secondary end rings 215. Additionally, the juncture between the secondary end rings 215 and the end rings 214 can be filed with resin and/or adhesive (thus, adhering the secondary end rings 215 to the end rings 214 and filling). In an instance where the secondary end rings 215 are threaded onto the shaft 206, the respective threads of the secondary end rings 215 can be oriented so that the secondary end rings 215 are tightened to the shaft 206 when the rotor 200 is rotated in normal operation. In certain instances, the outward facing edges of the secondary end rings 215 can be rounded or the rings' outer surface may be conical (with the smaller diameter facing outward) to facilitate fluid flow over the secondary end rings 215.

Figure 2D:
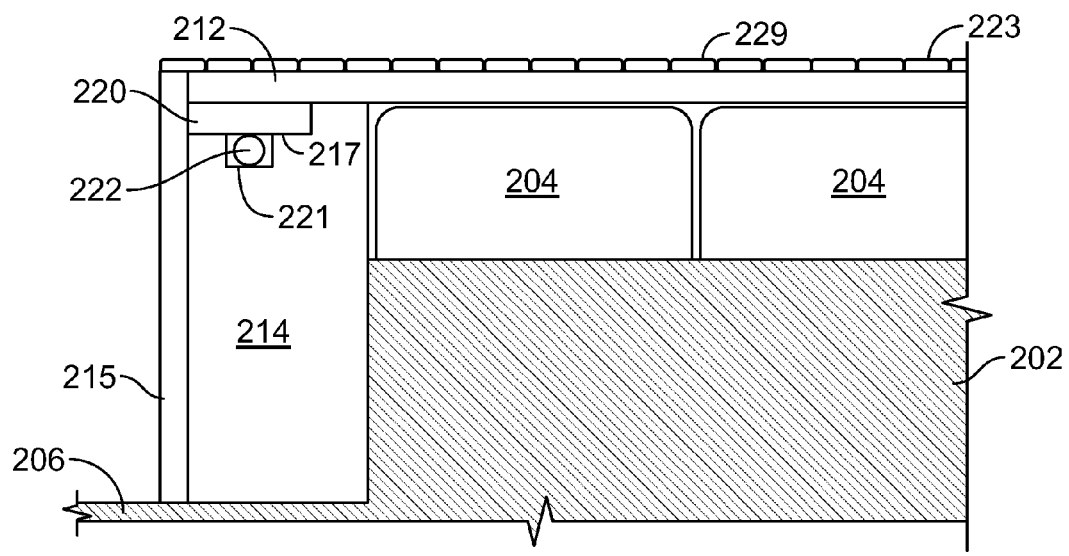
FIG. 2D is a detail cross-sectional view of an end of an example rotor having a rotor sleeve formed from a metal alloy tape.

Some implementations may employ additional measures to protect the ends of the sleeve 212 in addition to or in lieu of the secondary end rings 215. For example, tubular bands, constructed of material more resistant to wear and other damage than the composite sleeve 212 (e.g., non-magnetic metal, ceramic, polymer and/or other material), may be positioned at each end of the rotor hub, concentrically atop the sleeve 212. Consequently, the tubular bands may cover the ends of the sleeve, thereby protecting the ends of the sleeve from erosion, abrasion, or other damage that may occur during operation of the rotor 200. In another implementation, illustrated in FIGS. 2C and 2D, a tubular band may be replaced with a thin, non-magnetic, metal alloy tape 223 (e.g., nickel alloy (e.g., INCONEL), non-magnetic stainless steel, titanium and/or other metal) wrapped around the outer surface of the rotor sleeve 212 and bonded to end rings (not shown) positioned on the rotor shaft 206 to form a sleeve 229. In some instances the metal can be corrosion resistant. In some implementations, a insulating coating and/or surface treatment may be applied to the tape 223 to inhibit currents from circulating between adjacent laps of the tape 223. Some examples of coating and/or surface treatment include oxidation, anodization, phosphate/chromate/silicate coating (e.g., American Society for Testing and Materials (ASTM) A976 C-4 and/or C-5) and/or other coatings. In some implementations, the sleeve 229 may extend axially beyond the edges of the rotor sleeve 212.

In one implementation, a first end of a piece of tape 223 may be bonded to an end ring adjacent to a first sleeve end 225. The tape 223 may be bonded to the end ring using a laser weld, resistance weld, TIG weld, chemical bond, or any bonding method. The tape 223 may be wound on top of the rotor sleeve with adequate tension so as to cover the sleeve ends and maintain positive pressure between the tape 223 and the rotor sleeve 212 in all operating conditions of the rotor 200. The resulting tape winding 223 may be laid in butt laps across the outer surface of the rotor sleeve, resulting in a smooth surface that minimizes the thickness of the tape wrapping 223. Thin alloy tape wrappings 223 may, among other advantages, minimize parasitic mass as well as parasitic currents appearing in the metallic tape as a result of the magnetic field of the rotor 200 or corresponding electric machine. Other implementations may employ other winding techniques as well as various tape material for reinforcing and protecting the rotor sleeve. Upon winding the tape across the rotor hub 202 to cover the second end of the sleeve 227, the second end of the piece of tape 223 may be bonded to the opposite end ring. In some instances, for example in a butt lap winding, excess tape may result at the edges of end rings. The excess tape may be trimmed flush with the end ring faces to complete the tape winding 223.

Figure 2E:
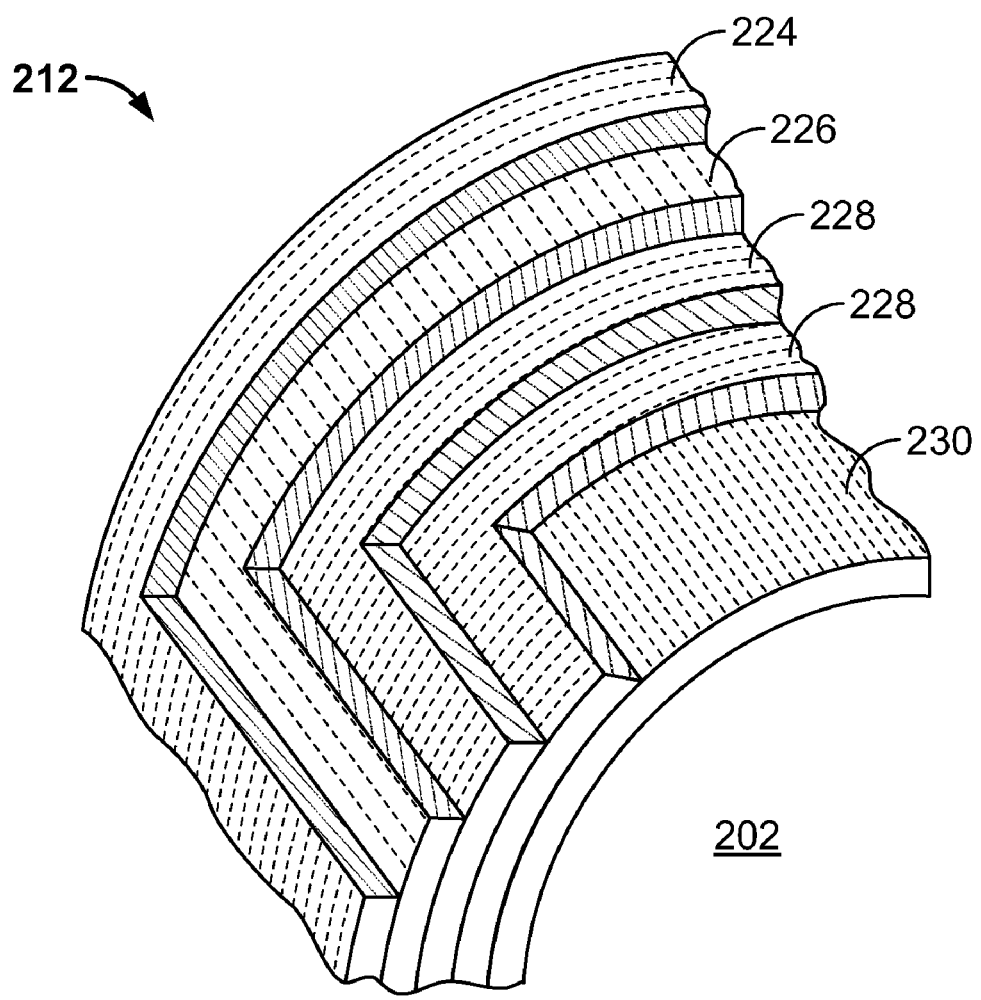
FIG. 2E is a detail cut-away view of an example rotor sleeve.

FIG. 2E is a detailed cut-away cross-sectional view of an example sleeve 212. The sleeve 212 can be manufactured or constructed of any material possessing the structural, resistive, and/or chemical properties desired for the particular rotor implementation, for example a fiber-reinforced composite. The sleeve 212 can serve a number of functions. For example, in subsea and/or corrosive environment rotor implementations, the sleeve 212 can be constructed of composite material capable of providing structural support and corrosion protection for the rotor hub, as well as sealing the rotor hub from exposure to foreign elements. Heating of the rotor 200 can result in thermal expansion of one or more of the rotor elements or sleeve. Where heating is uneven across the rotor, some sections of the rotor and rotor sleeve can expand differentially relative to other sections. Differential thermal expansion can result in differential, and potentially damaging, stresses on the sleeve 212. Stress can arise due to differential expansion of the sleeve itself or from differential expansion of the underlying rotor structure. Accordingly, the below described sleeve configurations can, among other benefits, more uniformly control and/or accommodate thermal expansion, both of the sleeve and the rotor itself.

In some instances of rotor sleeve 212, a fiber-reinforced composite sleeve material, such as carbon fiber, can be employed. In certain instances, as illustrated in the example of FIG. 2E, the sleeve may be multi-layered. FIG. 2E shows a multi-layer fiber-reinforced composite sleeve wrapping 212. The top layer 224 (or, in certain instances, layers) are cosmetic layers. These layers may possess functional characteristics as well. For example, to achieve strength and rigidity as well as control differential thermal expansion in one or multiple directions, the layers can have fibers oriented predominantly or all in the same direction (e.g. maximum strength in one direction) or different orientations (strength in multiple directions).

In certain instances, intermediate layer 226 can be a first, primarily axially-oriented carbon fiber composite layer layered beneath the cosmetic layer 224 (i.e., nearer to the outer circumferential surface of rotor 200). The layer 226 can be made of pre-impregnated carbon fiber composite sheet capable of providing very strong axial support as well as provide corrosion and leakage protection. Layer 228, positioned beneath layer 226, can be one or more carbon fiber composite layers with primarily circumferentially-oriented pre-impregnated carbon fiber tape. Layers with circumferentially-oriented carbon fiber, such as layer 228, do not provide substantial axial strength, instead providing circumferential strength. Additionally, circumferentially-oriented carbon fiber layers, while useful in controlling radial thermal expansion, are less effective at useful for limiting axial expansion. Layer 230 is a bottom, primarily axially-oriented carbon fiber layer and in certain instances is made from pre-impregnated carbon fiber composite sheet. Axially-oriented layers, such as layer 230, can remedy the structural deficiencies of circumferentially-oriented carbon fiber layers, both in terms of structural and thermal expansion support. Accordingly, in some instances, intermediate 226 and bottom layers 230 can have substantially axial reinforced composite fibers, the layer 228 having substantially circumferential reinforced composite fibers.

Layer 230 can be wrapped so as to directly contact the rotor 200, rotor hub 202, rotor hub magnets 204, and/or end rings 214, covering all or a portion of the rotor 200. In certain instances, additional layers can be provided between layer 230 and the rotor 200. Additional layers may also be provided between layers 224, 226, 228, and 230. Indeed, certain instances may make use of repeated layering of layers 224, 226, 228, 230 in similar or different orientations and orders. Although discussed above with respect to axially-oriented and circumferentially-oriented layers, the orientations of one or more of the layers 224, 226, 228, 230 could be oriented in non-axial and/or non-circumferential directions. For example, one or more of the layers 224, 226, 228, 230 could be oriented at 45 degrees, 30 degrees and/or another angle relative to the axial direction. Indeed, in some instances, fibers in a fiber-reinforced composite, need not be oriented in the same direction. Accordingly, in some instances, fiber-reinforced composites can be selected for the axial and circumferential support that have fibers primarily in one of the axial or circumferential direction. The layer, in such an instance, can have a greater density of fibers oriented on one orientation or dimension, than in another dimension.

The material forming the layers of a multi-layered sleeve 212 need not be uniform. In certain instances, the one or more layer materials may be selected so as to minimize stress on the rotor hub 202, magnets 204, as well as the surrounding sleeve 212 due to thermal expansion during operation. One technique for minimizing these stresses is to build the sleeve 212 so that the sleeve 212 expands axially with the interior rotor components at the rotor's 200 operating temperature.

The rotor 200, rotor components, and sleeve layers expand according to the coefficient of thermal expansion (CTE) of materials used in the rotor and sleeve. Accordingly, rotor sleeve 212 materials can be selected and/or engineered to have CTEs similar to the CTEs of the portion of the rotor 200 or rotor elements to be covered by the rotor sleeve 212. For example, in a fiber-reinforced composite rotor sleeve, the fiber and/or resin employed to form the rotor sleeve, can be selected so as to result in a composite sleeve material with a CTE equal or substantially equal to, complimenting, or otherwise matched to the CTE of the rotor shaft 206, rotor hub 202, and/or magnet 204 material. Matching CTE can, among other benefits, allow the sleeve 212 to expand with the expansion of the rotor components wrapped in the sleeve 212.

In some instances, in order to achieve a desired CTE in a sleeve layer or rotor component, material used in the sleeve or rotor component can be doped with other material having a higher or lower CTE so as to affect the net CTE of the resulting sleeve or rotor component. For instance, the resin of a carbon fiber sleeve layer could be doped so that the CTE of the carbon fiber sleeve layer matches the CTE of rotor components covered by the sleeve, for example neodymium-iron-boron based, or samarium-cobalt based magnets mounted on the rotor hub 202. Additionally, the density of fibers used in a fiber-reinforced sleeve can also be adjusted so as to engineer the net CTE of the sleeve or sleeve layer. In certain instances, one or more layers, including axially oriented, circumferentially oriented and/or other oriented layers, may be selected with varying CTEs so as to engineer a sleeve having a net CTE matched to the relevant portions of the rotor 200 to be covered by the sleeve 212. In certain instances, non-CTE-matched sleeve layers can be provided in addition to CTE-matched sleeve layers in the sleeve 212. For example, sleeve layers closest to the rotor hub 202 surface may be selected with CTE matched to the CTE of the rotor hub or rotor hub components, while outer sleeve layer material is selected based on other considerations, such as structural support, puncture resistance, or corrosion resistance.

In some implementations, the CTE of the rotor 200 to be covered by the sleeve 212, can vary across the rotor 200, depending, for example, on the rotor elements employed in and on the rotor 200. Rotors having differential CTE may result in differential thermal expansion in the rotor as well as the sleeve covering the rotor. Accordingly, in some implementations, rotor sleeves can be engineered to have differential CTE, for example by differential doping across the length of the sleeve, to correspond with varying CTEs in the rotor portions to be covered.

Figure 2F:
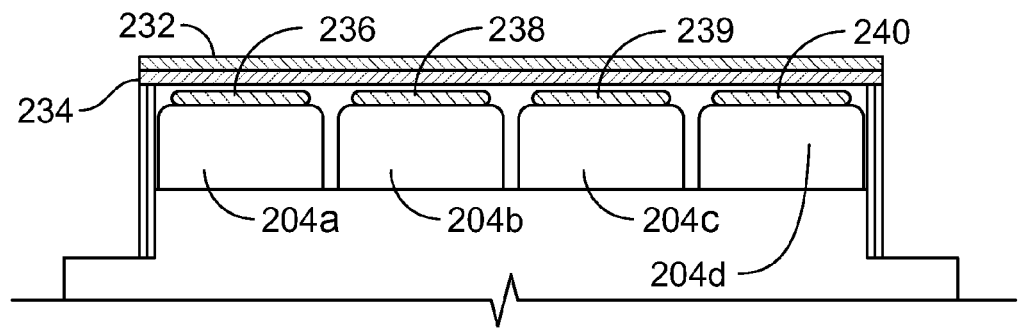
FIG. 2F is a detail cross-sectional view of another example rotor.
Figure 2G:
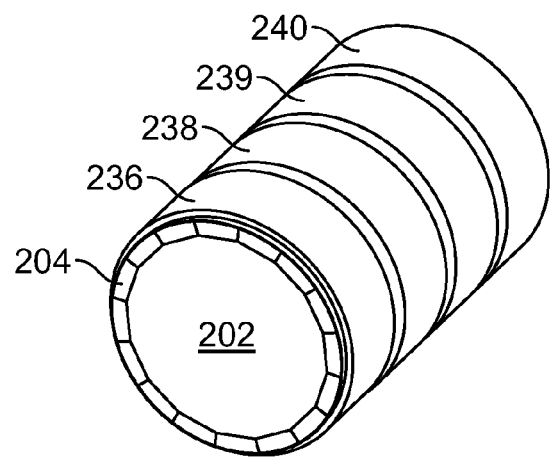
FIG. 2G is a detail, perspective view of the example rotor of FIG. 2E.

FIGS. 2F and 2G illustrate another implementation of an example rotor sleeve 212. FIG. 2F shows a detailed cross-sectional view of a multi-layered rotor sleeve 212. FIG. 2G is a detailed perspective view of the sleeve shown in FIG. 2F. A set of outer layers 232, 234 can be provided in the sleeve 212 together with a set of segmented layers 236, 238, 239, 240. The outer layers 232, 234 can include one or more composite layers, including axially, circumferentially and/or otherwise oriented layers. The segmented layers 236, 238, 239, 240 are distinct, hoop-like layers. A segmented layer can expand and contract independent from other segmented layers. Where differential temperatures make differential expansion or contraction likely, segmented layers 236, 238, 239, 240 can expand and contract in these regions of differential temperature and propagate less of the associated forces from expansion or contraction to other segmented layers, outer layers 232, 234, or the sleeve 212 generally.

In certain instances, the segmented layers 236, 238, 239, 240 can assume widths and positions in the sleeve 212 coordinating with circumferential segmentation of magnets 204a, 204b, 204c, 204d on the rotor 200. For example, as shown in FIG. 2F, in rotors having circumferentially segmented magnets 204, the segmented layers 236, 238, 239, 240 are positioned to align with the circumferential segmentation of one or more of the magnets 204a, 204b, 204c, 204d so that each segmented layer is aligned with one or more circumferential rows of magnets. This can allow for the expansion and contraction of each segmented layer 236, 238, 239, 240 to be influenced by the thermal expansion and contraction of magnet row 204a, 204b, 204c, 204d positioned beneath it. While the example of FIGS. 2F and 2G show segmented layers with axial widths corresponding to a single magnet row, segmented layers can correspond with and cover more than one row of magnet segments. Additionally, segmented layers 236, 238, 239, 240 can be fiber-reinforced composite hoops having primarily circumferentially-oriented fiber, so as to provide structural support to the magnet segments positioned beneath the hoop layer. In some instances, magnet segments may be subject to greater thermal expansion and structural vulnerabilities (e.g., during rotation of the rotor at high speed), requiring additional radial support to limit these liabilities.

In an illustrative example, the temperature at magnet 204a may be higher than the temperature at magnet 204c. The temperature differential between magnet rows 204a and 204c can result in magnet 204a experiencing thermal expansion larger than that experienced at magnet row 204c. Accordingly, segmented layer 236 positioned in alignment with magnet row 204a may expand more than segmented layer 239 positioned in alignment with magnet row 204c. Gaps may exist between the segmented layers 236, 238, 239, 240 so that the expansion of one segmented row does not interfere with another segmented layer. Additionally, expansion forces in layers 232, 234, positioned above the segmented layer, resulting from differential thermal expansion corresponding with one or more hoop segments, may be focused at or near the corresponding hoop segment, including the gap between the affected hoop segments. For instance, in the above example, thermal expansion forces transmitted to layers 232, 234 may be focused at the gap between adjacent hoop segments 236 and 238; 238 and 239; and 239 and 240.

A segmented layer can also be accomplished using a unitary sleeve layer. For example, a sleeve layer can possess strength characteristics that vary across the length of the sleeve layer. Variation in sleeve layer strength can be aligned with elements, such as magnet segment rows, so that areas of highest strength are aligned with areas of the rotor requiring greatest reinforcement or more subject to differential thermal expansion. For example, multiple layers of varying physical characteristics could be grouped to form a sleeve with band-like strength sections, with gaps between the sections exhibiting strength or thermal expansion characteristics different than the sections themselves. One way this may be accomplished is by fabricating sleeves with varied coefficients of thermal expansion (CTE). Additionally, in certain instances, the segmented layers 236, 238, 239, 240, or segmented hoops, aligned with magnet segment rows 204a, 204b, 204c, 204d, may be constructed of material with CTEs matched to the CTE of the magnet 204a, 204b, 204c, 204d positioned beneath it.

While FIGS. 2A, 2F, and 2G show examples of a rotor hub 202 with magnets 204 axially segmented (with segment boundaries formed in the circumferential plane along the axial body of the rotor hub 202), the magnets 204 can also be implemented as single member magnets, extending axially across the length of the hub body 202. Additionally, magnets can be segmented circumferentially (with segment boundaries formed in a radial-axial plane) as shown in 2E. Segmenting the magnets, however, can be advantageous as certain magnets may be more affordable and easier to implement as segmented pieces. Additionally, segmented magnets 204 can alter the electric and electromagnetic characteristics of the rotor and thereby be functionally desirable in some rotor applications.

FIGS. 2H-2P are cross-sectional views of example rotor hubs 202. Magnets 204, of uniform or non-uniform strength, can be mounted directly to the outer surface of the rotor hub 202 and/or to the rotor hub 202 via intermediate materials, for example, to electrically insulate the magnets 204 from the rotor hub 202, bond or improve bonding to the rotor hub 202, and/or other reasons. In certain instances, the intermediate material can include an adhesive (e.g., an acrylic adhesive and/or other adhesives), electrically insulating tape, a solder material, a reactive nanofilm, and/or another material. In certain instances an interstitial filler material is applied to the rotor 200 to fill spaces between the magnets 204 and/or the rotor hub 202. An example material, includes stainless steel putty (e.g., stainless steel putty made by ITW Devcon) and/or other materials. In certain instances, the rotor 200, prior to installation of the sleeve 212, can be dipped in or flooded with an epoxy resin to ensure all the gaps between the magnets 204, the rotor hub 202, and/or the end rings 214 are filled and further protect against fluid ingression.

In certain instances interstitial filler material may be injected into the rotor hub assembly while providing a vacuum within the hub assembly. For example, once magnet segments 204 have been mounted to the rotor hub 202, the magnets 204 and rotor hub 202 may be enclosed in a disposable sleeve (e.g., a polymer bag and/or other sleeve), and the sleeve may be sealed at both ends of the rotor hub assembly. The vacuum is operable to remove the air and/or other gases ("gases") within the sleeve, including gases residing in voids between the magnets 204 and/or the rotor hub 202. A pre-catalyzed low-viscosity thermosetting resin may be introduced into the disposable sleeve to penetrate the empty spaces in the rotor hub assembly. Upon curing of the resin, the disposable sleeve may be removed. Thereafter, manufacture of the rotor may be resumed, including wrapping a protective rotor sleeve 212 around the rotor hub assembly.

In some implementations, the rotor sleeve 212 itself may be used in lieu of the disposable sleeve of the previous example. Pluggable inlets may be provided on each of the end rings 214, allowing a vacuum pump to be connected to one end of the hub assembly and a high pressure pump to be connected to the other end. The vacuum pump vacates air from the hub assembly, sealed by the sleeve 212. With air removed from the inside of the hub assembly, the high pressure pump may inject the resin into voids in the hub assembly. The end ring inlets may be plugged and the resin cured to seal the hub assembly interior. Subsequent manufacturing operations may then be performed.

To facilitate filling the voids within the rotor hub assembly using the described or other techniques, the hub and/or the magnet segments may be provided with flow path channels to guide filler material into voids between the hub 202 and the magnet segments 204. FIGS. 2Q-2R illustrate examples of such features. For instance, FIG. 2Q shows a rotor hub assembly 201 including a rotor hub 202 with a plurality of magnet segments 204 mounted on the hub 202. The magnet segments 204 are each formed to take a geometry that results in flow path channels 258 being formed when the magnet segments 204 are mounted to the hub 202. These channels 258 may be aligned with those areas of the hub 202 and magnet segments 204 where voids are likely to appear, such as areas between adjacent magnet segments 204. In some instances, as shown in FIG. 2R, additional grooves 260 may be provided on the hub 202, in lieu of or in addition to the geometry of the magnet segments 204, to provide the flow paths 258.

The end rings of the assembly may also be used to guide the flow of filler material. As shown in FIG. 2S, an interior face of an end ring 214, to be set adjacent to the rotor hub, can be provided with an annular channel 262 operable to direct filler material around the rotor hub assembly and into voids or other flow path channels positioned around the rotor hub. In some implementations, an inlet 264 in communication with the channel 262 may be provided on the end ring 214. The inlet 264 may be used to couple one or more vacuum pumps or injection pumps to the end ring 214 to deliver and direct filler material into voids within the hub assembly.

The magnets' dimensions and orientation on the rotor hub 202 may serve to form substantially a cylinder of magnet segments around the hub 202. In some implementations, outer surfaces of the magnet segments may require grinding once the magnetic segments are mounted to the hub 202. Grinding the outer surfaces of the magnetic segments may be used to form the rotor hub 202 into a substantially uniform cylindrical outer surface. Additionally, while the magnets, once coupled to the rotor, may form a uniform cylinder, individual magnet segments 204a-t can vary in magnetic field orientation and magnitude as well as weight in order to achieve the desired electromagnetic, rotational and inertial rotor hub 202 profile.

Figure 2H:
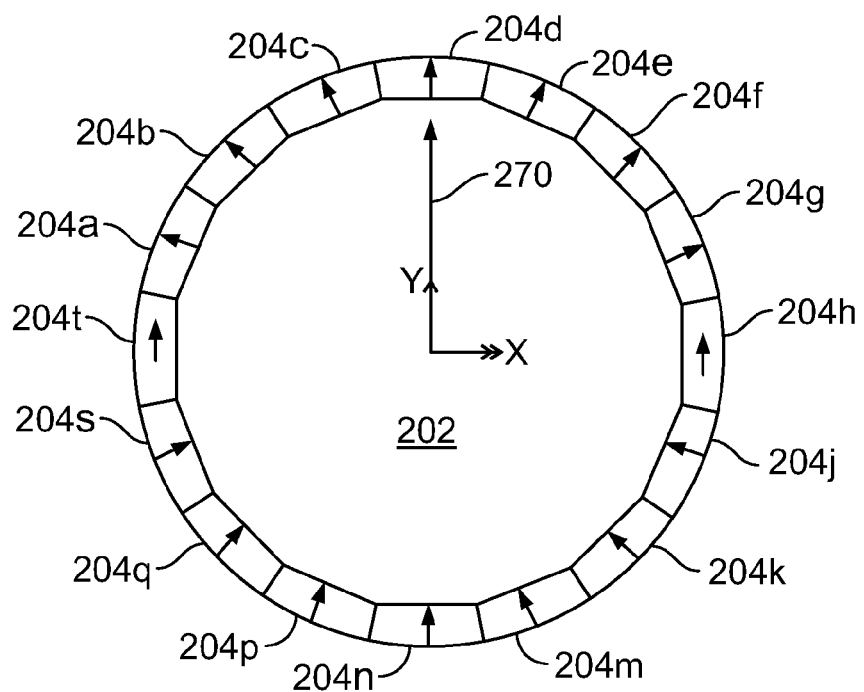
FIGS. 2H-2P are schematic cross-sectional views of different example rotors having segmented magnets, wherein the arrows associated with each magnet segment represent the respective magnet segment's north pole orientation.

FIG. 2H illustrates a cross-sectional view of one example rotor hub magnet configuration. In this example, sixteen circumferentially segmented magnets 204a-t are positioned around the circumference of the rotor hub 202. The geometry of the individual magnet segments 204a-t and the outer surface of the rotor hub 202 allow for the magnet segments 204a-t to be mounted directly to a rotor hub 202. As shown in FIG. 2H, the outer surface of the rotor hub 202 in certain instances may not be perfectly round, for example, the portion of the rotor hub 202 where magnet segments 204a-t are mounted may be a regular polygon with a number of equilateral sides equal to the number of magnet segments 204a-t to be mounted on the hub 202. FIG. 2H shows the outer surface of the rotor hub 202 having sixteen flat surfaces, running the axial length of the rotor hub 202, against which corresponding flat surfaces of the sixteen magnet segments 204a-t abut. The flat surfaces on the rotor hub 202 and the magnet segments 204a-t are normal to a radial line emanating from the center of the hub 202.

The magnet segments 204a-t can be arranged into a two pole configuration. For example, seven magnet segments 204a-g with magnetic fields directed substantially radially away from the center of the rotor hub 202 may serve as a base of a north pole of the rotor's magnetic configuration. Seven other magnet segments 204j-s can be positioned on the other side of the rotor hub 202, each magnet segment 204j-s having magnetic fields directed substantially radially toward the center of the rotor hub 202 serving as a base for a south pole of the rotor's magnetic configuration. A magnet segment 204 may be magnetized so that the magnetic field vector of the magnet segment is uniform. In other words, the magnetic field vector at any one point along a uniform magnetized magnet segment is parallel to the magnetic field vector at any other point along the magnet segment, as illustrated in FIG. 2T. In certain instances, the magnetic field vector at the center of the magnet segment is radial. As discussed in more detail below, in other instances, the magnetic field vectors can be normal to radial or arcuate having the same center as the rotor. Alternatively, as illustrated in FIG. 2U, a magnet segment 204 with a true radially-directed magnetic field possesses a magnetic field with magnetic field direction vectors that are each radial. In instances where the outer surface the magnet segment is an arc in the round outer surface of a circular rotor, the magnetic field direction vectors can be normal to the outer surface 268 of the magnet segment. In uniform magnetic segments, the magnetic field direction vectors can be configured to all be perpendicular to the mating flat surfaces of the magnet segment and rotor hub. In radial magnetic segments, the magnetic field direction vector at the center line of the magnetic segment can be configured to be perpendicular to the mating flat surfaces of the magnet segment and rotor hub.

Returning to FIG. 2H, disposed between the two poles are interpole magnet segments 204h, 204t. Interpole magnet segments 204h, 204t can be provided to adjust the magnetic flux distribution of the rotor 200, transitioning the magnetic field between the two poles. In the implementation pictured in FIG. 2H the interpole magnet segments 204h, 204t possess geometries similar to the radial magnet segments 204a-g, 204j-s, the interpole magnet segments having magnetic fields directed normal to these radial fields, or tangent to circumference of the rotor 200.

The arrangement of permanent magnet segments on the rotor hub 202 can result in a net magnetic pole center vector 270 for the rotor 200. In the example of FIG. 2H, the magnetic pole center has a direction vector component centered on magnet segment 204d, the geometric center of the rotor's north pole. The rotor illustrated in FIG. 2H has a regular pole center. The pole center 270 of the rotor 200 illustrated in FIG. 2P is also regular. As illustrated in FIG. 2P, the pole center vector 270 is aligned between magnet segments 204b and 204c, this interface representing the geometric center of the top pole in rotor 200. Where the magnetic pole center 270 is aligned with the geometric midpoint of the array of magnet segments establishing a north (or south) magnetic pole, the pole center is regular. FIG. 2K, on the other hand, illustrates an example of a rotor with an irregular pole center 270. The geometric center of rotor 200 in FIG. 2K, is the arcuate midpoint of magnet segment 204d. As illustrated, pole center 270 in FIG. 2K is not aligned with the geometric center of the rotor. Depending on the design of the stator, and the objectives for the electric machine, it can be desirable to implement rotors with either a regular or irregular pole center vector.

Figure 2I:
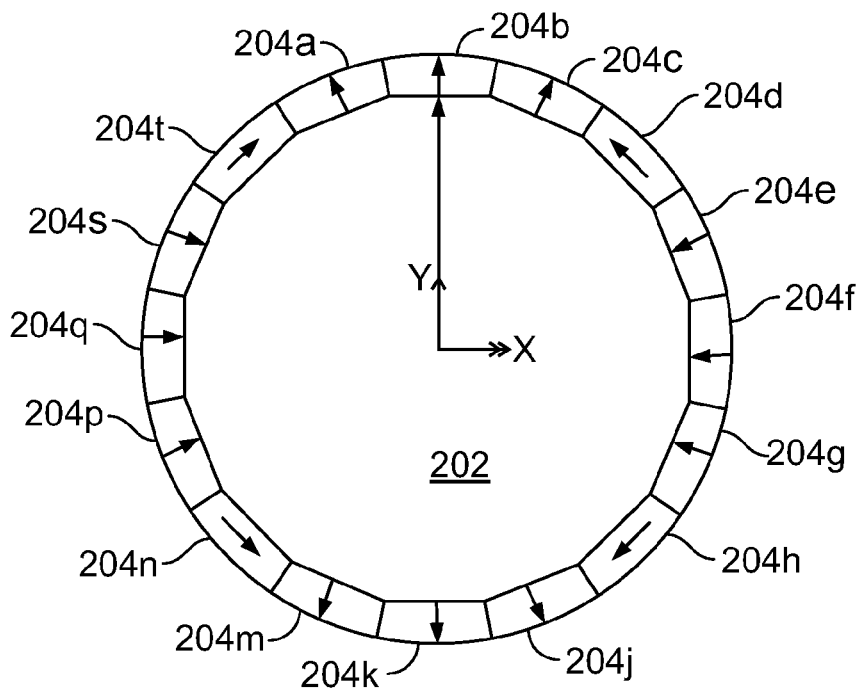

FIG. 2I illustrates a cross-sectional view of another rotor magnet configuration. The structural dimensions of the rotor magnet configuration of FIG. 2I can be substantially similar to the structural dimensions of the rotor magnet configuration of FIG. 2H. The configurations of FIGS. 2H and 2I can have the same number of magnet segments, the magnet segments having substantially identical physical dimensions. However, while FIG. 2H illustrates an example two-pole rotor design, FIG. 2I illustrates an example four-pole design. The first pole of FIG. 2I includes magnet segments 204a, 204b, 204c, the second pole includes magnet segments 204e, 204f, 204g, the third pole with magnet segments 204j, 204k, 204m, and the fourth pole with 204p, 204q, 204s. At least one interpole magnet segment 204d, 204h, 204n, 204t can be provided for each pole in the configuration, the interpole magnet segments 204d, 204h, 204n, 204t positioned between two adjacent poles. Interpole magnet segments 204d, 204h, 204n, 204t can have magnetic fields directed approximately normal to the radial fields of the remaining magnet segments. In certain instances, half of the interpole magnet segments 204h, 204t can have magnetic fields directed in the clockwise direction, the other interpole magnet segments 204d, 204n can have fields directed in the counter-clockwise directions.

Figure 2J:
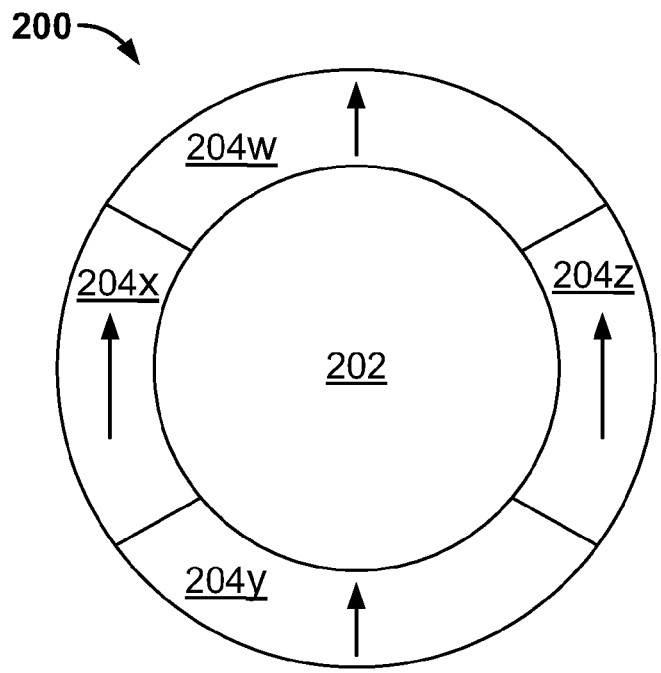
Figure 2K:
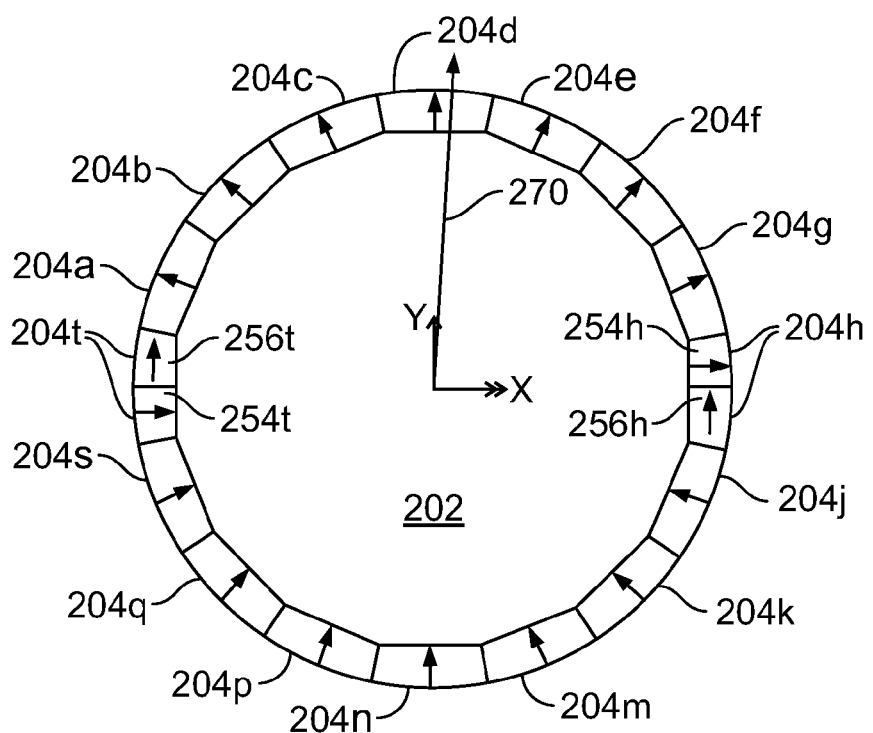

While FIGS. 2H and 2I are each implemented with sixteen magnet segments per row (or sixteen hub facets and equivalently shaped magnet segments), other rotor designs employing permanent magnet segments may also be provided. For example, more or fewer than sixteen facets can be employed, including facets with varying geometries. For example, geometries can be employed, such as those described above in connection with FIGS. 2Q and 2R, providing flow path channels between adjacent magnet segments. In some instances the outer surface of the magnet segment can be flat, as opposed to round as in FIGS. 2H and 2I. The magnet segment's interface with the rotor hub can also affect its geometry (as in the case of a facet, as shown, for example, in FIGS. 2G-2R). Indeed, alternative configurations, numbers of facets, and geometries can be employed as substitutes for other rotor designs with comparable magnetic profiles. For example, a substitute for the two-pole rotor illustrated in FIG. 2H can be achieved using only four circumferential magnet segments mounted to the rotor hub 202, as illustrated in FIG. 2J. Two pole magnet segments 204w, 204y can be employed for the north and south poles of the rotor, with two, additional interpole magnet segments 204x, 204z disposed between the magnet segments 204w, 204y. Given that the pole segments 204w, 204y are the primary magnetic segments for the rotor 200, some implementations, including the example illustrated in FIG. 2J, may provide for polar segments 204w, 204y with longer arcuate spans than the transitional interpole magnet segments 204x, 204z. Additionally, the outer surfaces of the magnet segments, when mounted on the rotor hub 202, can form a cylindrical outer surface of the rotor 200, as also illustrated in the sixteen facet example of FIG. 2H. While the four magnet segment rotor of FIG. 2J has two poles, as in FIG. 2H, the FIG. 2J rotor may have a magnetic profile and performance characteristics distinct from those of the sixteen facet rotor of FIG. 2H. Additionally, other configurations, employing the principles illustrated in the examples of the FIGS. 2H and 2J, are within the scope of the disclosure, allowing several facet-based design options tailored to the economics and performance considerations of the designer.

FIG. 2K is a cross-sectional view of yet another example two-pole magnet configuration. The two-pole magnet configuration example of FIG. 2K can employ interpole magnet segments 204h, 204t utilizing split-interpole construction. Each interpole magnet segment 204h, 204t can be constructed of two separate magnet pieces 254, 256, bonded together to form a single magnet segment. Radial magnet segment piece 254 can be a magnet with a radially-oriented magnetic field. Magnet segment piece 254h belonging to interpole magnet segment 204h can have a radial magnetic field directed away from the center of the rotor hub 202. Magnet segment piece 254t belonging to interpole magnet segment 204t can then have a radial magnetic field directed toward the center of the rotor hub 202. Normal magnet segment pieces 256h, 256t can be bonded to radial magnet segment pieces 254h, 254t to form respective interpole magnet segments 204h, 204t. Normal magnet piece 256h, bonded to radial magnet piece 254h, can have a magnetic field directed normal to the radial magnetic field of piece 254h, and oriented in a counter-clockwise direction. Normal magnet piece 256t, bonded to radial piece 254t, can have a magnetic field normal to the radial direction, the field of normal piece 256t oriented in the clockwise direction. Magnet pieces 254, 256 can be constructed of the same or dissimilar magnetic materials. Magnet pieces 254, 256 can be equal sizes, or alternatively, one magnet piece can be larger than the other. Selecting the materials of the magnet pieces 254, 256 as well as the size of one piece relative the other can be done to engineer the magnetic characteristics of the interpole magnet segment 204h, 204t, allowing rotor designers to refine the magnetic characteristics of the interpole magnet segments 204h, 204t and thereby modify some magnetic flux characteristics of the rotor.

Figure 2L:
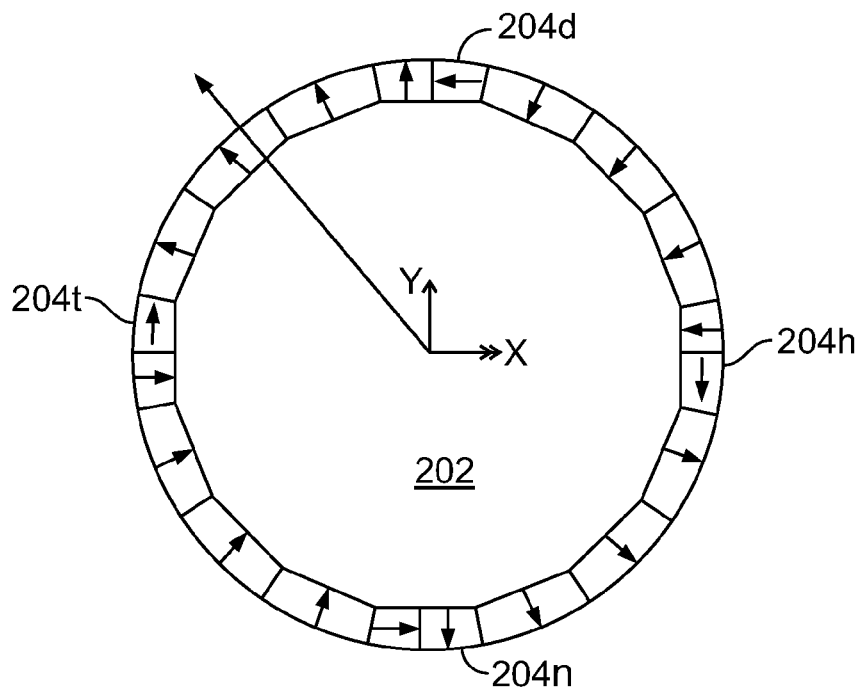

As shown in FIG. 2L, split-interpole magnet segment designs similar to that described above with the example of FIG. 2K can also be employed in magnet configurations with more than two poles. For example, split-interpole magnet segments 204d, 204h, 204n, 204t can be employed in four-pole magnet configurations similar to, for example, the four-pole magnet configuration described in FIG. 2I.

Figure 2M:
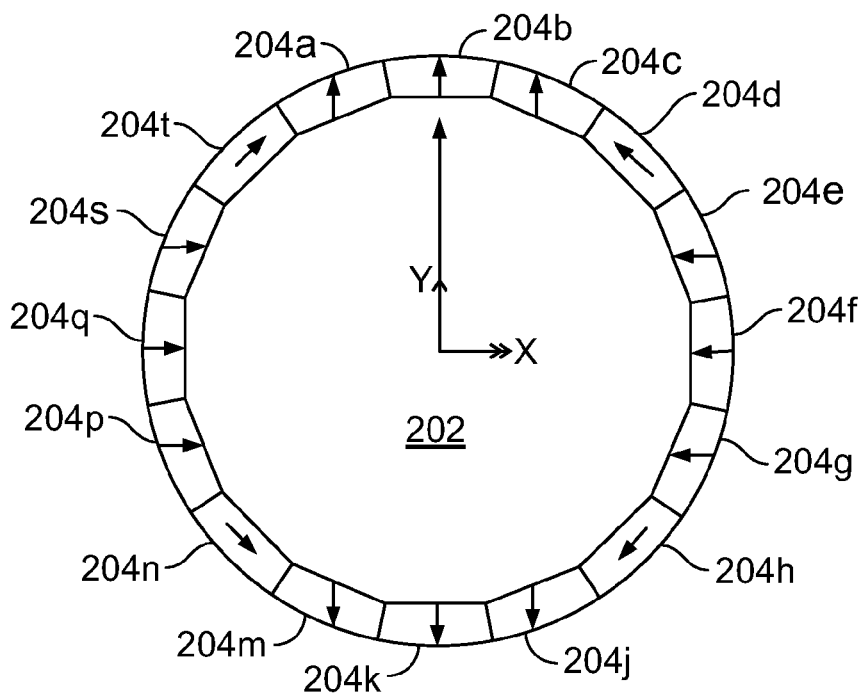
Figure 2N:
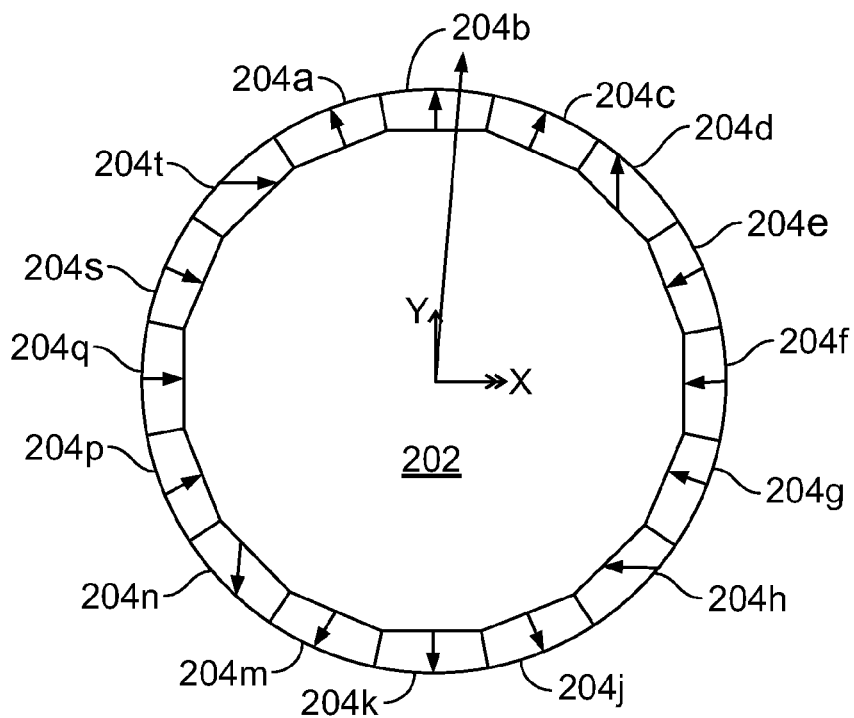

Rotor hub 202 magnet configurations can employ more than one interpole magnet segment per pole. The rotor hub 202 examples illustrated in FIGS. 2H-2I can form the base for building numerous, varied magnet configurations by mounting varied combinations of modular magnet segments 204a-t on the hub 202 with varying magnetic field orientations, magnetic material characteristics, and material densities. For example, the four-pole configuration example of FIG. 2I can be modified by replacing radially-oriented magnet segments 204*a*, 204*c*, 204*e*, 204*g*, 204*j*, 204*m*, 204*p*, 204*s* with non-radial magnet segments, as shown in FIG. 2M, so that adjacent magnet segments 204*a-c,* 204*e-g*, 204*j-m*, 204*p-s* possess parallel-oriented magnetic fields. As shown in FIG. 2N, other implementations may alter the four-pole configuration of FIG. 2I, exchanging the normal-oriented interpole magnet segments of FIG. 2I with interpole magnet segments 204*d*, 204*h*, 204*n*, 204*t* possessing magnetic fields oriented with directional vectors approximating the vector sum of the two magnet segment pieces of the split-interpole magnet segments of FIG. 2L.

Figure 2O:
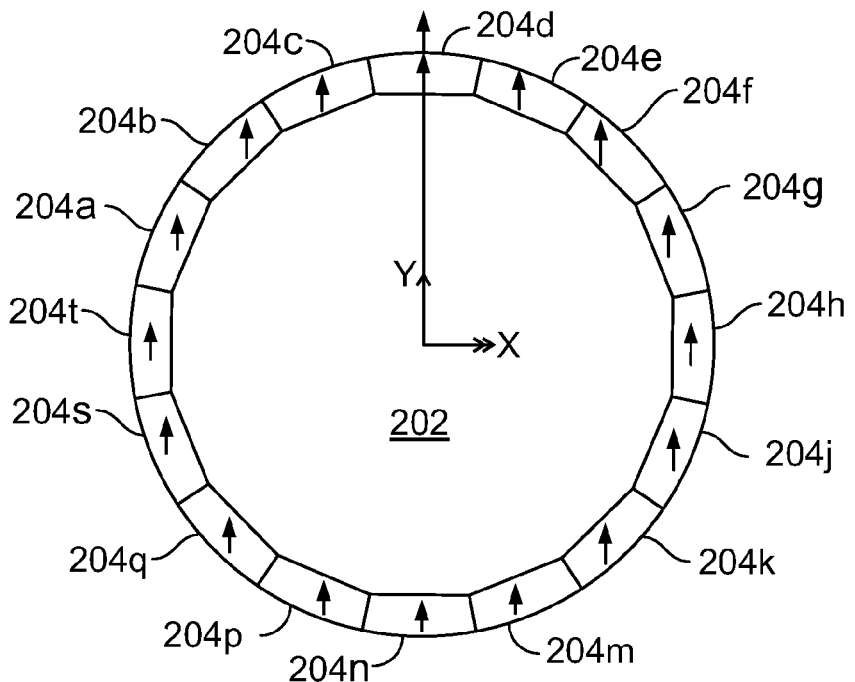
Figure 2P:
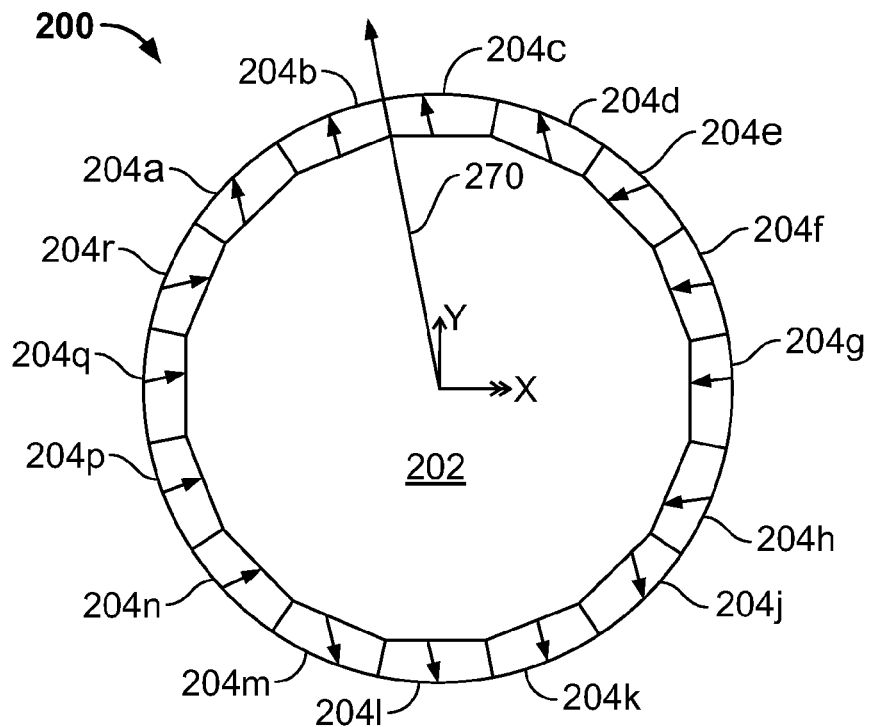
Figure 2Q:
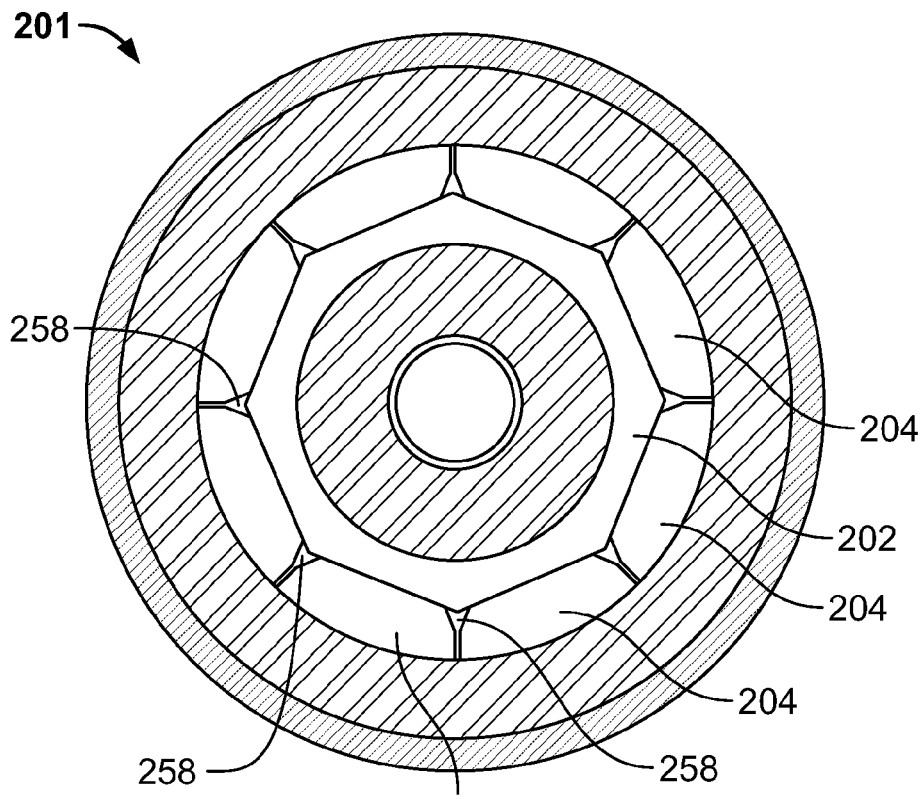
FIG. 2Q is a side view of an example rotor showing a plurality of flow path channels formed by segments of the rotor magnets.
Figure 2R:
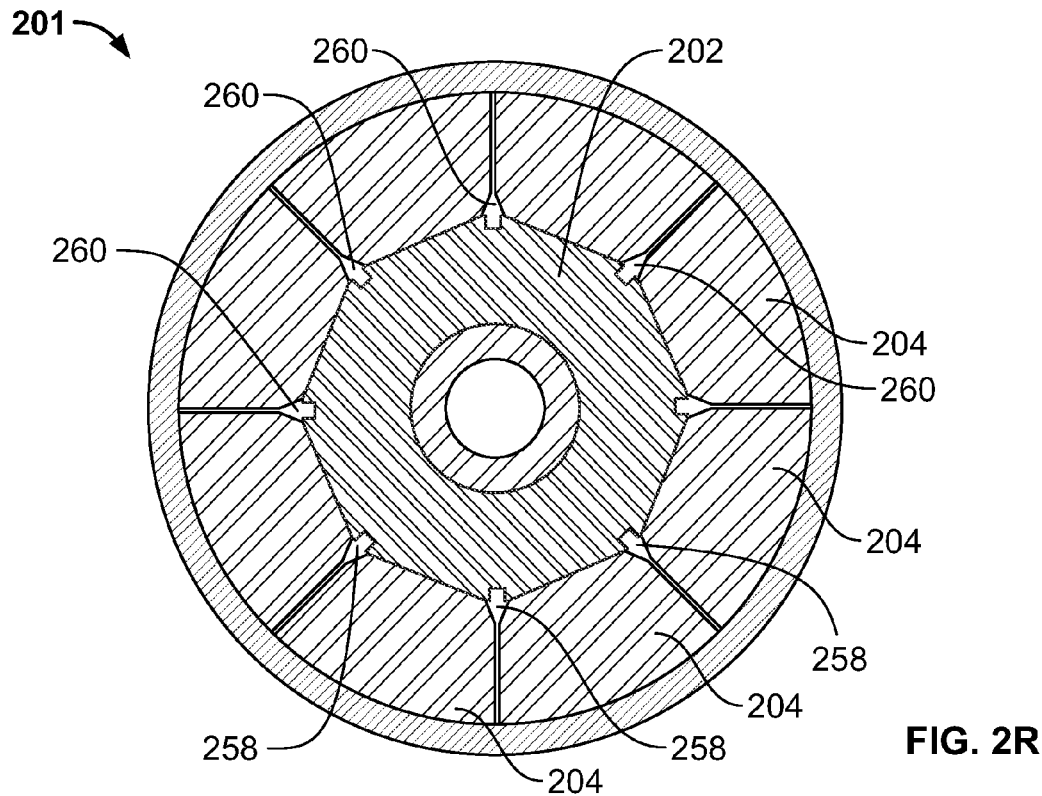
FIG. 2R is a side view of another example rotor having grooves formed in the rotor to facilitate introduction of a filler material thereinto.
Figure 2S:
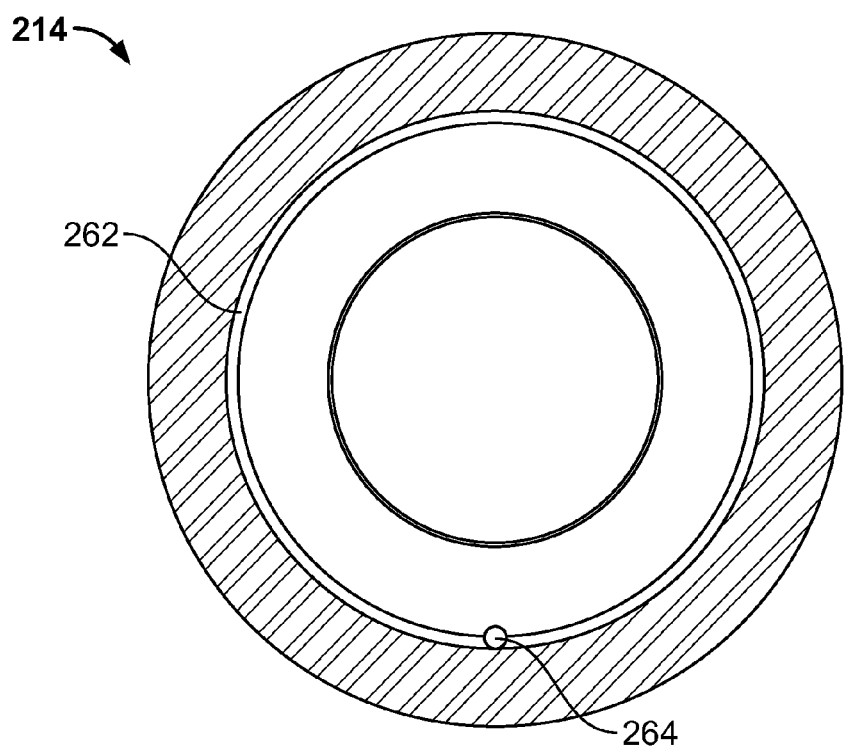
FIG. 2S is a side view of another example rotor having an annular channel 264 formed therein along with an inlet formed in a end ring thereof.
Figure 2T:
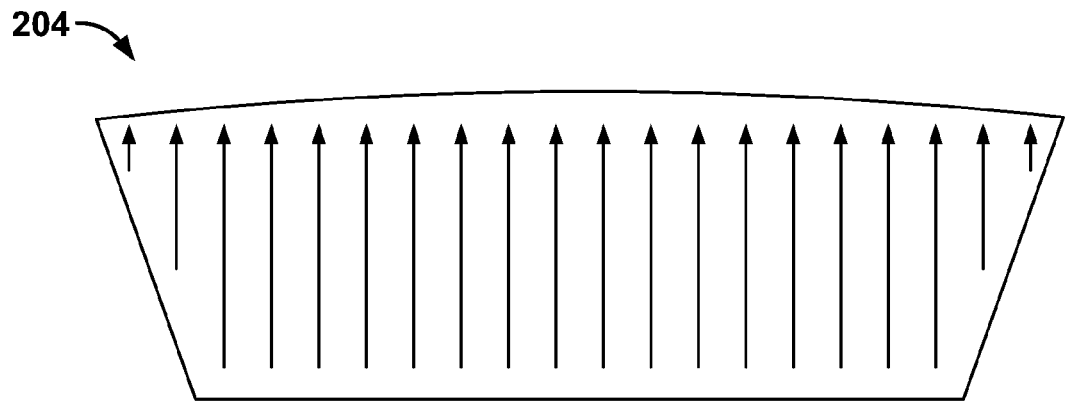
FIG. 2T is a cross-sectional view of a magnet segment or magnet segment row having uniform radial magnetization.
Figure 2U:
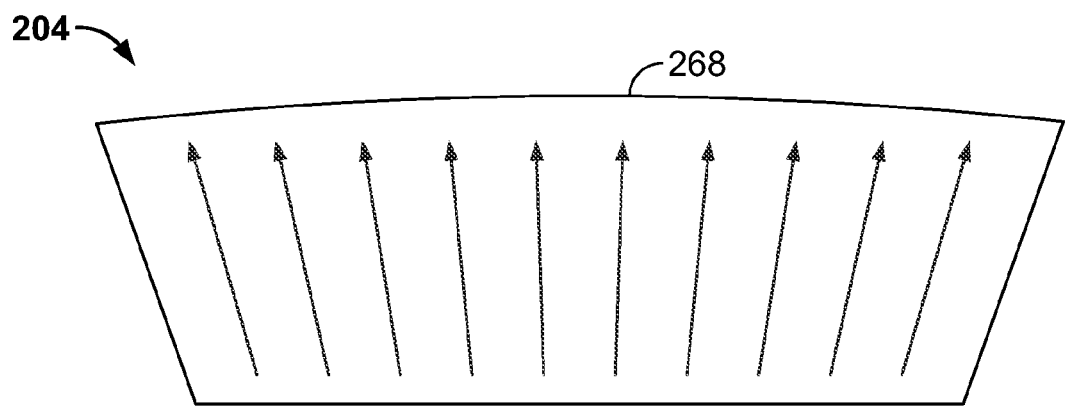
FIG. 2U is a cross-sectional view of a magnet segment or magnet segment row having true radial magnetization.

Yet another example illustrating the broad compatibility of the rotor hub 202 and modular magnet segments 204*a-t*, is shown in FIG. 2O. A two-pole magnetic configuration with uniform magnetization can be constructed with magnet segments 204*a-t* constructed so that the magnetic field of each magnet segment is oriented parallel to and in the same direction as every other magnet segment's magnetic field when all magnet segments 204*a-t* are mounted on the rotor hub 202. Depending on the configuration of the cooperating stator in the electric machine, substantially uniform rotor magnetizations, such as the two pole design of FIG. 2O, can provide more efficient electromagnetic power conversion In addition to the two pole, uniform magnetization design of FIG. 2O, four pole uniform rotor designs are attainable using the facet-based approach described. For example, in FIG. 2P, a sixteen facet rotor is provided. In the example of FIG. 2P, the first pole includes magnet segments 204*a*, 204*b*, 204*c*, and 204*d*. The magnetic field direction vectors of each of the magnet segments in this first pole, when mounted to the rotor hub 202 are parallel to the magnetic field direction vectors of the others magnet segments in the pole. Such is also the case in the other three poles of the rotor example of FIG. 2P. A second pole can include magnet segments 204*j*, 204*k*, 204*l*, and 204*m*. The second pole magnet segments in this example, have magnetic field direction vectors parallel to the magnetic field direction vectors of the first pole, but oriented in the opposite direction to the first pole magnet segments' magnetic fields. Third and fourth poles are provided, each with magnetic field direction vectors orthogonal to the magnetic fields of poles one and two. The third pole can include magnet segments 204*e*, 204*f,* 204*g*, 204*h*. A fourth pole can include magnet segments 204*n*, 204*p*, 204*q*, 204*r*. The magnetic field direction vectors of the third and fourth poles are also parallel and opposite to one another.

The examples illustrated in FIGS. 2H-2R and discussed above are not intended to limit the possible magnetic configurations contemplated for the rotor hub 202. Indeed, several additional implementations and magnet configurations can also be implemented to meet a wide array of magnetic and structural characteristics for particular rotor applications. The facet-based rotor concepts described above can be used to develop a versatile variety of potential rotor configurations. Indeed, where a common rotor hub geometry is employed by a rotor manufacturer, common magnet segment geometries can be employed across rotor designs, allowing the designer to build nearly limitless rotor variations by interchanging magnet segments having the appropriate magnetic field vectors. Additionally, where rotor hubs 202 are employed allowing for magnet segments with equal arcuate span, fabrication of the magnet segments and the required magnet segment combinations can be simplified, in that only magnet segments of a single geometry need to be fabricated. Additionally, in designs employing magnet segments with the fewest different magnetic profiles, the number of different magnet segments that need to be manufactured and stocked can be further minimized, allowing rotor designers to provide a range of rotor products while minimizing supply chain and manufacturing costs, among other advantages.

Figure 3A:
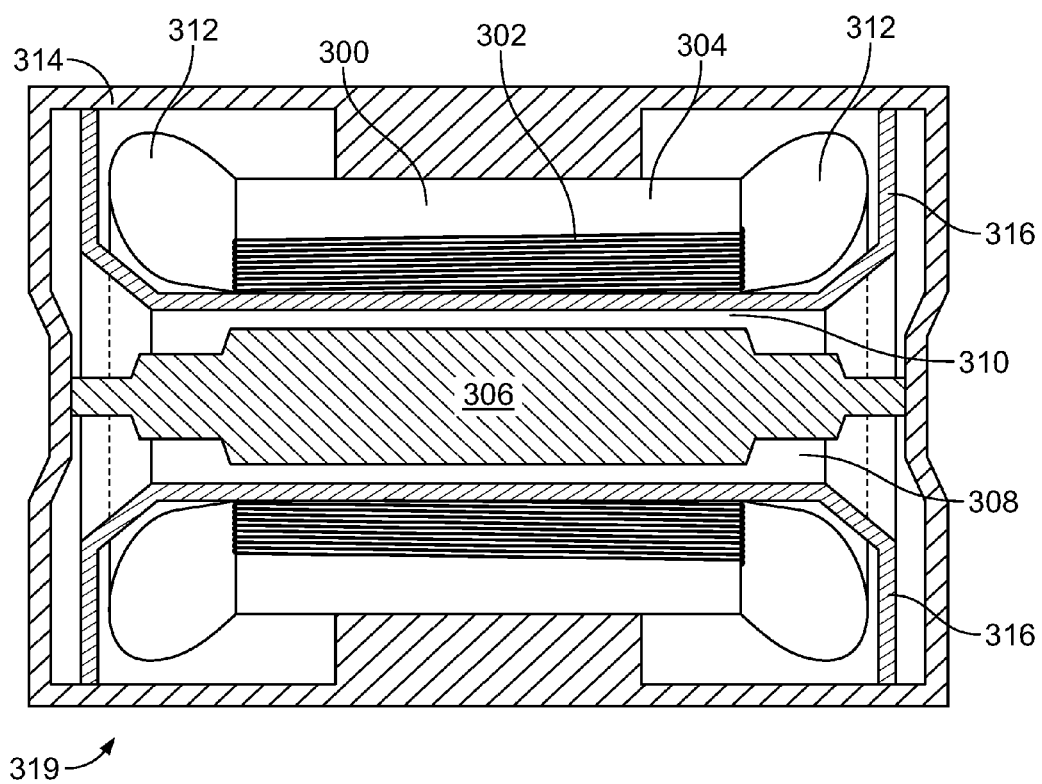
FIG. 3A shows a cross-sectional view of an example electric machine.

Referring now to FIG. 3A, an example electric machine 319 is shown. The electric machine 319 is similar to and may be used as the electric machine 102*a* shown in FIG. 1B. The electric machine 319 includes a housing 314 defining an interior 308. A rotor 306 is rotatable relative to the stator 300 and disposed in the interior 308 thereof. There is a gap 310 between the stator 300 and rotor 306. The example stator 300 includes an electromagnetic winding 302 mounted on a cylindrical stator core 304. The stator 300 is suitable for use as stator 108 above. Some implementations of the winding 302 can be configured for the electric machine to function as a synchronous, AC electric machine. Some implementations of the winding 302 can include two-pole windings, forming a three phase electromagnet. Other implementations are possible as well, depending on the electric machine application, including four-pole windings, single-phase windings, and other winding configurations.

The winding 302 can be constructed by winding cable or formed conductors through stator core slots to form the winding loops or coils. The stator core 304 can be constructed of metallic, laminated plates, bonded together to form the core structure. The materials used in stator core 304 plates can be selected so as to adjust the electromagnetic flux characteristics of the winding 302 wound around the core slots. The core material can be selected also by considering the material used in the cable of the winding, so as to achieve a desired electromagnetic stator profile. For example, copper-based, insulated cables can be used for the winding 302. The cable can be wound around a core 304 built of steel plates laminated together with a silicon-based, low-loss laminate. It is contemplated that the slots of the stator core 304, as described in more detail below, can be implemented using a variety of slot shapes and sizes. The selection of the slot geometry can be based on the cable type (or types) used in the windings. Additionally, the winding 302 can be constructed as form-wound or random-wound coils. In certain instances, the windings 302 result in winding end turns 312 positioned on the axial ends of the stator core 304. As set forth in more detail below, various end turn winding techniques can be used to provide for end turns 312 with the particular structural and electromagnetic characteristics desired for a certain particular stator design.

Some implementations of the stator 300 can be adapted for subsea and/or corrosive environment operation. For example, certain instances of the stator 300 can be sealed or otherwise protected from exposure to heat transfer fluids, process fluids, other corrosive or harmful matter and/or other foreign matter by providing a protective barrier 316 around the stator 300 or otherwise sealing the stator 300. For example, certain instances of the electric machine system may provide for a "flooded" system. A protective barrier 316 can be provided to guard against corrosion of elements of the stator 300 while allowing the fluid provided in the electric machine system to cool the stator 300. Other implementations may provide a coating, or other seal on the stator, so as to seal the stator 300 from exposure or corrosion. For example, some or all of the stator can be coated or treated for corrosive resistance with epoxy, polyetheretherketones, ethylene chlorotrifluoroethylene copolymer and/or other treatments. Some implementations of stator 300 can be provided with protective coverings that provide rigid structural support as well as protection.

Figure 3B:
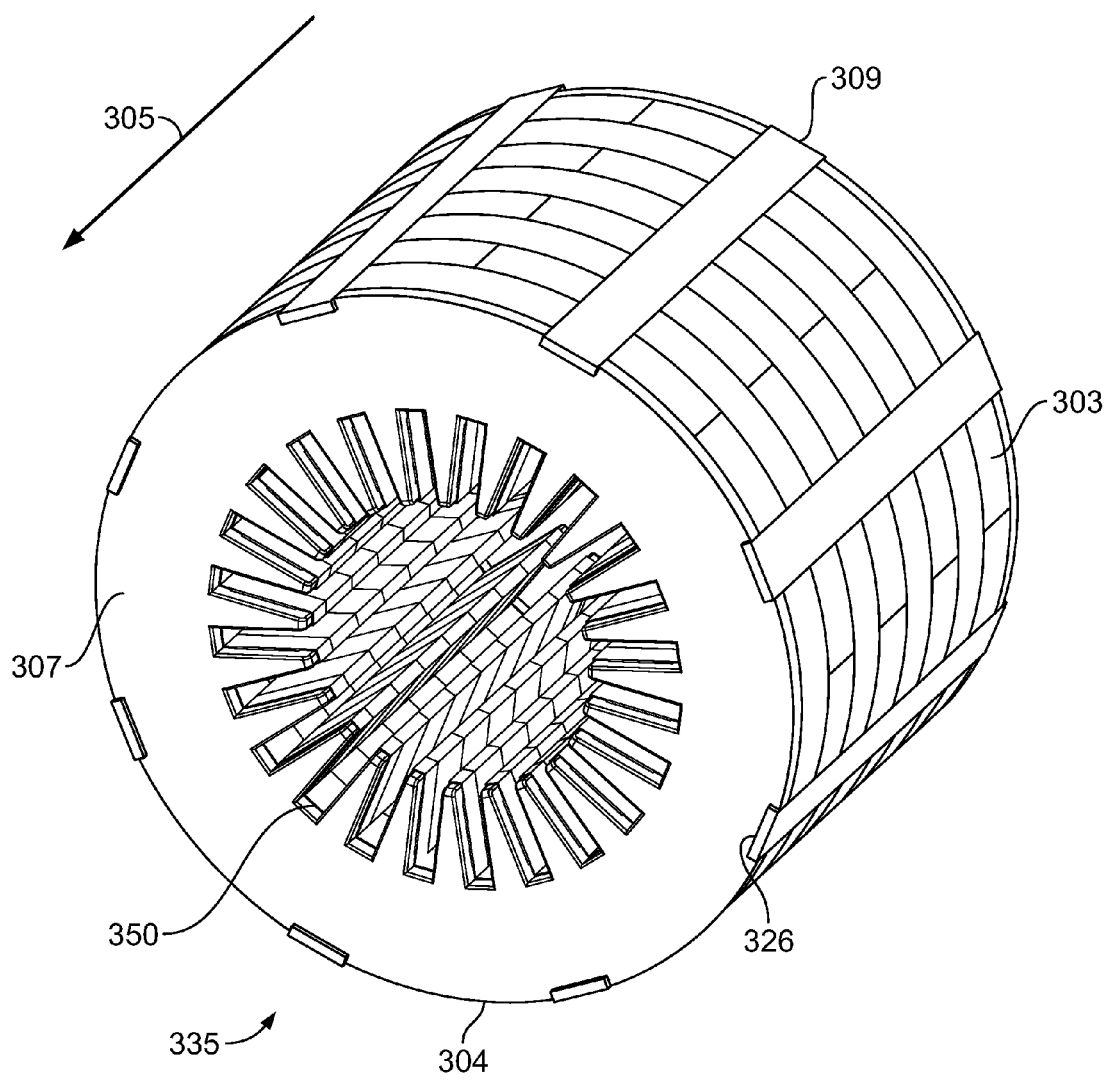
FIG. 3B shows a perspective view of an example stator core for use in an electric machine.

The stator, such as the stator shown in FIG. 3A, may be formed from a stator core and windings 302 extending through the stator core. An example stator core 335 is shown in FIG. 3B. The stator core 335 is formed from a plurality of adjacent yokes 303 (i.e., a stator stack) extending in a longitudinal direction 305 bounded at opposing ends by end plates 307. Further, a plurality of stator bars 309 extend in the longitudinal direction 305 and are operable to axially, radially and circumferentially align the yokes 303. A plurality of teeth 301 are retained within slots or channels formed by the yokes 303, which is discussed in more detail below. See, e.g., FIG. 3G.

Figure 3C:
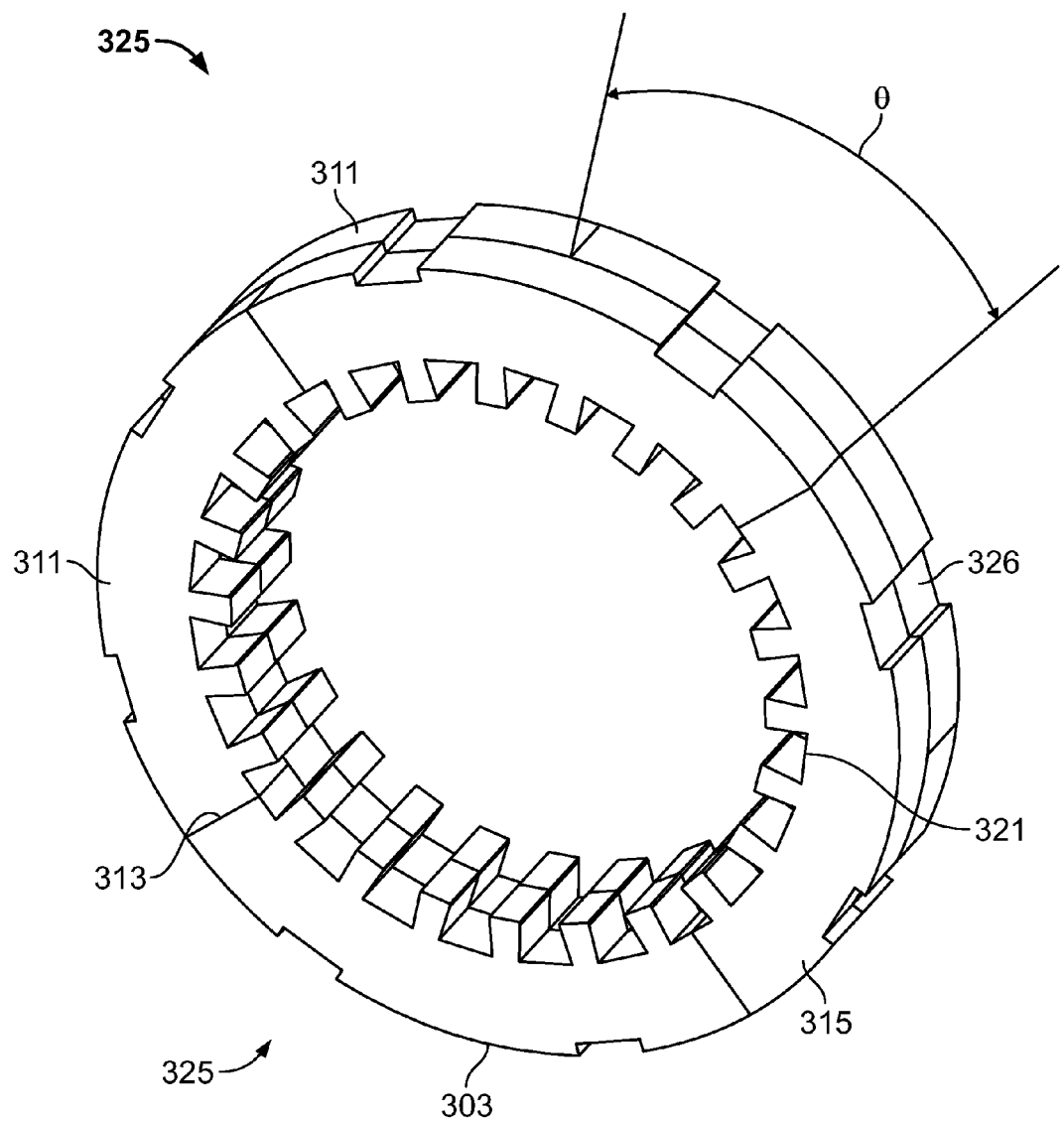
FIG. 3C shows two adjacent yoke portions formed, each yoke portion formed from a plurality of individual portions.

FIG. 3C illustrates a stator stack 325 formed from a pair of adjacent yokes 303. The stator stack 325, shown without stator teeth and electromagnetic windings, is discussed in more detail below. According to some implementations, a stator 300 may include a stack of eight yokes 303. Other implementations, though, may include additional or fewer yokes 303. One or more of the yokes 303 may be segmented. That is, one or more of the yokes 303 may be formed from a plurality of arc-shaped segments 315. In some implementations, all of the yokes 303 are segmented.

Figure 3D:
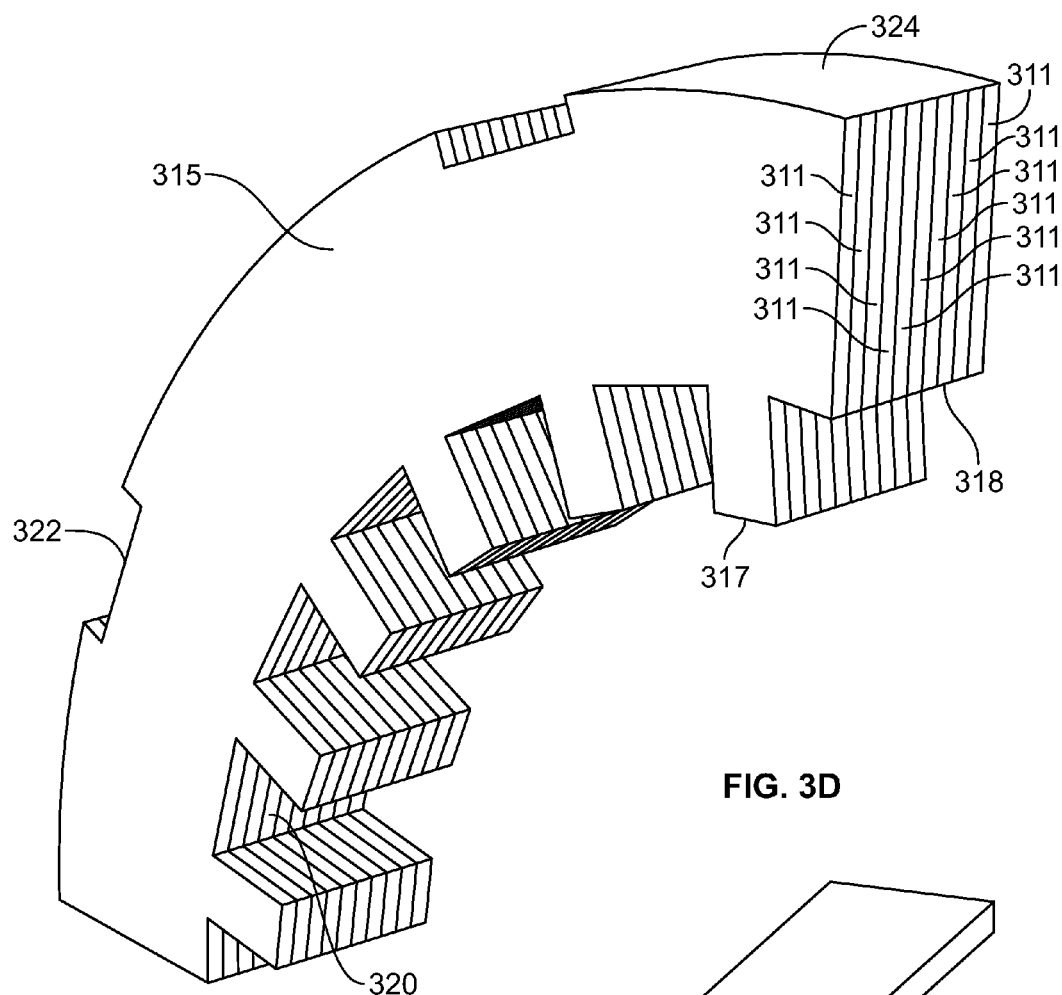
FIG. 3D shows an example portion used to form part of the yoke portions of FIG. 3C.

As shown, the yoke 303 is formed from four segments 315 and, thus, the yoke 303 is divided into quadrants. However, in other instances, the yoke 303 may be formed from more or fewer segments 315. An example segment 315 is shown in FIG. 3D in which the segment 315 is formed from a plurality of laminations 311. The illustrated example segment 315 is formed from ten laminations 311, although other implementations may be formed from additional or fewer laminations 311. In some implementations, the laminations 311 may be formed from steel, such as low-loss silicon steel. In other implementations, the laminations 311 may be formed from different types of steel or other types of metals, alloys, composites, or other types of suitable materials. Laminations 311 may be bonded together chemically or mechanically. For example, the laminations 311 may be bonded together with an adhesive. Alternately, the laminations 311 may be mechanically coupled by interlocking the laminations 311 with each other. In some instances, a portion of one lamination 311 may protrude into an adjacent lamination 311. Further, in some implementations, some laminations 311 may interlock with adjacent laminations 311 while other laminations 311 do not interlock with other laminations 311.

Each segment 315 includes a plurality of radially inward extending protrusions 317. The protrusions 317 define a plurality of first notches 320 formed along an interior periphery 318 of the segment 315. As shown in the illustrated example, each segment 315 includes six protrusions 317, although, in other instances, each segment 315 may include more or fewer protrusions 317 defining more or fewer first notches 320. As shown in FIG. 3C, the first notches 320 align to form at least a portion of tooth channels 321 that accept a tooth 301 (described in more detail below). Each segment 315 also includes a plurality of second notches 322 formed on an outer perimeter 324 of the segment 315. As illustrated in FIG. 3C, the second notches 322 align to form at least a portion of a channel 326 into which a stator bar 309 is retained, as illustrated in FIG. 3B. The stator bar 309 retained in the channel 326 provides alignment and structural support to the assembled stator 300.

Figure 3E:
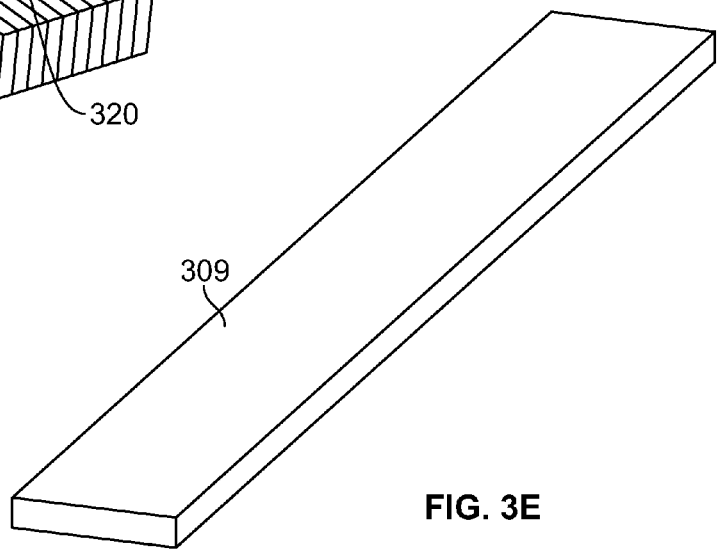
FIG. 3E shows an example stator bar of the example stator of FIG. 3B used to provide alignment and rigidity to the stator.

An example stator bar 309 is illustrated in FIG. 3E. The illustrated stator bar 309 is a slender member having a constant rectangular cross-section. As also illustrated in FIG. 3C, the channels 326 also have a constant rectangular cross-section to accept and retain the stator bars 309. However, the stator bar 309 shown in FIG. 3E and the channel 326 shown in FIG. 3C are merely examples, and the stator bars 309 and channels 326 may have other cross-sectional shapes.

Referring again to FIG. 3C, the yoke 303 is assembled such that joints 313 formed at adjacent ends of the segments 315 are offset from each other so that joints 313 in adjacent yokes 303 do not align. In other implementations, though, adjacent joints 313 may align. As shown, the angular offset (θ) of joints 313 in adjacent yokes 303 is 45°, although other angular offsets may be used. In certain instances, the yokes 303 may be welded together, bonded together with an adhesive, assembled with fasteners, interlockingly coupled, and/or assembled in another manner. Still further, the assembled stator 300 and/or the stator core 335 may be coated with polyetheretherketone ("PEEK"), ethylene chlorotrifluoroethylene copolymer ("ECTFE"), oxide coating and/or another material.

Figure 3F:
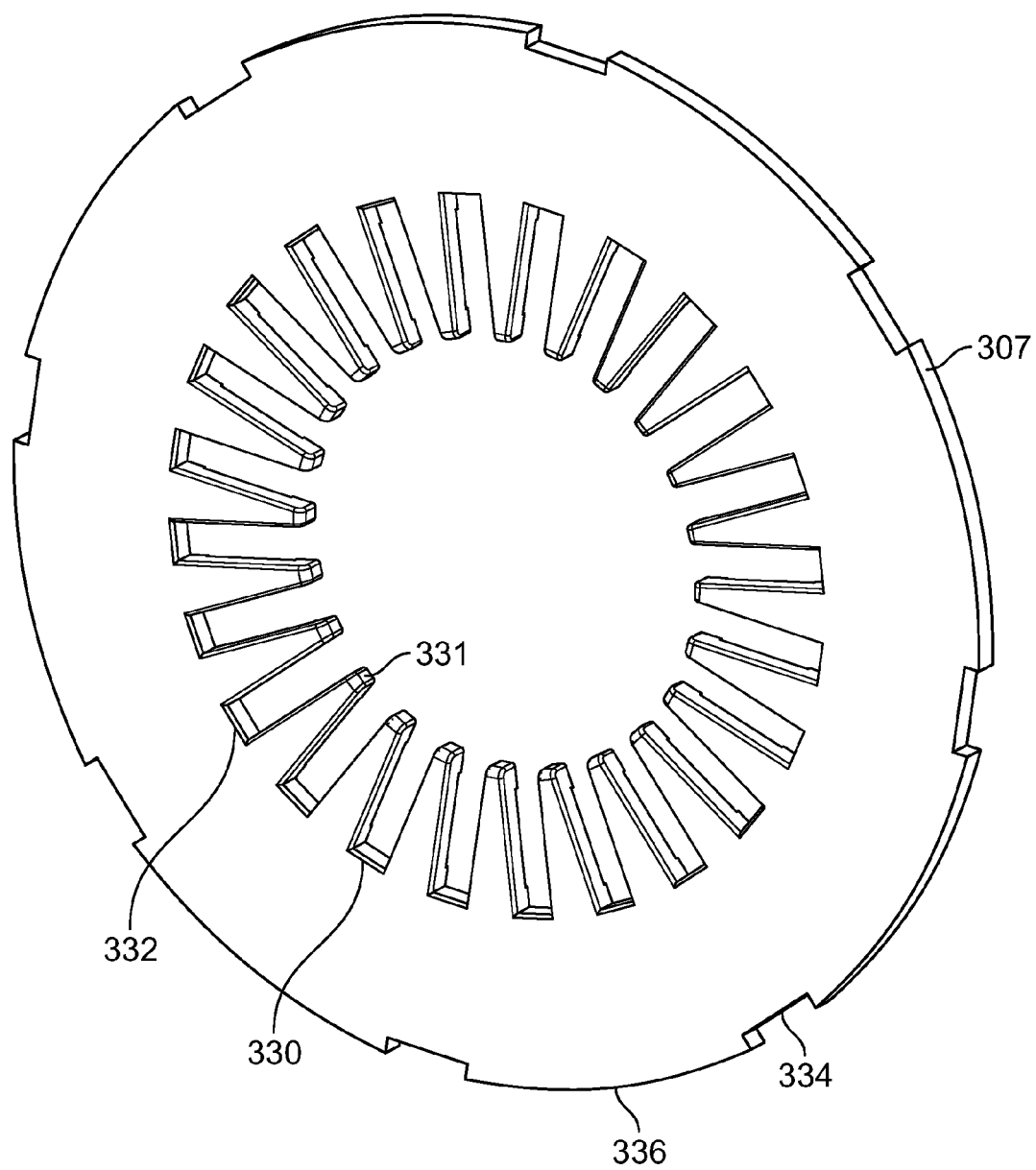
FIG. 3F is an example end plate of the example stator of FIG. 3B.
Figure 3G:
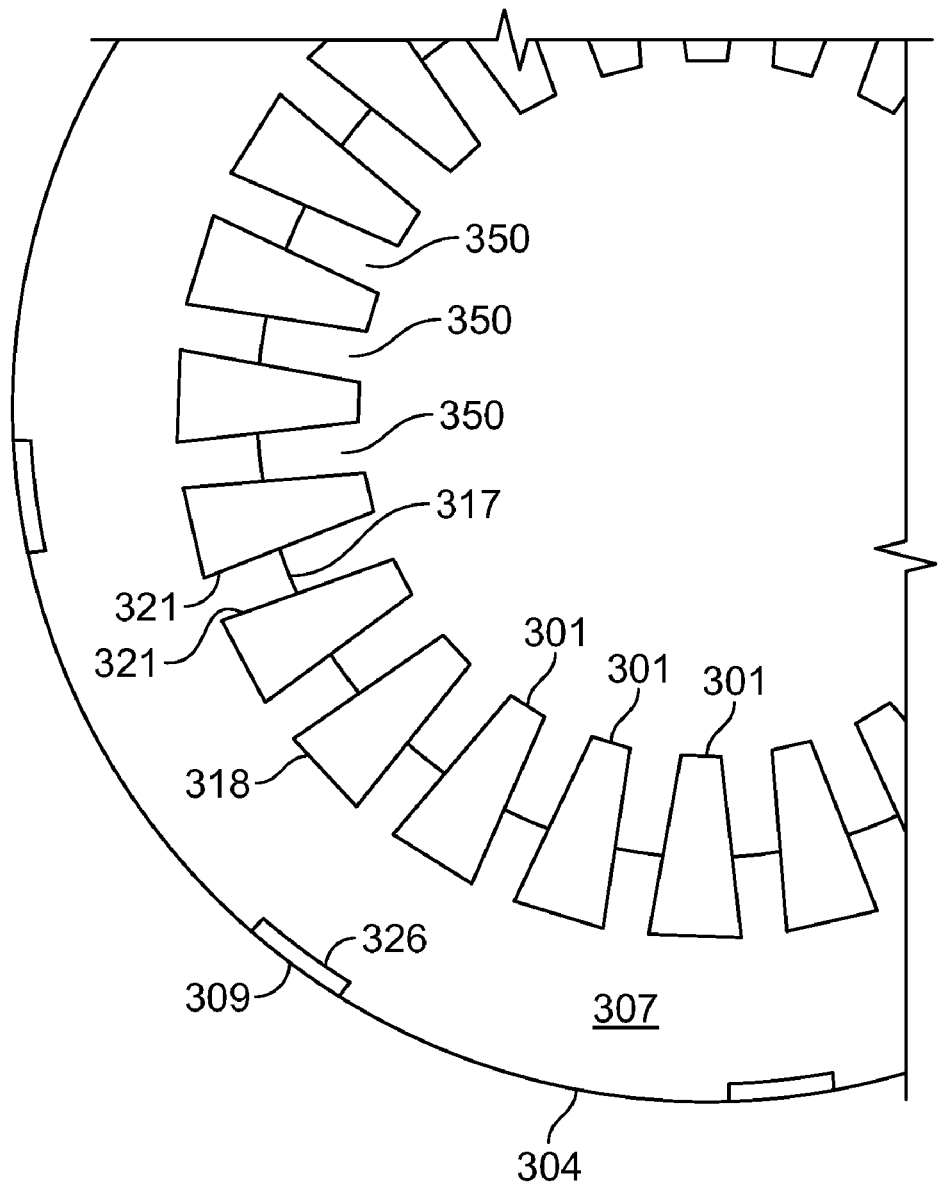
FIG. 3G is a partial detail view of an end of the example stator of FIG. 3B.

FIG. 3F shows an example end plate 307 of the stator 300. The end plates 307 are disposed at opposing ends of the of the assembled stator core 335. In certain instances, the end plate 307 may be single, continuous plate. The end plate 307 also includes a plurality protrusions 331 formed in an interior periphery 332 of the end plate 307. The protrusions 331 form first notches 330 therebetween. The end plate 307 also includes a plurality of second notches 334 formed in an outer periphery 336 of the end plate 307. When combined with the stator stack and teeth 301, protrusions 331 overlay the teeth 301 that are retained in the tooth channels 321. The first notches 330 align with channels formed between the teeth 301, i.e., winding channels 350, described below. The second notches 334 align with the second notches 322 to form the channels 326. In certain instances, as shown in FIG. 3G, the tooth channels 321 may have the shape of a dovetail-type joint such that the teeth 301 and associated tooth channels 321 interlock so that the teeth 301 are locking retained therein. However, the channels 321 may form any shape that retains the teeth 301. Further, the tooth channels 321 may have a high aspect ratio in certain instances, while, in other instances, the tooth channels 321 may have lower aspect ratios, i.e., the tooth channels 321 may be shallower and wider.

Figure 3H:
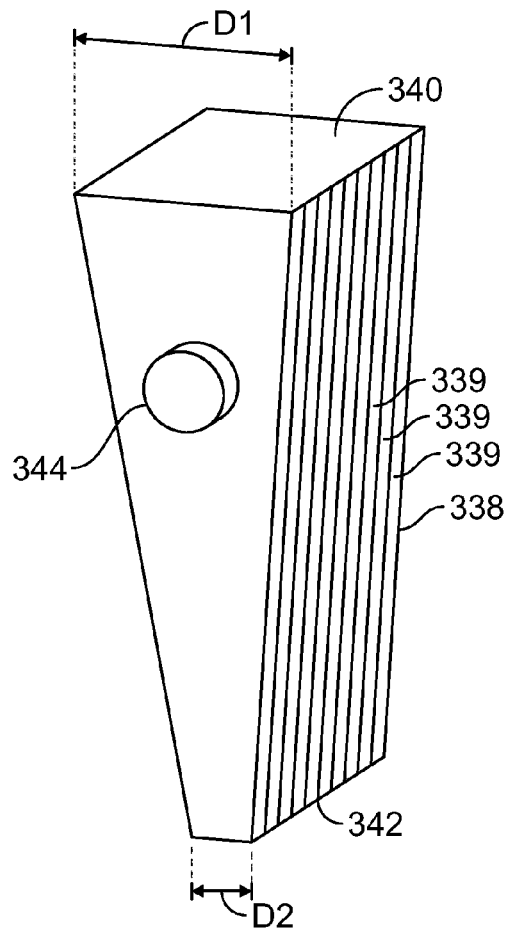
FIG. 3H shows an example stator tooth lamination for use in the example stator of FIG. 3B.

Each tooth 301 may be formed from a plurality of tooth segments 338, an example of which is shown in FIG. 3H. According to the illustrated example, the tooth segment 338 has a tapered cross-section. A first end 340 of the tooth segment 338 has a dimension D1 that is larger than a dimension D2 of a second end 342 of the tooth segment 338. An end of the assembled tooth 301 corresponding to the first ends 340 of the tooth segments 338 are retained in the tooth channels 321.

In some implementations, the tooth segments 338 may be formed from a plurality of laminations 339. As shown, the example tooth segment 338 is formed from ten laminations. In other instances, the tooth segments 338 may be formed from additional or fewer laminations. The teeth 301 may be formed from tooth segments 338 having the same or approximately the same length. In other implementations, the teeth 301 may be formed from tooth segments 338 having different lengths. In some instances, the tooth segments 338 may have different lengths by having more or fewer laminations 339 than other tooth segments 338. Laminations 339 may be chemically or mechanically bonded. For example, some of the laminations 339 may be bonded together with an adhesive. In other instances, some of the laminations 339 may be interlockingly coupled. For example, a protrusion formed in one lamination 339 may be received into a receptacle formed in an adjacent lamination 339.

In some implementations, one or more of the teeth 301 may be formed from tooth segments 338 having different lengths. For example, FIG. 3K shows a schematic view of a tooth 301 extending through the channel 321. The tooth 301 is formed from tooth segments 338a and 338b having different lengths. In the implementation shown, the tooth segment 338a has a length half of the length of tooth segment 338b. Further, the length of the yokes 303 may be the same as the length of tooth segment 338b. As shown, the tooth 301 leads with a tooth segment 338a abutting the end plate 307. The tooth segment 338a occupies half the length of the portion of the channel 321 extending through the first yoke 303. A tooth segment 338b is placed adjacent the tooth segment 338a, causing the tooth segment 338b to overlap the adjacent yoke 303. That is, a first half of the tooth segment 338b lies in one yoke 303 while the second half of the tooth segment 338b extends into the neighboring yoke 303. Overlapping of the tooth segments 338b in the adjacent yokes 303 provides rigidity and enhances mechanical strength of the stator 300. Although the tooth segments 338b are described as overlapping by the adjacent yokes 303 by half, the tooth segments 338b could overlap the adjacent yokes 303 by different amounts. For example, in some implementations, the tooth segments 338 may overlap adjacent yokes 303 in the following percentages: 60%-40%, 65%-35%, 70%-30%, or 80%-20%. However, it is within the disclosure to use any desired amount of overlap. Still further, the tooth segments 338b may be of a length to extend partly into a first yoke 303, extend completely through one or more adjacent yokes 303, and partially extend into an additional yoke 303.

Figure 3I:
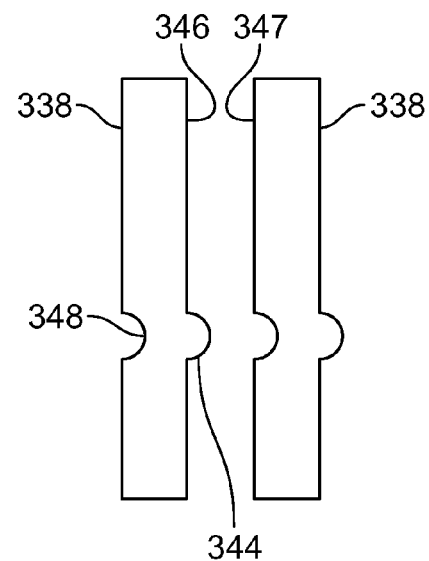
FIG. 3I shows a side view of two adjacent stator tooth laminations having respective protrusions and receptacles for aligning and/or attaching the stator tooth laminations.
Figure 3J:
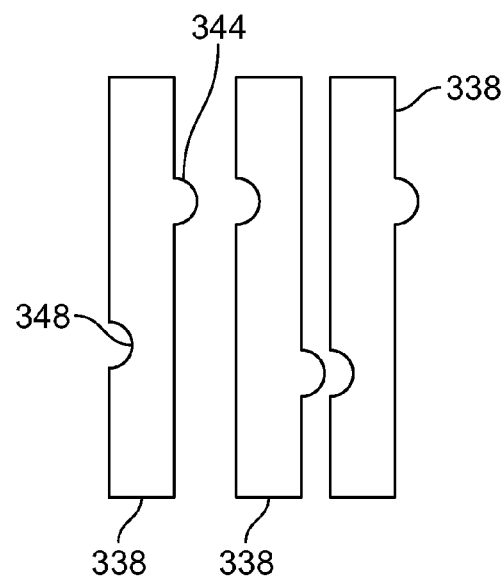
FIG. 3J shows an alternate configuration for aligning and/or attaching adjacent stator tooth laminations.
Figure 3K:
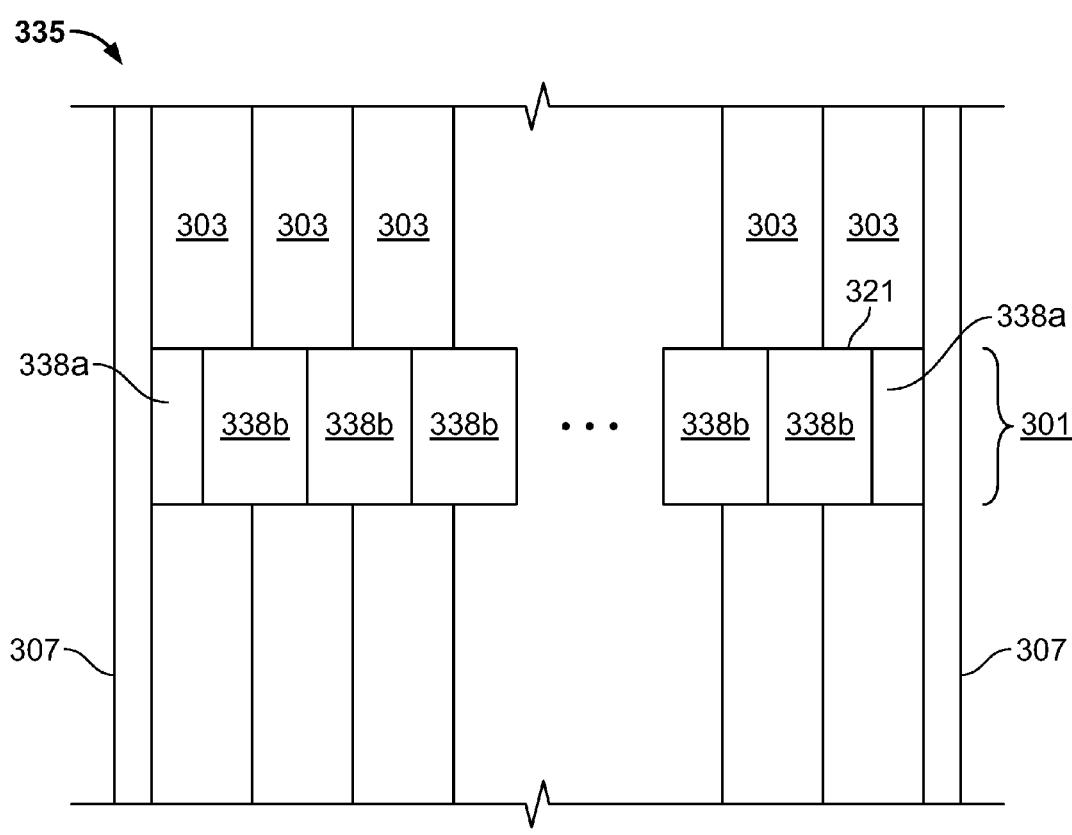
FIG. 3K is a schematic view of tooth segments disposed in a channel formed in adjacent yokes.

Referring to FIG. 3I, each tooth segment 338 may include a protrusion 344 on first face 346 and a receptacle 348 on a second face 347. The protrusion 344 on one tooth segment 338 is accepted into the receptacle 348 on an adjacent tooth segment 338 to provide for at least one of alignment or attachment of adjacent tooth laminations. FIG. 3J shows another configuration of the protrusions 344 and receptacles 348 formed on tooth segments 338.

According to some implementations, the teeth 301 may be formed from a material different from one or more of the yokes 303. Particularly, the teeth 301 may include a material that has a higher magnetic flux capacity than the material forming the yokes 303. In certain instances, the tooth segments 338 are formed, at least in part, from a cobalt-iron alloy. For example, one or more of the laminations 339 forming the tooth segment 338 may be formed from cobalt-iron alloy, while other laminations 339 may be formed from a different material. Example cobalt-iron alloys include Hiperco, a product of Carpenter Technology Corporation, Silectron, a product of Arnold Magnetic Technologies Corporation, and/or other alloys. Still further, the tooth segments 338 need not all be formed from the same material. That is, in some implementations, some of the tooth segments 338 may be formed from one material and other tooth segments 338 formed of different materials. In certain instances, since high magnetic flux material is typically more expensive than other materials, some portion of the tooth segments 338 (e.g., one or more segments 338 or one or more laminations 339 of one or more segments 338) may be formed of a high magnetic saturation flux capacity material and the remainder formed of a less expensive material. In certain instances, the less expensive material may be used to form one or more of the laminations 311. The different materials of tooth segments 338 or laminations 339 therein may be alternated in a regular or irregular pattern over the length of the stator 300. For example, every second, third, fourth or other specified tooth segments 338 may be formed from the higher magnetic saturation flux density material while the interstitial tooth segments 338 may be formed from less expensive, lower saturation flux density material. The resulting tooth 301 has a higher composite magnetic saturation flux capacity than the less expensive material alone, but cost less than a tooth 301 made entirely of the higher magnetic flux capacity material. In some implementations, the high magnetic saturation flux material may be distributed through the stator 300 so that the ends of the stator 300 have a relatively low magnetic saturation flux density. In other instances, the ends of the stator 300 may have the lowest magnetic saturation flux density.

In another example, the types of materials of the tooth segments 338 (including the materials of the laminations 339 of the tooth segments 338) at different locations along the tooth 301 can be selected to achieve a desired temperature distribution across the length of the stator 300 and/or to compensate for variations in heat extraction and/or generation along the length of the stator 300. In certain instances, the materials of the tooth segments 338 can be configured to achieve a uniform temperature distribution or a more uniform temperature distribution across the length of the stator 300 than achieved with tooth segments 338 of uniform material type. For example, a higher density (number per unit length) of higher magnetic flux material tooth segments 338 can be provided in areas of the stator 300 with less cooling heat transfer. By increasing the magnetic flux capacity in these areas, less heat is generated and the lesser cooling can be at least partially offset. Similarly, in areas with greater cooling heat transfer, a lower density of higher magnetic flux material tooth segments 338 can be provided. In certain instances, for example, where the heat transfer fluid is introduced through the ends of the rotor and stator 300, the tooth segments 338 or portions thereof near the axial center of a tooth 301 can have a higher density of higher magnetic flux density material than tooth segments 338 near the ends of the tooth 301 to offset the lower heat transfer at the axial center of the stator 300.

Referring again to FIG. 3G, the laminated teeth 301 are inserted into respective tooth channels 321, as explained above. The assembled stator 300 includes channels 350 that are formed between adjacent teeth 301. Cable and/or formed conductors may be fed through or placed into these winding channels 350 to form windings of the stator 300.

As described, the assembled stator 300 (shown in FIG. 3B) provides a stator core that can achieve a higher flux density than if the teeth and yoke portions were made from the same material. Further, such a construction results in a cost savings by using more expensive materials in only certain places, such as in the tooth region, where enhanced magnetic flux density is needed and not in less critical areas, such as the yoke. Further, construction of the yoke 303 from the plurality of segments 315 provides for less waste in manufacturing. Particularly, when producing the laminations 311, 339 to form the segments 315 or tooth segments 338, respectively, from sheet material, the laminations 311 and 339 may be arranged more densely on the sheet, leaving less waste. Additionally, the tooth segments 338 and yoke segments 315 can be mass produced to further reduce manufacturing costs.

A stator of an electric machine, such as the stator 300 described above, may be assembled in an number of different manners. In certain instances, the stator core 335 may be assembled by joining the four yoke segments 315 to form a yoke 303 and joining the appropriate number of teeth segments 338 to the yoke 303) and then joining the resulting assemblies to one another, along with the end plates 307, to form the stator core 335. In certain instances, the stator core 335 may be assembled by forming complete teeth 301 (i.e., by joining the teeth segments 338 together to form complete teeth 301) and a complete stator stack (i.e., by joining together the plurality of yokes 303) and then assembling the completed teeth 301 to the completed stator stack and adding the end plates 307 to form the stator core 335. In certain instances, the stator core 335 may be assembled in another fashion. The windings 302 may be wound to the stator core 335 in a number of different manners. In certain instances, the windings 302 may be wound to the completed teeth 301 (e.g., the teeth 301 held in position relative to one another with a fixture) prior to assembly into the stator stack. In certain instances, the windings 302 may be wound to the completed stator core 335, i.e., after the stator stack and teeth 301 are assembled together. The assembly of the windings 302 and teeth 301 and/or the entire assembled stator 300 may be vacuum-pressure impregnated with a coating material and baked, for example, to achieve desired mechanical and electrical properties. In certain instances, locking plates may be attached to the ends of the stator stack to secure the teeth 301 to the stator stack.

As mentioned above, construction of the stator 300 permits the use of different materials between the teeth and the yoke. Such a construction allows optimization of flux density and reduction in losses and related construction costs. This assembly process has the further benefits of using winding techniques not otherwise achievable. Further, windings formed in this way may have attached thereto cooling devices. Such a combination would not otherwise be possible with traditional winding techniques.

Figure 3L:
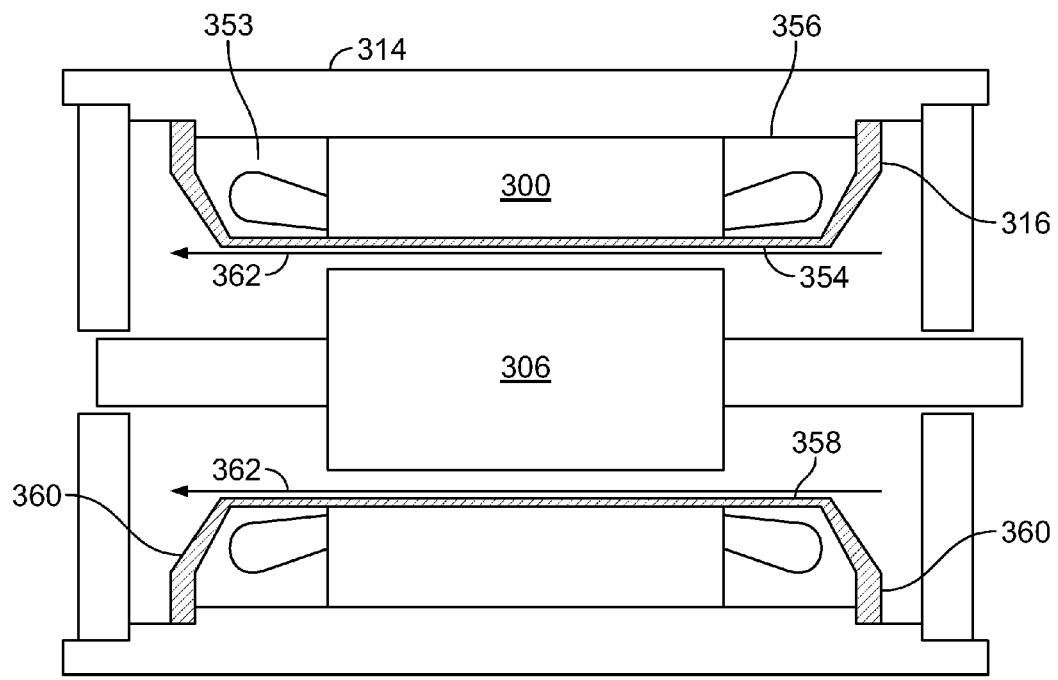
FIG. 3L is a cross-sectional view of an example electric machine having a protective barrier around the stator.

FIGS. 3L-3Q illustrate implementations of the protective barrier 316 formed around a stator, such as the stator 300 or 108 of an electric machine, such as the electric machine 102. The protective barrier 316 forms a stator cavity 353 in which the stator 300 resides. The stator cavity 353 may or may not be filled with a fluid. FIG. 3L shows a cross-sectional view of an example electric machine, which may be similar to the electric machine 102. The electric machine includes a housing 314, the stator 300, the rotor 306, and the protective barrier 316. The protective barrier 316 may also prevent intrusion of fluid passing through the electric machine 102 into the stator cavity 353. The protective barrier 316 has a cylindrical shape, a closed end 354 at an inner radius, and an open end 356 at an outer radius. The closed end 354 is formed by a cylinder 358, and the open end 356 is defined by side flanges 360. The side flanges 360 abut and/or are attached to the housing 314. As explained above, the protective barrier 316 provides protection for the stator 300, for example, in flooded applications in which the electric machine 102 has fluid (represented by arrows 362) passing therethrough between the rotor 306 and the stator 300. Accordingly, the protective barrier 316 provides protection against exposure of the electric machine and its components to the fluid (e.g., sea water, cooling fluids, process fluids) or other foreign matter passing through the electric machine.

Additionally, the protective barrier 316 protects the electric machine by preventing contact between the stator 300 and the rotor 306. Further, the protective barrier 316 may be formed of a material resistant to corrosion and/or abrasion, such as abrasion and/or corrosion that may be caused by the fluid (including any particulates and/or contaminants contained therein) passing through the electric machine 102 between the stator 300 and the rotor 306. The protective barrier 316 may also be constructed to withstand pressure changes between the fluid passing through the electric machine and any fluid contained in the stator cavity 353. The protective barrier 316 may also be constructed to accommodate thermal expansion and contraction of the housing 314 and the stator 300.

Figure 3M:
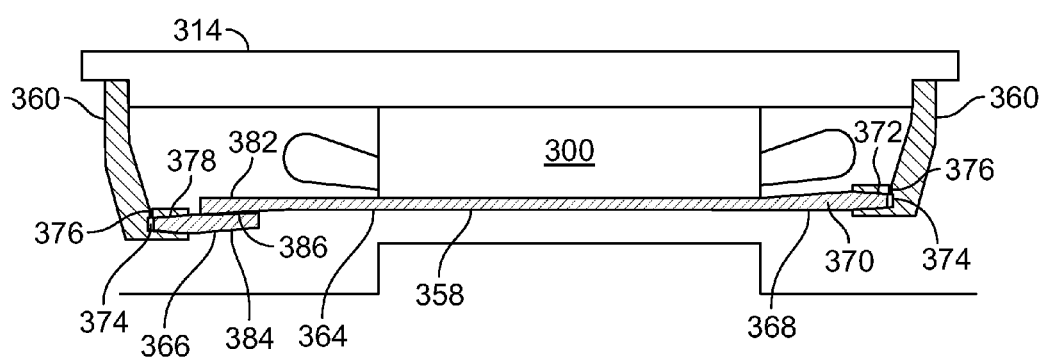
FIGS. 3M-3Q are partial cross-sectional views illustrating example constructions of the protective barrier.

FIG. 3M shows a partial cross-sectional view of an example electric machine. As shown, the cylinder 358 of the protective barrier 316 includes a first portion 364 and an abutting second portion or ring 366. In certain instances, the cylinder 358 can be a common commercially available preformed tubing. According to some implementations, a first edge 368 of the first portion 364 of the cylinder 358 may include an outwardly flared portion 370 and a tapered portion 372. The tapered portion 372 extends from the outwardly flared portion 370. The tapered portion 372 is accepted into a tapered channel 374 formed in one of the side flanges 360. The tapered portion 372 and the tapered channel 374 may be fit together to provide a seal. For example, the tapered portion 372 and the tapered channel 374 may be fit together with an interference fit. In certain instances, the seal prevents the passage of fluid. Further, the tapered channel 374 includes at least one opening 376 extending from an inner portion of the tapered channel to the atmosphere or to the stator cavity 353, for example. The at least one opening 376 allows air to escape from the channel during assembly of the tapered portion 372 into the tapered channel 374, thereby providing a secured attachment.

A first edge 378 of the ring 366 may also be tapered and, similarly, may be accepted into another tapered channel 374 formed in a second of the side flanges 360. The first edge 378 of the ring 366 and the tapered channel 374 may also be fitted together with an interference fit to provide a seal against intrusion of fluid. Also, as described above, the tapered channel 374 may include one or more openings 376, described above, to provide escape of air from the tapered channel 374 (i.e., pressure equalization) during assembly of the first edge 378 and the tapered channel 374.

Second edges 382 and 384 of the first portion 364 and ring 366, respectively, overlap to form a tapered joint 386. Particularly, in some implementations, adjacent surfaces of the second edges 382, 384 of the first portion 364 and the ring 366, respectively, overlap and abut against each other to form the tapered joint 386. The tapered joint forms a seal to prevent passage of fluid. In certain instances, the second edge 382 of the first portion 364 may flare outwardly. The tapered joint 386 allows dimensional variations of the protective barrier 354 while still maintaining a seal to prevent intrusion of fluid into the stator cavity 353. For example, during operation of the electric machine 102, components of the electric machine 102 may experience expansion and/or contraction, such as due to rotational speeds and/or temperature changes and the tapered joint 386 may remain engaged. In certain instances, the tapered joint 386 may form a water-tight seal. Further, a contact pressure between the first portion 364 and the ring 366 at the tapered joint 386 may increase with expansion of the housing 314. Alternately, the tapered joint 386 may be configured such that the pressure of the tapered joint 386 may increase with contraction of the housing 314.

According to some implementations, either or both of the first portions 364 or ring 366 of the cylinder 358 (i.e., the portion proximate the permanent magnets of the rotor), may be formed from a fiber and polymer composite material. In certain instances, the cylinder 358 may be formed from a carbon or glass fiber composite material provided in a thermoplastic or thermosetting matrix. Such materials provide high strength, corrosion resistance, and abrasion resistance and are not magnetically permeable. In certain instances, the side flanges 360 may be formed from a metal.

Figure 3N:
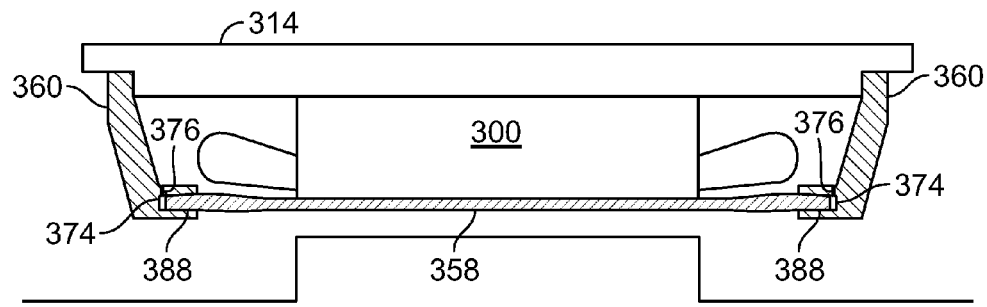

FIG. 3N shows another implementation of the protective barrier 354 without a tapered joint. In such an implementation, the cylinder 358 includes opposing tapered edges 388 are accepted into flared channels 374. The tapered edges 388 and the tapered channels 374 may also form an interference fit to create a seal. In certain instances, the seal may be a water-tight seal to prevent intrusion of fluid. Also, as explained above, the tapered channels 374 may include one or more openings 376 to provide pressure equalization during assembly. Further, the cylinder 358 may be formed from a composite material, as described above, and the fibers of the composite may be oriented and/or the matrix material selected such that the coefficient of thermal expansion of the cylinder 358 matches the coefficient of thermal expansion of the housing 314, thereby eliminating the need for a tapered joint. In certain instances, the cylinder 358 can be a common commercially available pre-formed tubing.

Figure 3O:
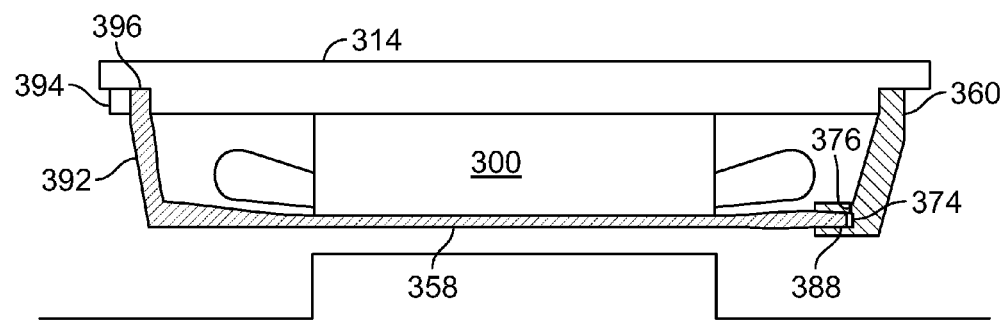

The implementation shown in FIG. 3O shows a protective barrier 354 formed from a composite material having a coefficient of thermal expansion that matches that of the housing 314. In this implementation, the cylinder 358 has an integrated side flange 392 and a tapered edge 388. As explained above, the tapered edge 388 may be fitted into the tapered channel 374 to provide an interference fit. Pressure may be equalized in the tapered channel 374 and the atmosphere via one or more openings 376 formed in the side flange 360 from the tapered channel 374 and the stator cavity 353. The integrated side flange 392 may be secured directly to the housing 314 by a ring 394 that may also function to protect an outer edge 396 of the integrated side flange 392. In certain instances, the ring 394 may be formed from metal.

Figure 3P:
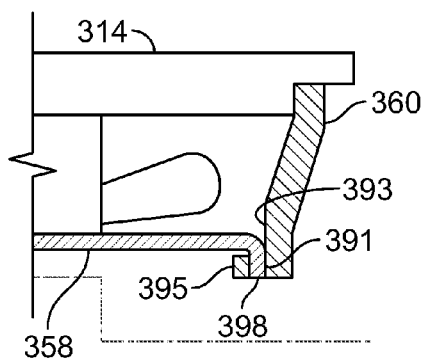
Figure 3Q:
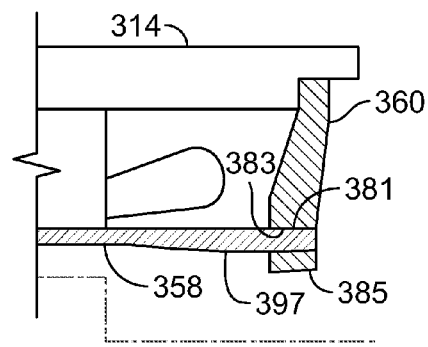

FIGS. 3P and 3Q show additional alternate implementations of the protective barrier 354. The protective barriers 354 illustrated in these implementations may also be formed from a composite material designed to have a coefficient of thermal expansion that matches that of the housing 314. As shown in FIG. 3P, the cylinder 358 of the protective barrier 354 may include a lip 398 that includes an outer surface 391 that abuts an inner surface 393 of the side flange 360. A ring 395 may be used to clamp the cylinder 358 in place such that the lip 398 is sandwiched between the ring 395 and the side flange 360. In some implementations, the ring 395 and the side flange 360 may be formed from metal, and, in still other implementations, the ring 395 and side flange 360 may be formed from the same type of metal. One or more fasteners may be used to secure the ring 395, cylinder 358, and side flange 360 together. Alternately or in combination, an adhesive may be used.

FIG. 3Q shows another implementation in which an inner surface 381 of the cylinder 358 at outer edges 397 abut an outer surface 383 of the side flanges 360. A ring 385 may be used to secure the cylinder 358 to the side flanges 360 at the outer edge 397. In some implementations, fasteners and/or an adhesive may be used to secure the ring 385, cylinder 358, and side flanges 360 together. In addition to these methods or alternatively, the ring may have a slightly larger outer diameter than an inner diameter of the cylinder 358. Thus, the ring 395 and cylinder 358 may be held in place relative to the side flange 360 by friction caused by an interference fit. Also, the ring 385 and the side flanges 360 may be formed from a metal, and, in still other instances, the ring 385 and the side flanges 360 may be formed from the same type of metal.

Figure 4A:
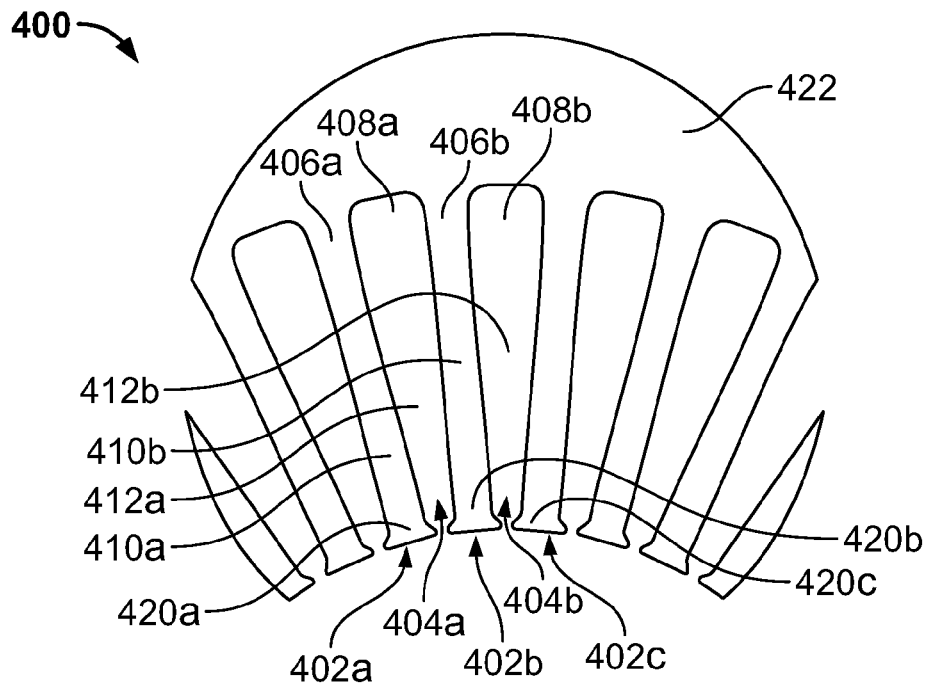
FIG. 4A is a partial schematic end view of an example core of a stator for an electric machine.

FIG. 4A is a partial schematic end view of an example core 400 of a stator for an electric machine. The example core 400 is suitable for use in the stator 108 of electric machine 102. The core 400 defines a substantially cylindrical inner volume to receive a rotor of an electric machine. The core 400 includes teeth 402 extending radially from a yoke 422 of the core to an outer circumference of the inner volume of the core. The teeth define slots 404 to receive conductive windings. For example, neighboring teeth 402a and 402b define slot 404a, and neighboring teeth 402b and 402c define slot 404b. Each tooth 404 has a tip 420. As shown, for example in FIGS. 4A, 4B, and 4C, a stator can have slots between each pair of teeth, where each slot has a slot region with parallel slot sides and each tooth has a tooth section with parallel tooth sides.

Each tooth 402 has a radial length extending from the yoke 422 to the tip 420 of the tooth. For example, tooth 402a has a radial length extending from the yoke 422 to tip 420a, and tooth 402b has a radial length extending from the yoke 422 to tip 420b. In the illustrated example, all of the teeth 402 have the same radial length. In some implementations, some of the teeth 402 have unequal radial lengths. Each slot 404 has a radial depth extending from the yoke 422 to the inner volume. The radial depth of a slot 404 can be defined by the yoke 422 and the sides of the teeth 402 that define the slot 404. For example, the radial depth of the slot 404a is defined by the yoke 422 and the sides of the teeth 402a and 402b, and the radial depth of the slot 404b is defined by the yoke 422 and the sides of the teeth 402b and 402c.

Each tooth 402 has a width along the radial length of the tooth 402. For example, the width of a tooth at a given point is related to the azimuthal angle spanned by the tooth at the given point. A tooth 402 may have a first radial section where the tooth width is constant or substantially constant along the radial length of the tooth 402. As such, a tooth can have parallel tooth sides in at least a section of the tooth. A tooth 402 may have a second radial section where the tooth width varies along the radial length of the tooth 402. As such, a tooth can also have non-parallel sides in at least a section of the tooth. The tooth width may vary linearly and/or non-linearly along the radial length of the tooth in the second radial section. The radial length and the width of a tooth can determine an area of the tooth. For example, the area of a tooth may be calculated as an integral of the tooth width over the radial length of the tooth.

Each slot 404 has a width along the radial depth of the slot 404. For example, the width of a slot at a given point is related to the azimuthal angle at the given point between the two teeth 402 that define the slot 404. A slot 404 may have a first radial section where the slot width is uniform or substantially uniform along the radial depth of the slot 404. As such, a slot can have parallel slot sides in at least a region of the slot. A slot 404 may have a second radial section where the slot width varies along the radial depth of the slot 404. As such, a slot can also have non-parallel sides in at least a region of the slot. The slot width may vary linearly and/or non-linearly along the radial depth of the slot in the second radial section. The radial depth and the width of a slot can determine an area of the slot. For example, the area of a slot may be calculated as an integral of the slot width over the radial depth of the slot.

The geometry (e.g., length, depth, width, area) of the teeth 402 and the slots 404 can influence performance and efficiency aspects of the stator (and hence, of the electric machine). The geometry of a slot 404 can influence the position, distribution, and/or cross-sectional area of the conductive coils that can be installed in the slot. A ratio of slot area to tooth area of the core 400 may influence a maximum power, a power factor, and/or an efficiency achievable with the core 400. Teeth with a first radial section where the tooth width varies along the radial length of the tooth and a second radial section where the tooth width is uniform along the radial length of the tooth may define slots with a first radial section where the slot width varies or is uniform along the radial depth and a second radial section where the slot width varies. Slots with a first radial section where the slot width varies along the radial depth and a second radial section where the slot width is uniform along the radial depth can improve the performance and/or efficiency of the electric machine. A core having this type of slot may balance a utilization of a stator core material (e.g., iron or another material) and a conductive winding material (e.g., copper, or another material). For example, slots with a first radial section where the slot width varies along the radial depth and a second radial section where the slot width is uniform along the radial depth can allow a larger cross-sectional area of conductive material in a portion of the slot, and can prevent excess iron in various portions of the tooth (e.g., the "root" of the tooth near the yoke 422). Slots having this configuration may accommodate both cable windings (e.g., in the first section) and formed windings (e.g., in the second section). In some cases, excess core material at a tooth root includes magnetically under-utilized material. In some cases, increasing flux density at the tooth tip 420 limits the flux loading of the electric machine and allows excessive flux leakage path across the slot 404, which may degrade machine performance.

In the example core 400 of FIG. 4A, all of the teeth 402 and slots 404 are identical. The radial section 406b of the tooth 402b has a width that varies along the radial length of the tooth 402b, and the radial section 410b of the tooth 402b has a uniform width along the radial length of the tooth 402b. The radial section 408b of the slot 404b has a uniform width along the radial depth of the slot 404b, and the radial section 412b of the slot 404b has a width that varies along the radial length of the slot 404b. The cross-section of each slot 404 has two rounded corners at the yoke 422. The rounded corners can accommodate coils having a round cross-section, such as the cable winding coils shown in FIG. 4B. Each tooth 402 in FIG. 4A has a broad tip 420 that may enhance the flux and/or other properties of the core 400.

Figure 4B:
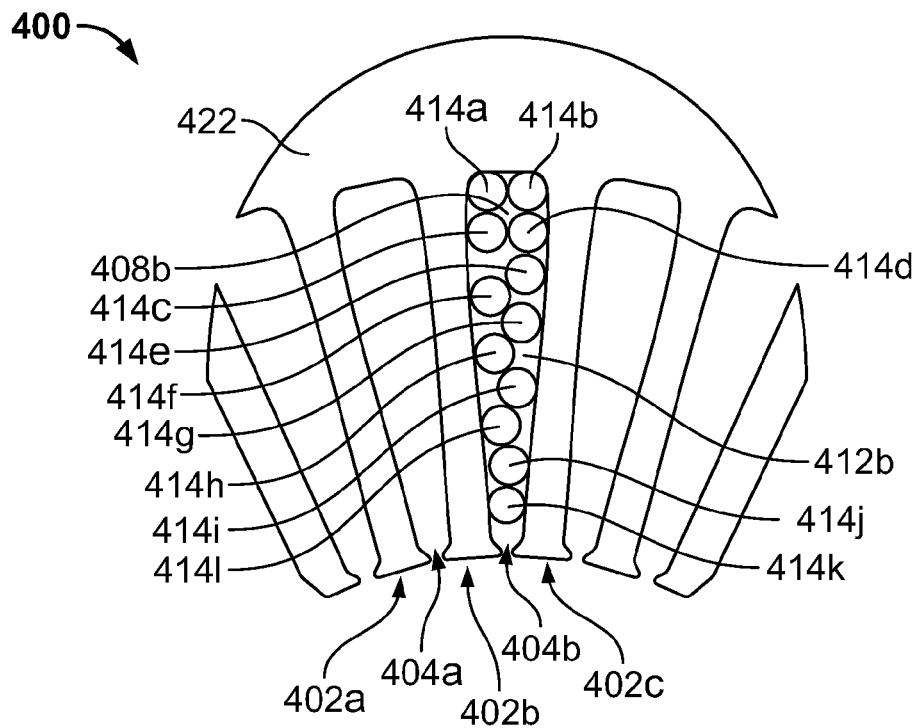
FIG. 4B is a partial schematic end view of an example core of a stator for an electric machine.

FIG. 4B is a partial schematic end view of the example core 400 of FIG. 4A. FIG. 4B illustrates example conducting coils installed in the slot 404b. The illustrated coils are the coils of cable windings. Coils 414a, 414b, 414c, and 414d reside in the section 408b of the slot 404b. Coils 414e, 414f, 414g, 414h, 414i, 414j, 414k, and 414l reside in the section 412b of the slot 404b.

Figure 4C:
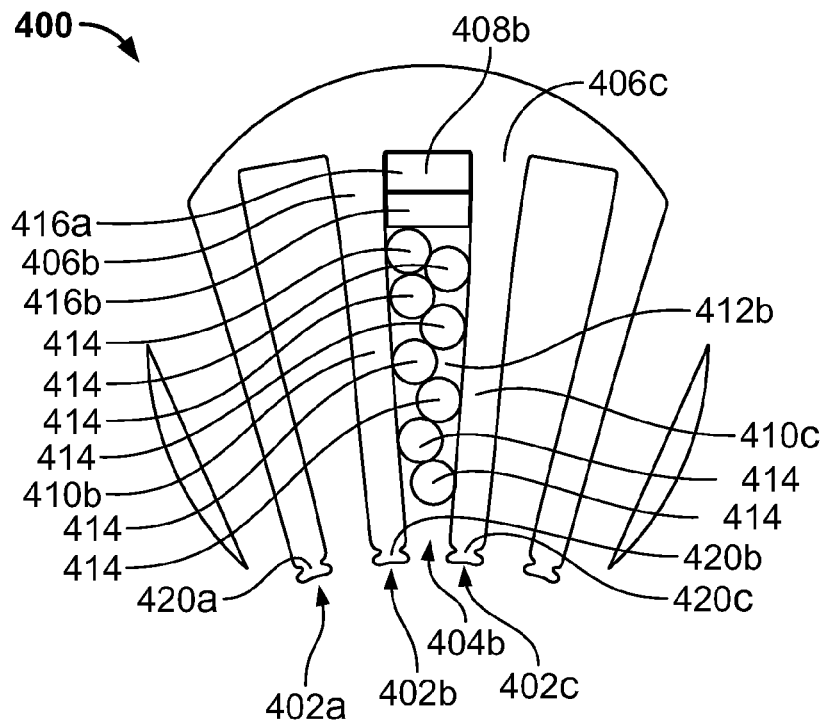
FIG. 4C is a partial schematic end view of an example core of a stator for an electric machine.

FIG. 4C is a partial schematic end view of an example core of a stator for an electric machine. The example core 400 can be the core of the stator 108 of electric machine 102. In the example core 400 of FIG. 4C, all of the teeth 402 and slots 404 are identical. The radial section 406b of the tooth 402b has a width that varies along the radial length of the tooth 402b, and the radial section 410b of the tooth 402b has a uniform width along the radial length of the tooth 402b. The radial section 408b of the slot 404b has a uniform width along the radial depth of the slot 404b, and the radial section 412b of the slot 404b has a width that varies along the radial length of the slot 404b. The cross-section of each slot 404 has two substantially square corners at the yoke 422. The substantially square corners can accommodate coils having a cross section with square corners, such as the formed winding coils 416 shown in FIG. 4C.

FIG. 4C illustrates example conducting coils installed in the slot 404b. Some of the illustrated coils are the coils of formed windings, and some of the illustrated coils are the coils of cable windings. Formed winding coils 416a and 416b reside in the section 408b of the slot 404b. Cable winding coils 414 reside in the section 412b of the slot 404b. Each tooth 402 in FIG. 4C has a narrowed tip 420 that may enhance the flux and/or other properties of the core 400.

Figure 4D:
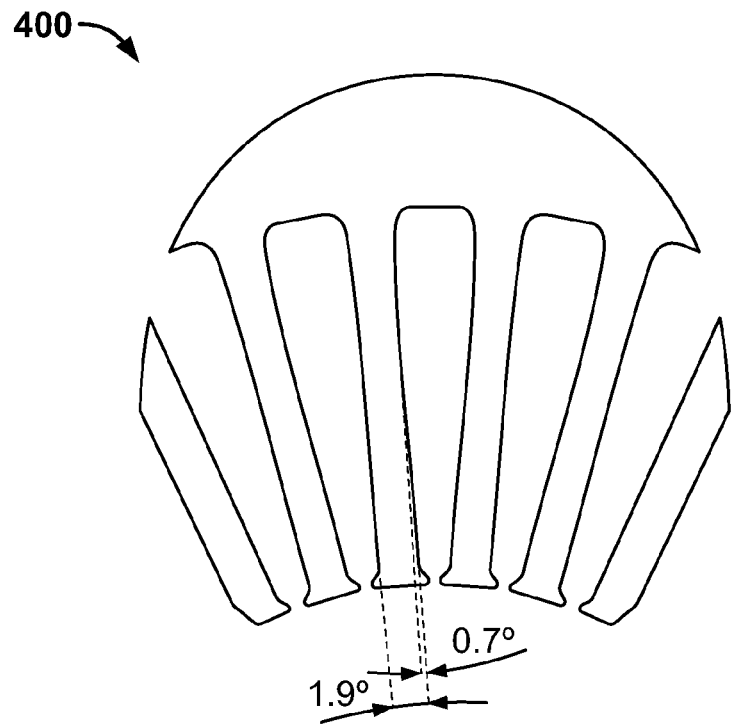
FIG. 4D is a partial schematic end view of an example core of a stator for an electric machine.

FIG. 4D is a partial schematic end view of an example core 400. FIG. 4D illustrates example angular parameters where each tooth includes two sections having non-parallel sides. A first section of each tooth has non-parallel sides at a first angle, and second section of each tooth has non-parallel sides at a second angle. The first angle and the second angle are different. In the example shown, the first angle is 1.9 degrees, and the second angle is 0.7 degrees larger than the first angel (i.e., 2.6 degrees). Other angles and/or angle differences may be used.

Figure 4E:
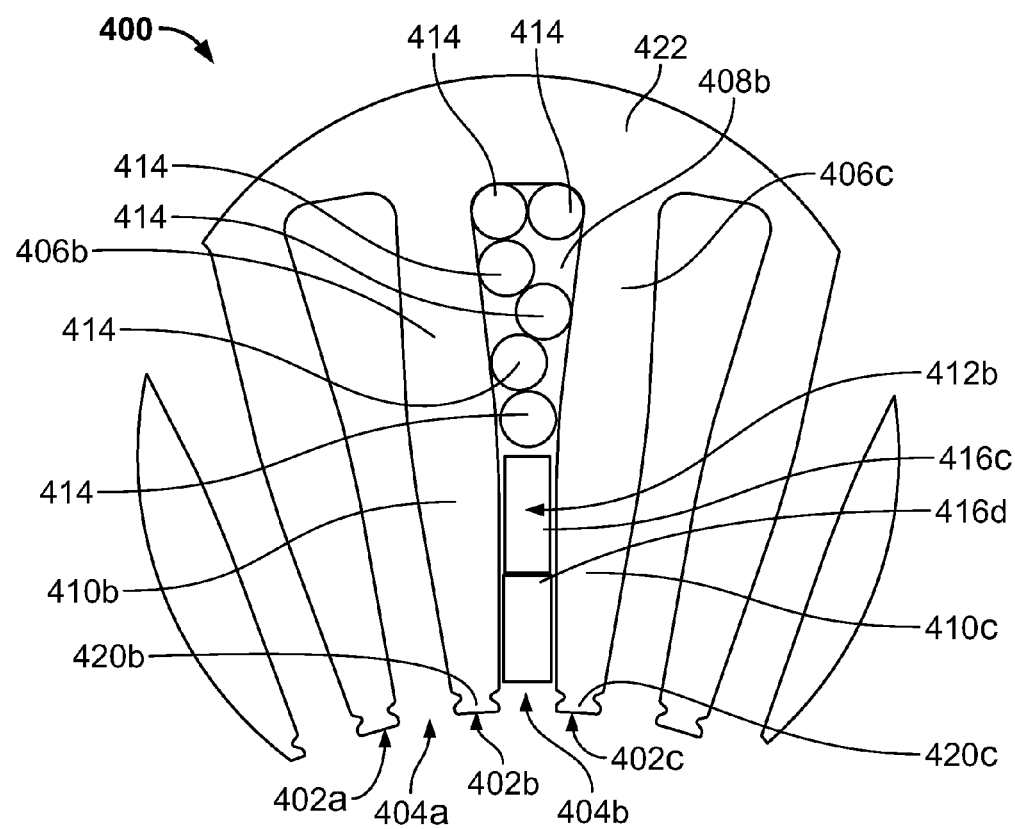
FIG. 4E is a partial schematic end view of an example core of a stator for an electric machine.

FIG. 4E is a partial schematic end view of an example core of a stator for an electric machine. The example core 400 can be the core of the stator 108 of electric machine 102. In the example core 400 of FIG. 4E, all of the teeth 402 and slots 404 are identical. The radial section 406b of the tooth 402b has a uniform width along the radial length of the tooth 402b, and the radial section 410b of the tooth 402b has a width that varies along the radial length of the tooth 402b. The radial section 408b of the slot 404b has a width that varies along the radial depth of the slot 404b, and the radial section 412b of the slot 404b has a uniform width along the radial length of the slot 404b. The cross-section of each slot 404 has two substantially rounded corners at the yoke 422. The substantially rounded corners can accommodate coils having a round cross section, such as the rounded coils of cable windings.

In FIG. 4E, some of the illustrated coils are the coils of formed windings, and some of the illustrated coils are the coils of cable windings. Cable winding coils 414 reside in the section 408b of the slot 404b. Formed winding coils 416c and 416d reside in the section 412b of the slot 404b. Each tooth 402 in FIG. 4E has a narrowed tip 420 that may enhance the flux and/or other properties of the core 400.

Figure 4F:
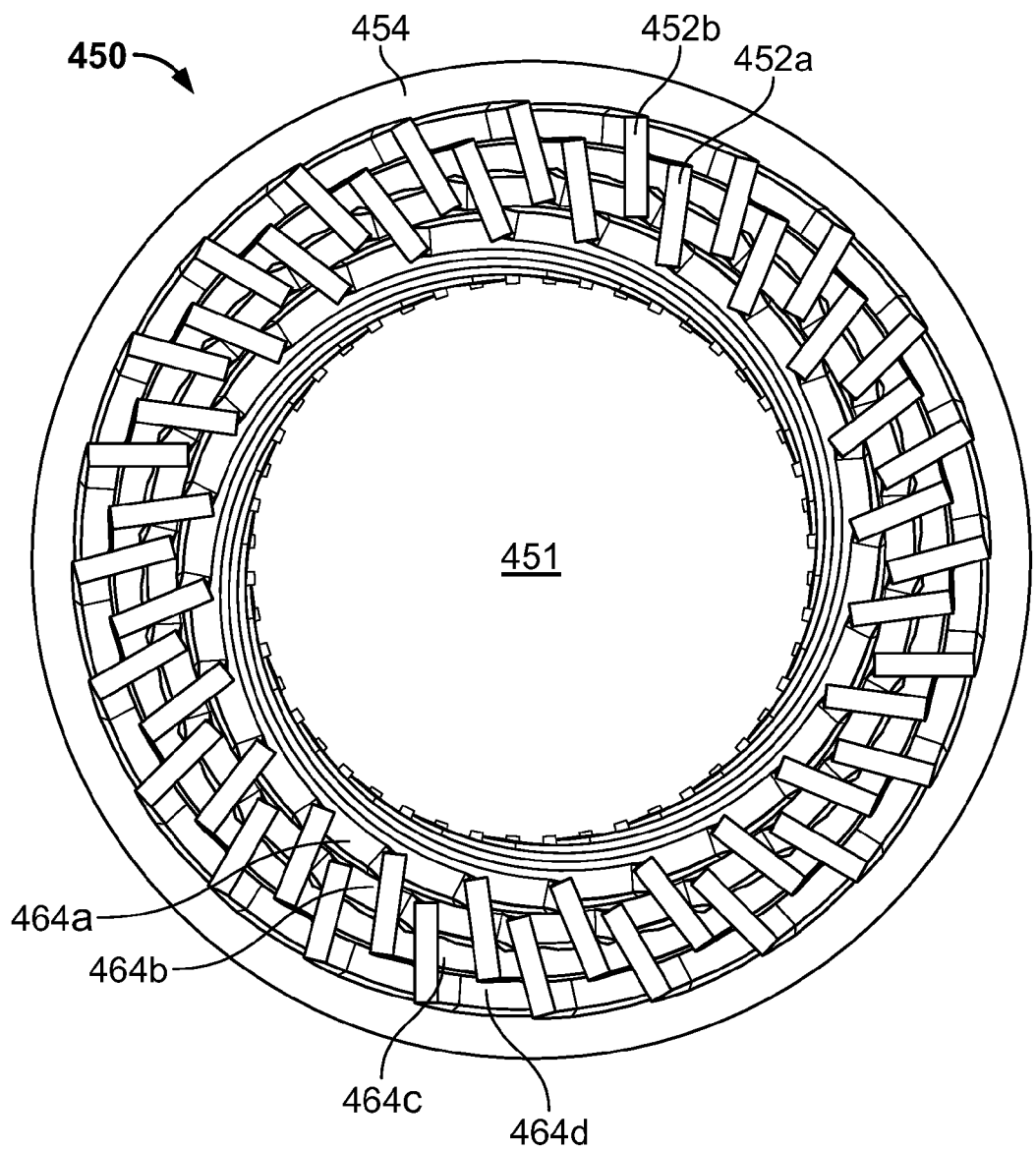
FIG. 4F is a schematic end view of example end turns of a stator for an electric machine.

FIG. 4F is a schematic end view of example end turns of a stator 450 for an electric machine. The example stator 450 can be used for the stator 108 of electric machine 102. Only the end turns 452 of the stator 450 and a portion of the core 454 of the stator 450 are illustrated in FIG. 4F. The stator 450 includes other parts that are not illustrated in FIG. 4F.

The stator 450 includes formed windings. The coils of the formed windings include axial sections (not illustrated in FIG. 4F) that extend the axial length of the stator core. The coils of the formed windings include multiple end turns 452 that form an end turn bundle beyond the axial end of the stator core. The end turn bundle includes two groups of end turns 452 that form four interleaved radial layers 464 of end turns 452. Each group forms two of the four layers 464. One layer in each group is radially between the two layers of the other group.

Figure 4G:
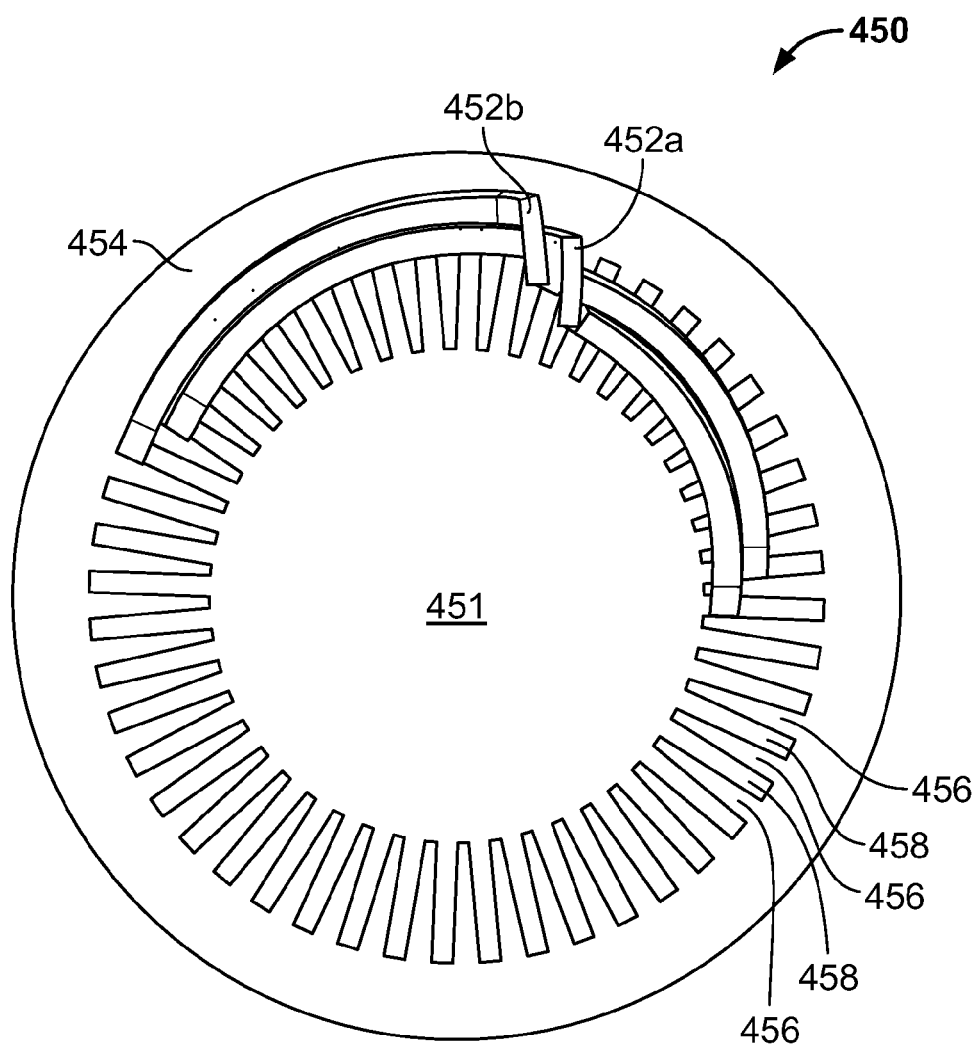
FIG. 4G is a schematic end view of example end turns of a stator for an electric machine.

The stator 450 includes a core 454 that defines an inner bore 451, which is a substantially cylindrical inner volume to receive a rotor of an electric machine. As shown in FIG. 4G, the core 454 has multiple teeth 456 extending radially inward, toward the bore 451; the teeth 456 define slots 458 to receive conductive windings (e.g., formed windings, cable windings, or another type). The coils of the windings include axial sections (not shown in FIG. 4G) that span an axial length of the core. Each axial section may extend between the two axial ends of the core. The coils of the windings include end turns 452 extending beyond the axial end of the core. Each end turn 452 connects two axial sections of a coil. The axial sections of one or more coils may reside in each slot. Each end turn 452 has a first end connecting to a first axial section and a second end connecting to a second axial section. As shown in FIG. 4G, the first end of each end turn connects at a first circumferential location, and the second end of each end turn connects at a second circumferential location. In the implementation shown in FIG. 4G, the first end connects at a first radial distance from the radial center of the core, and the second end connects at a second radial distance from the radial center of the core. In some implementations, both ends of an end turn connect to axial sections of a coil at the same radial distance from the center of the core.

An end turn bundle, as illustrated in FIG. 4F, can include multiple groups of end turns 452. Each group of end turns 452 can form layers 464 at different radii around the radial center of the core 454. A single end turn 452 primarily resides in two layers formed by one of the groups. For example, an end turn 452a has a first portion in a layer 464a, and the end turn 452a has a second portion in a different layer 464c. As another example, an end turn 452b has a first portion in a layer 464b, and the end turn 452b has a second portion in a different layer 464d. The layers 464a and 464c are formed by a first group of end turns 452 radially positioned as the end turn 452a. Each end turn 452 in the first group is offset circumferentially from the other members of the first group. The layers 464b and 464d are formed by a second group of end turns 452 radially positioned as end turn 452b. Each end turn 452 in the second group is offset circumferentially from the other members of the second group. Layer 464a is radially inside of layer 464b; layer 464b is radially inside of layer 464c; layer 464c is radially inside of layer 464d. Thus, the first group of end turns (radially configured as end turn 452a) and the second group of end turns (radially configured as end turn 452b) are interleaved to form four layers of end turns.

Each end turn 452 passes through a planar cross-section parallel to the end of the core 454. Each end turn 452 of the first group of end turns forms two layers of end turns, passing through the planar cross-section at a first radius and a third radius. The first radius is less than the third radius. Each end turn 452 of the second group of end turns forms two different layers, passing through the planar cross-section at a second radius and a fourth radius. The second radius is less than the fourth radius. The first group of end turns and the second group of end turns are interleaved, such that the second layer is between the first layer and the third layer (i.e., the first radius is less than the second radius, and the second radius is less than the third radius) and the third layer is between the second layer and the fourth layer (i.e., the second radius is less than the third radius, and the third radius is less than the fourth radius).

Each end turn 452 extends between the two ends of the end turn to form a partial loop extending from the core 454. In some implementations, when two groups of end turns are interleaved, each end turn in one group passes through the partial loop formed by one or more of the end turns in the other group. For example, the end turn 452a passes through the partial loop formed by the end turn 452b.

In some cases, an end turn bundle including two groups of end turns that form four interleaved radial layers of end turns can form an end turn bundle that is longitudinally shorter than other configurations. For example, if the two groups of end turns were not interleaved, and instead the two groups formed fewer than four layers of end turns, the end turn bundle may be almost twice as long as the four-layer bundle. A longer end turn bundle consumes more axial space in the electric machine, and may cause the rotor bearing journals to be positioned farther apart. A shorter end turn bundle consumes less axial space in the electric machine, and may allow the rotor bearing journals to be positioned closer together. When the rotor bearing journals are axially closer together, the bearing journals may suffer less stress and damage and/or provide better stability for the rotor. Thus, an end turn bundle that includes two interleaved groups of end turns may consume less axial space in the electric machine, may allow less axial distance between rotor bearing journals, and/or may reduce wear and/or damage to parts of the electric machine. In some cases, an end turn bundle that includes two interleaved groups of end turns may consume approximately half of the axial space that the end turn bundle would consume in other configurations.

Figure 4H:
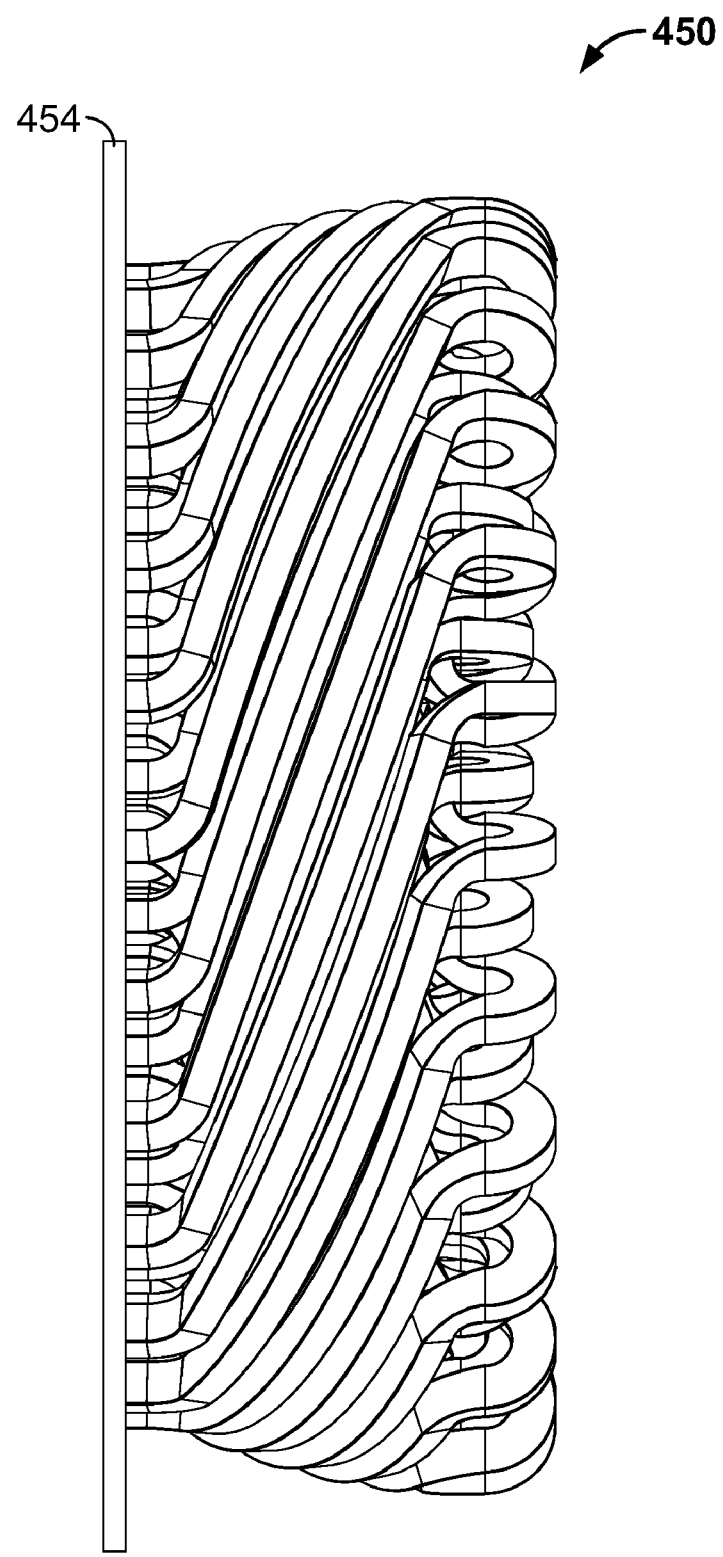
FIG. 4H is a schematic side view of example end turns of a stator for an electric machine.
Figure 4I:
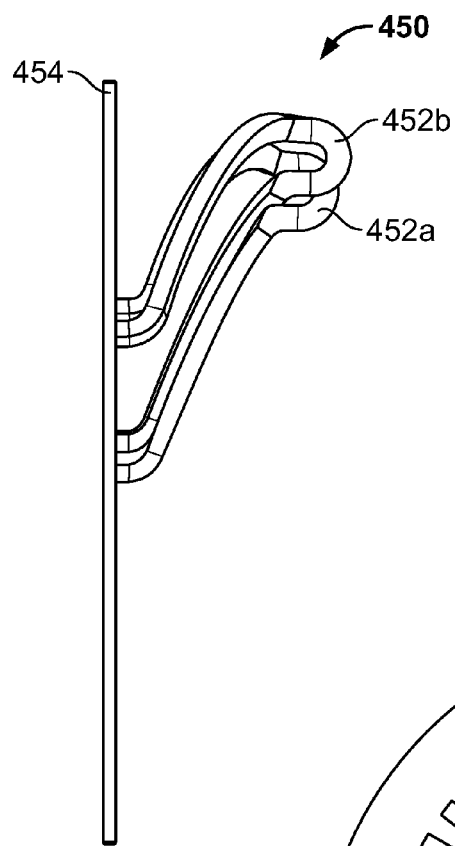
FIG. 4I is a schematic side view of example end turns of a stator for an electric machine.
Figure 4J:
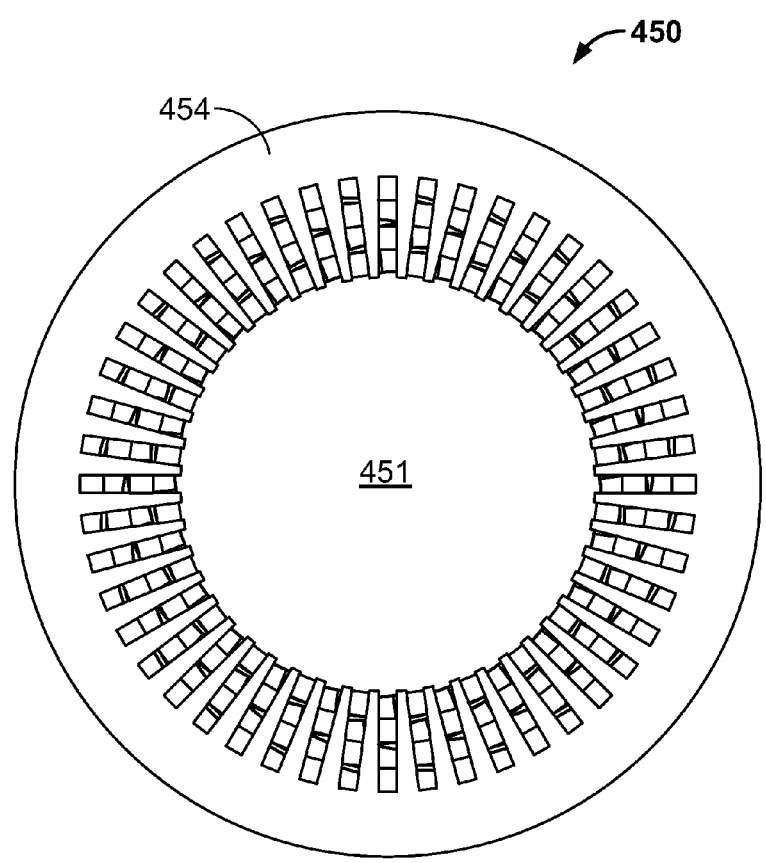
FIG. 4J is a schematic cross-sectional view of an example stator for an electric machine.
Figure 4K:
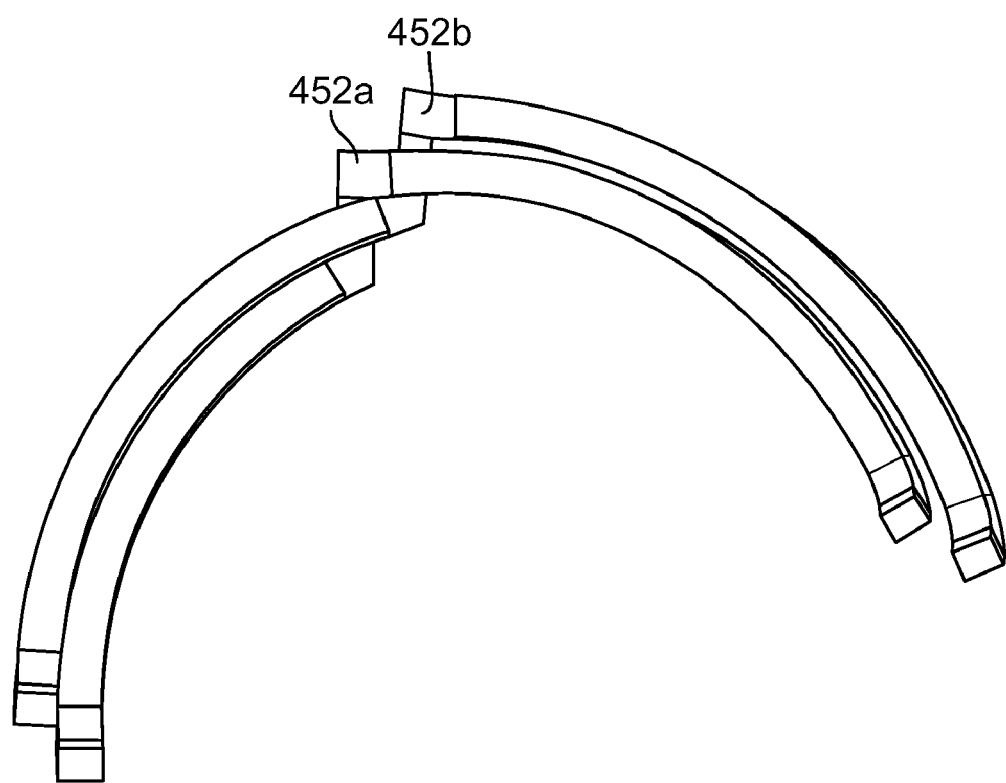
FIG. 4K is a schematic cross-sectional view of example end turns of a stator for an electric machine.

FIG. 4H is a partial schematic side view of the example stator 450. FIG. 4I is a partial schematic side view of a portion of the core 454 and example end turns 452a, 452b of a stator 450. FIG. 4J is a schematic cross-sectional view from near the axial center of the example stator 450 toward the axial end of the example stator 450. FIG. 4K is a partial schematic view of end turns 452a and 452b of a stator 450.

Figure 4M:
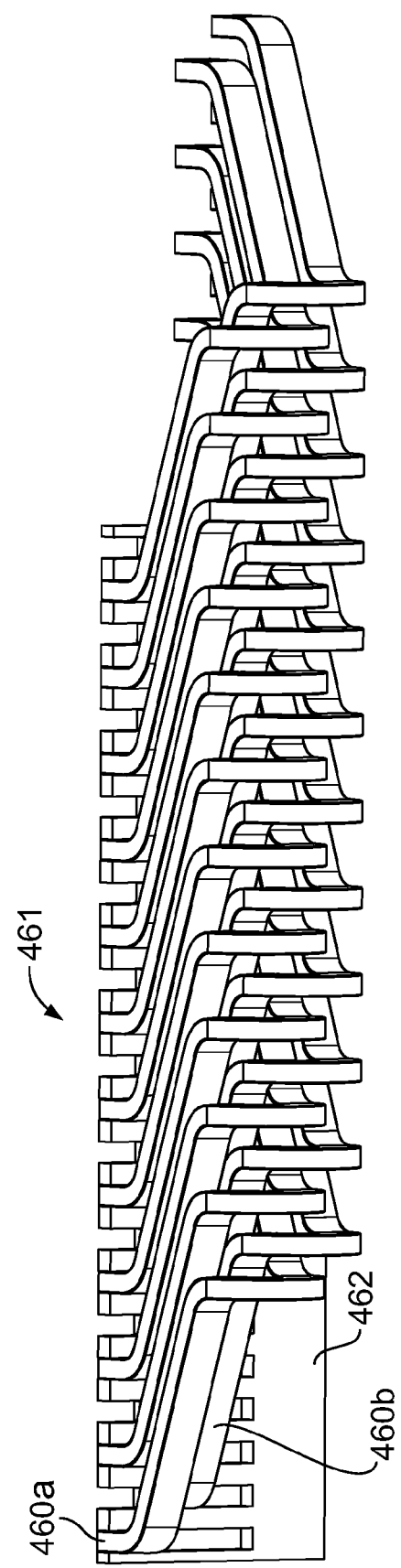
FIG. 4M is a schematic of example end turns.
Figure 4N:
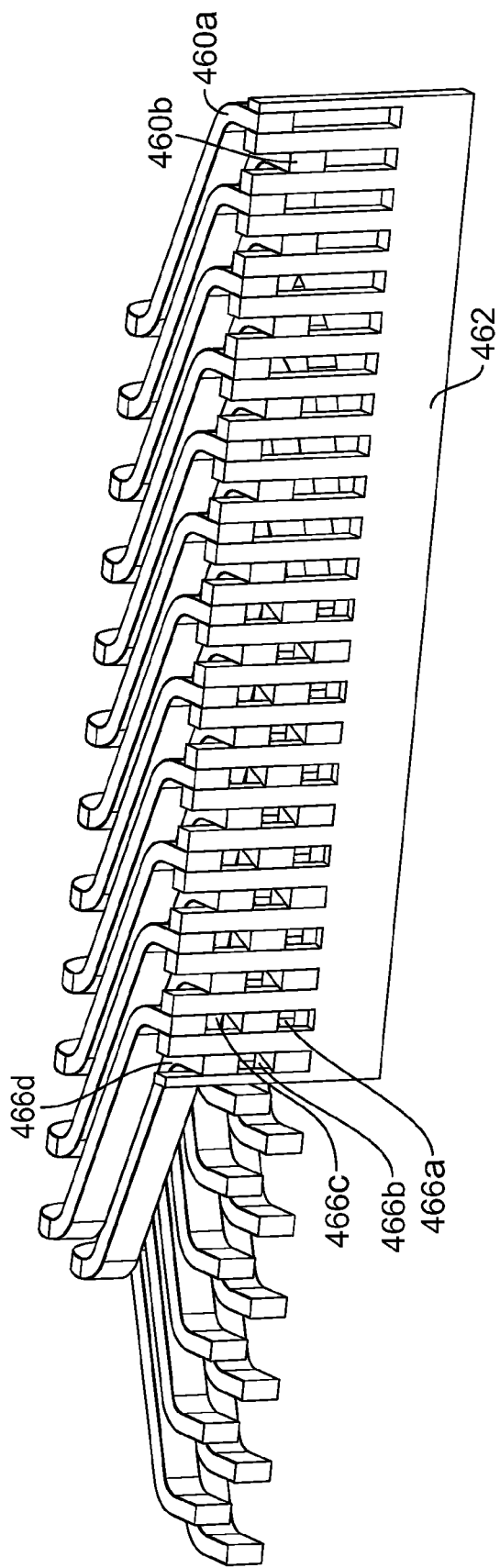
FIG. 4N is a schematic of example end turns.
Figure 40:
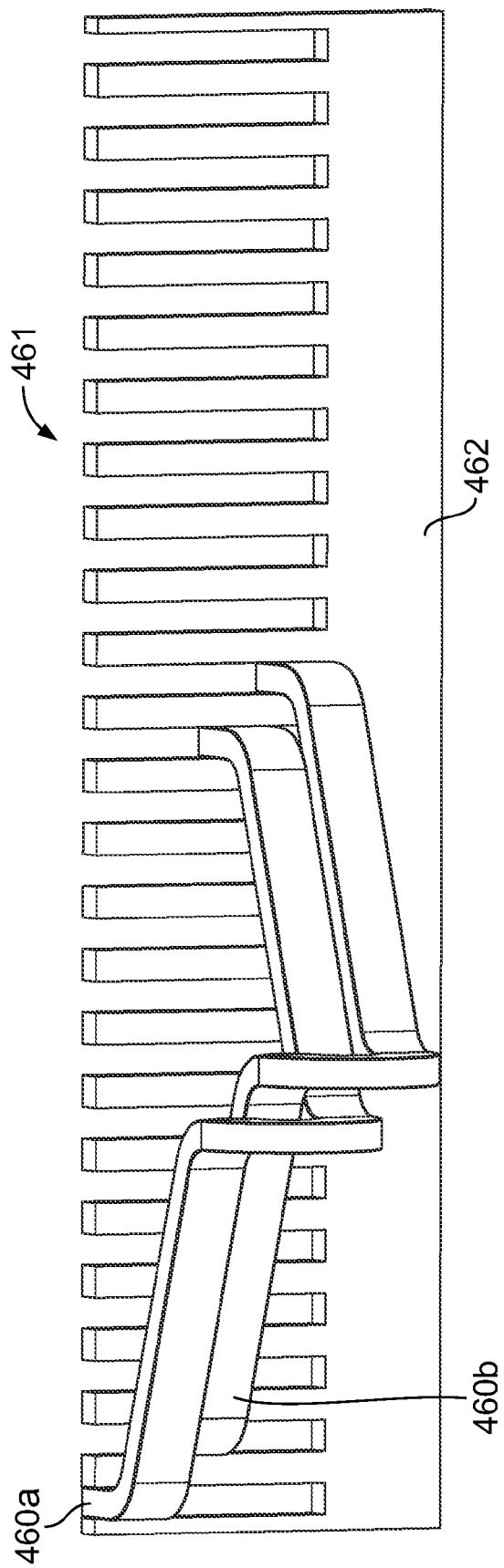
Figure 4R:
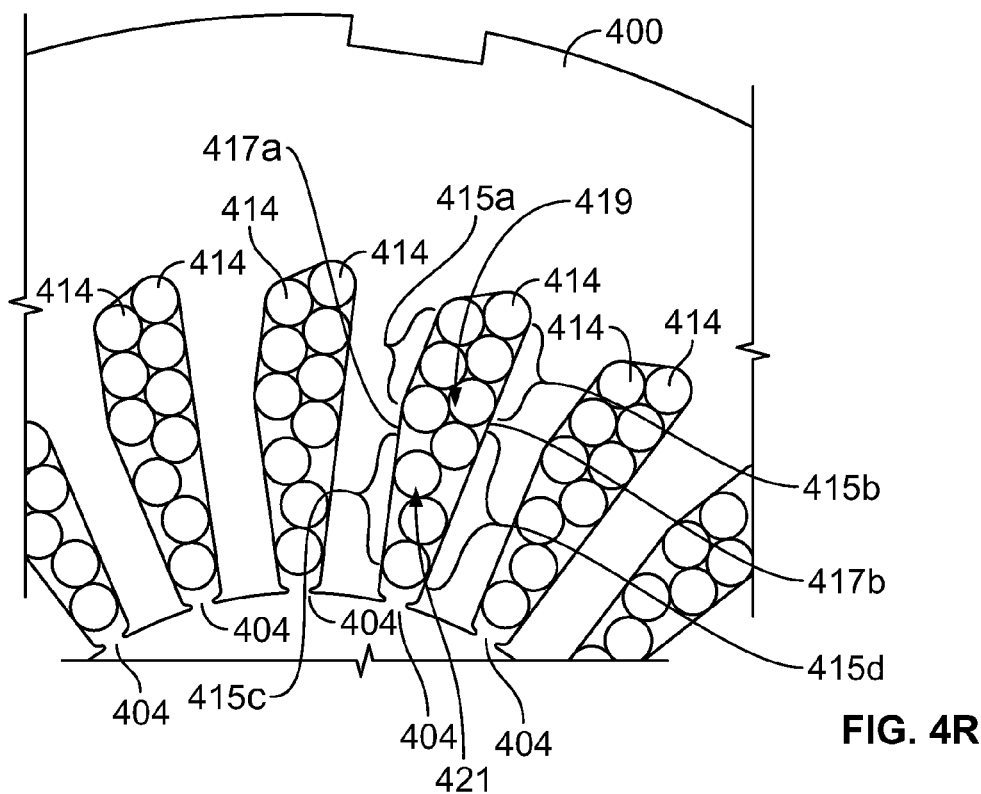
FIG. 4R is a partial schematic cross-sectional view of an example core of a stator for an electric machine.
Figure 4S:
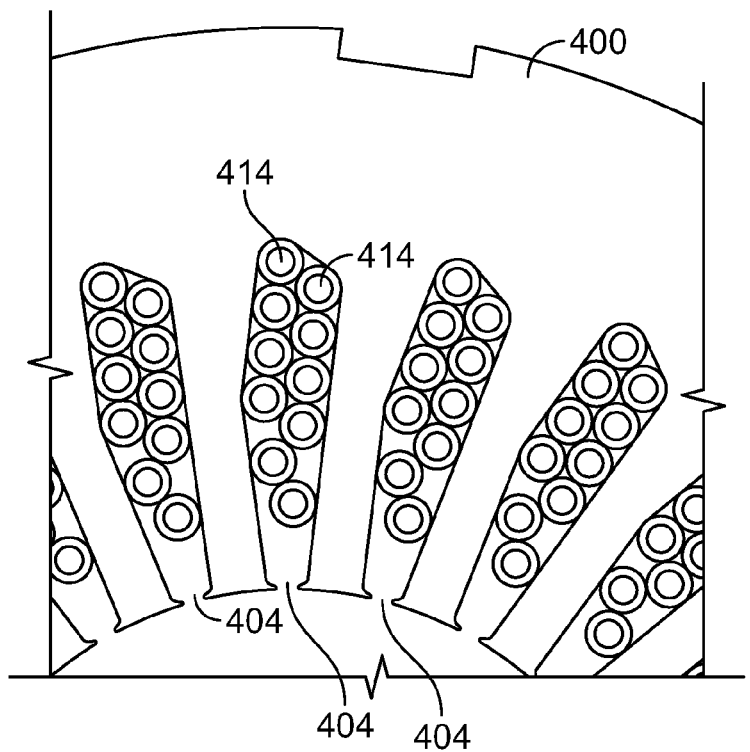
FIG. 4S is a partial schematic cross-sectional view of an example core of a stator for an electric machine.
Figure 4T:
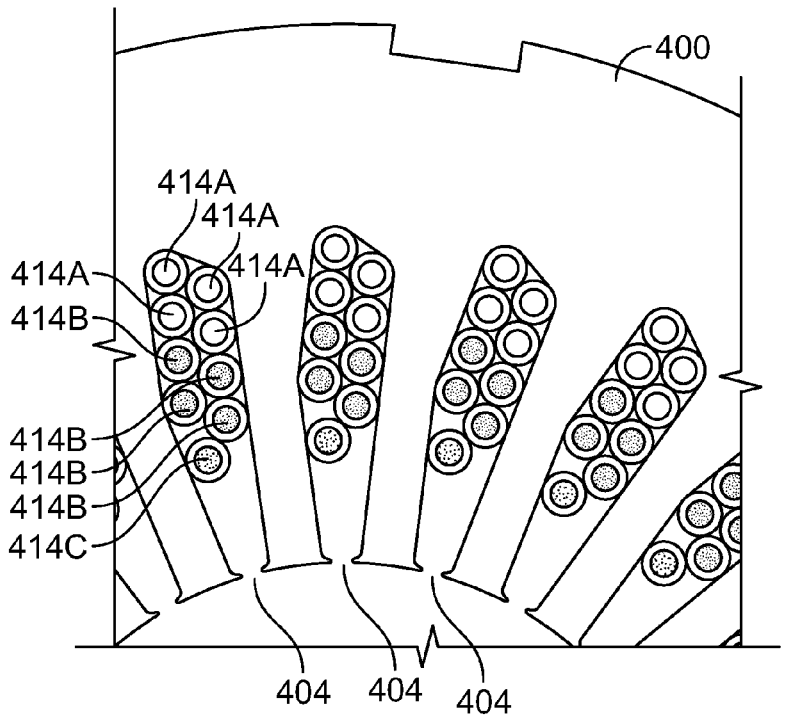
FIG. 4T is a partial schematic cross-sectional view of an example core of a stator for an electric machine.
Figure 4U:
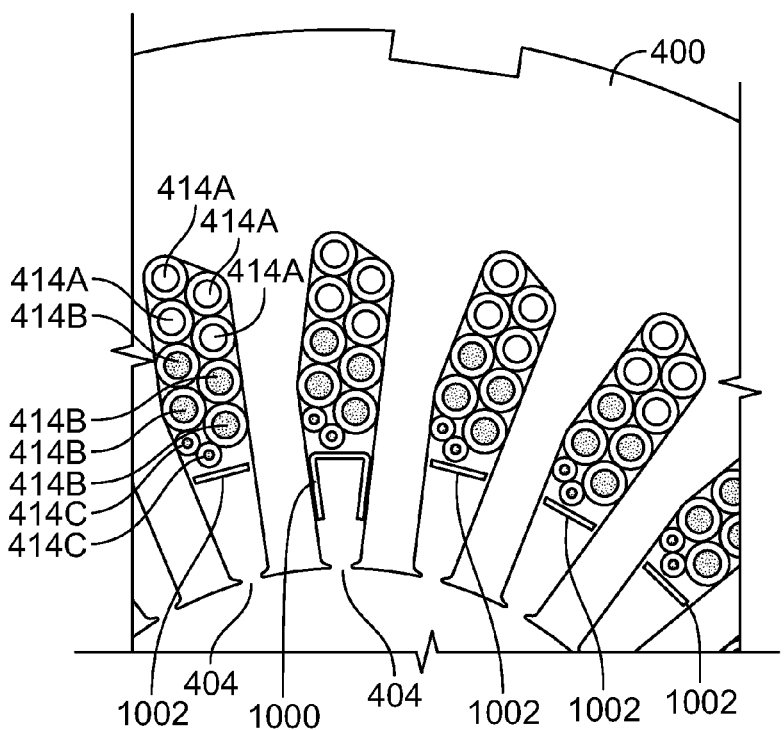
FIG. 4U is a partial schematic cross-sectional view of an example core of a stator for an electric machine.
Figure 4V:
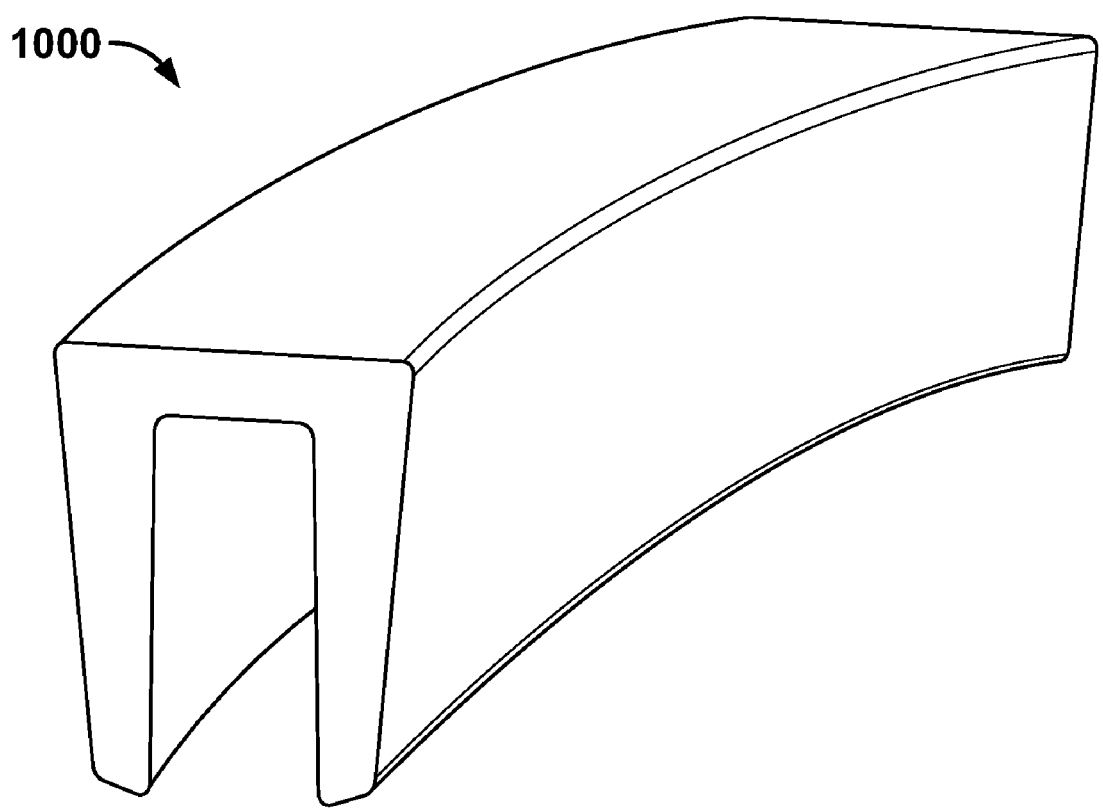
FIG. 4V is a perspective view of an example wedge for insertion into one or more stator core slots.
Figure 4W:
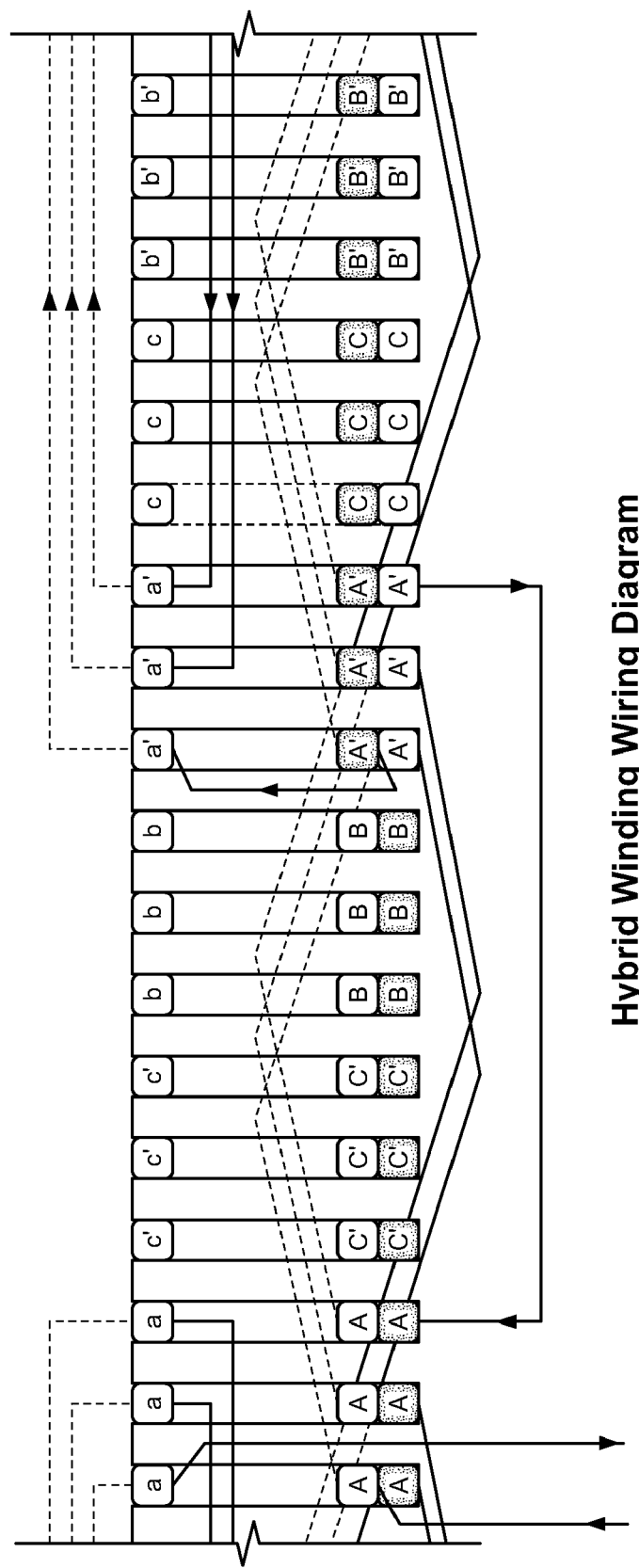
FIG. 4W is a wiring diagram showing connections for one phase of a three phase electric machine.
Figure 4X:
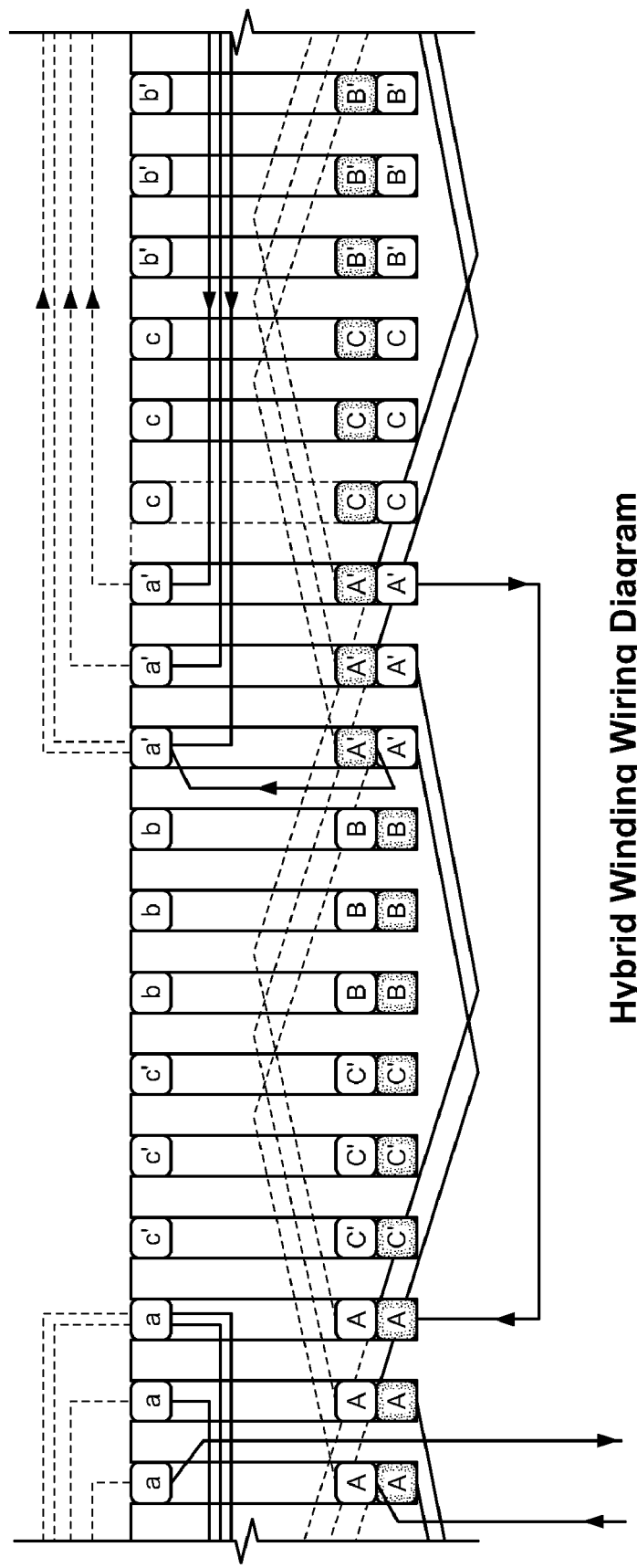
FIG. 4X is a wiring diagram showing connections for one phase of a three phase electric machine.
Figure 4Y:
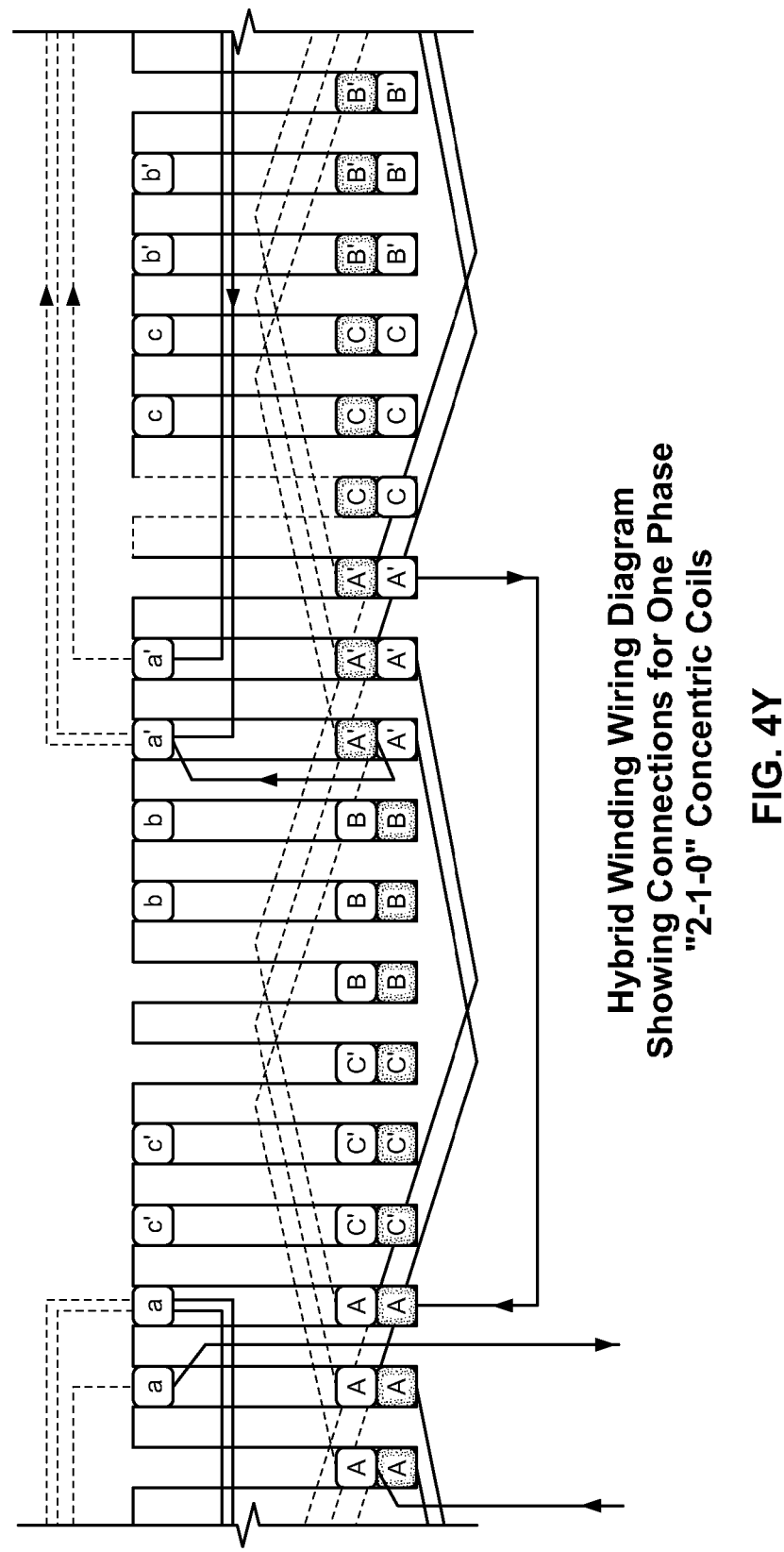
FIG. 4Y is a wiring diagram showing connections for one phase of a three phase electric machine.
Figure 4Z:
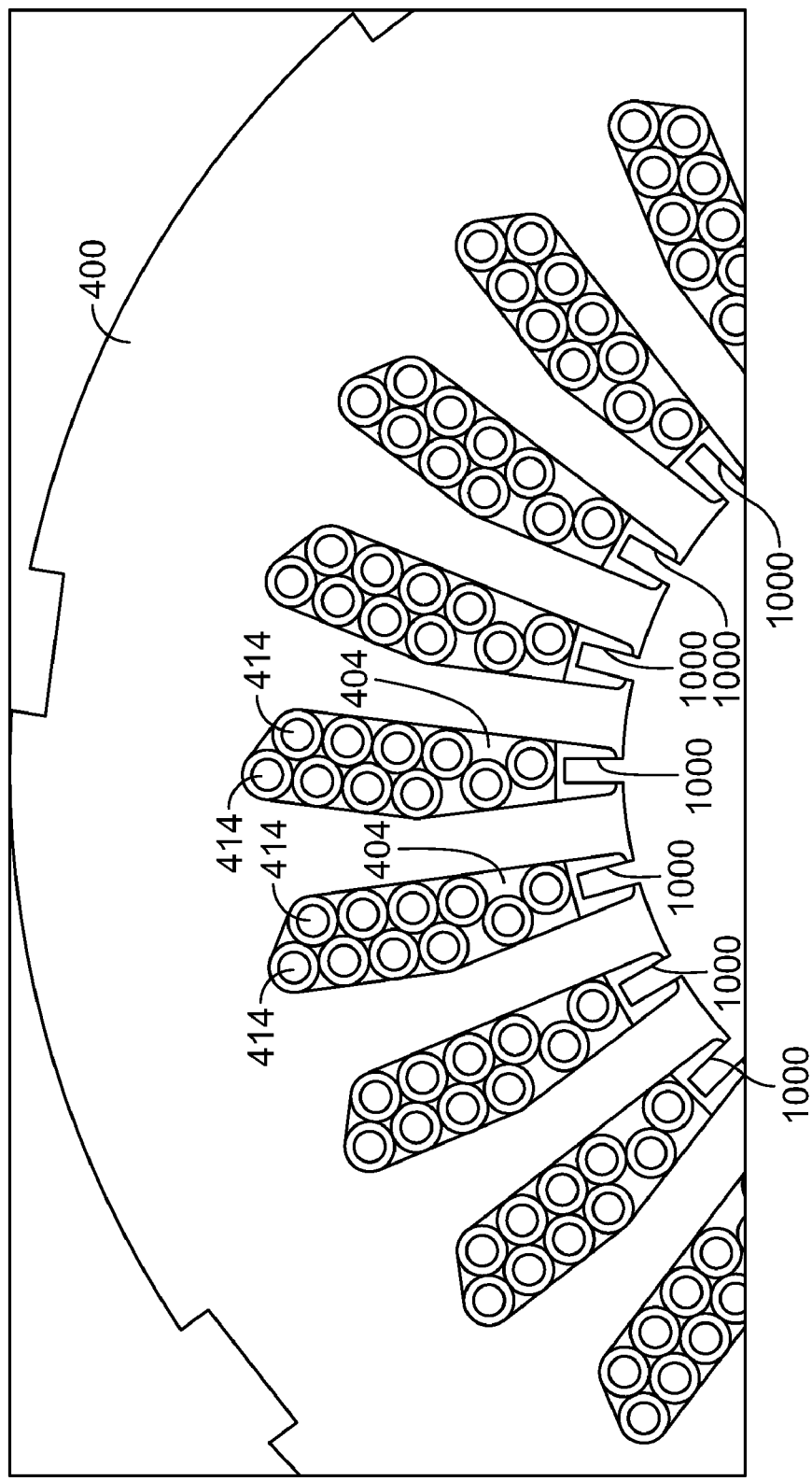
FIG. 4Z is a partial schematic end view of an example core of a stator for an electric machine.
Figure 4A:
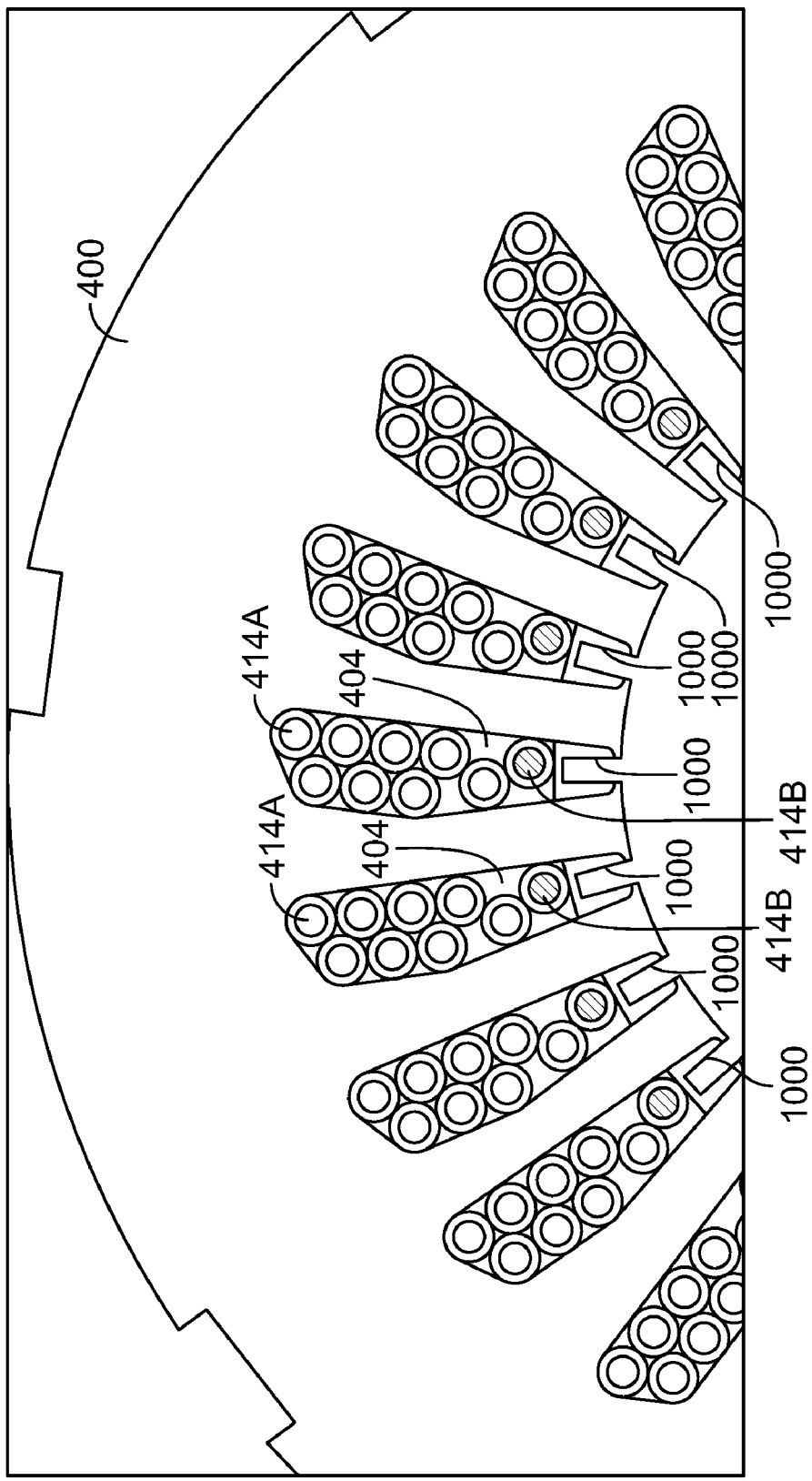
Figure 4B:
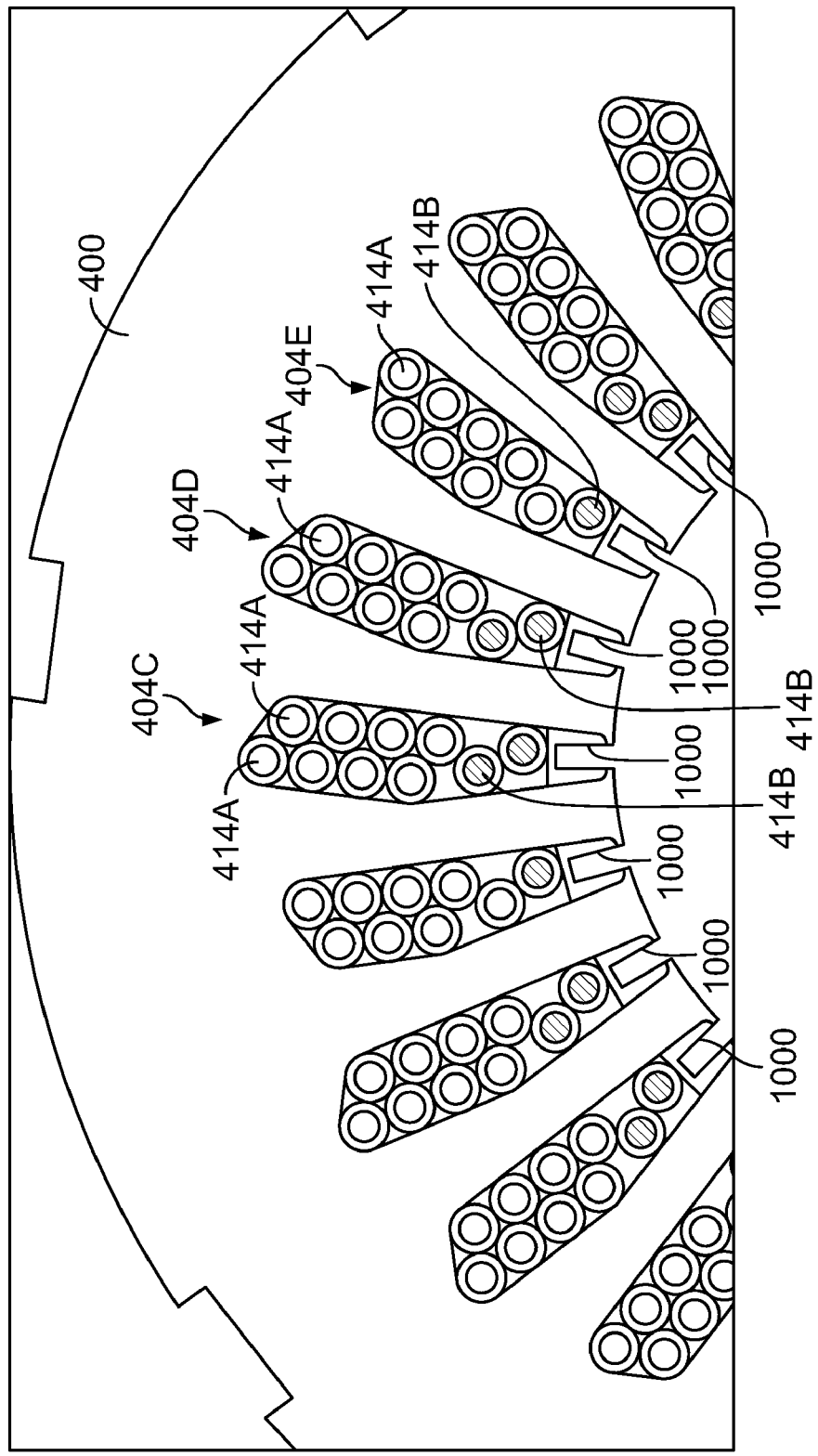
Figure 4C:
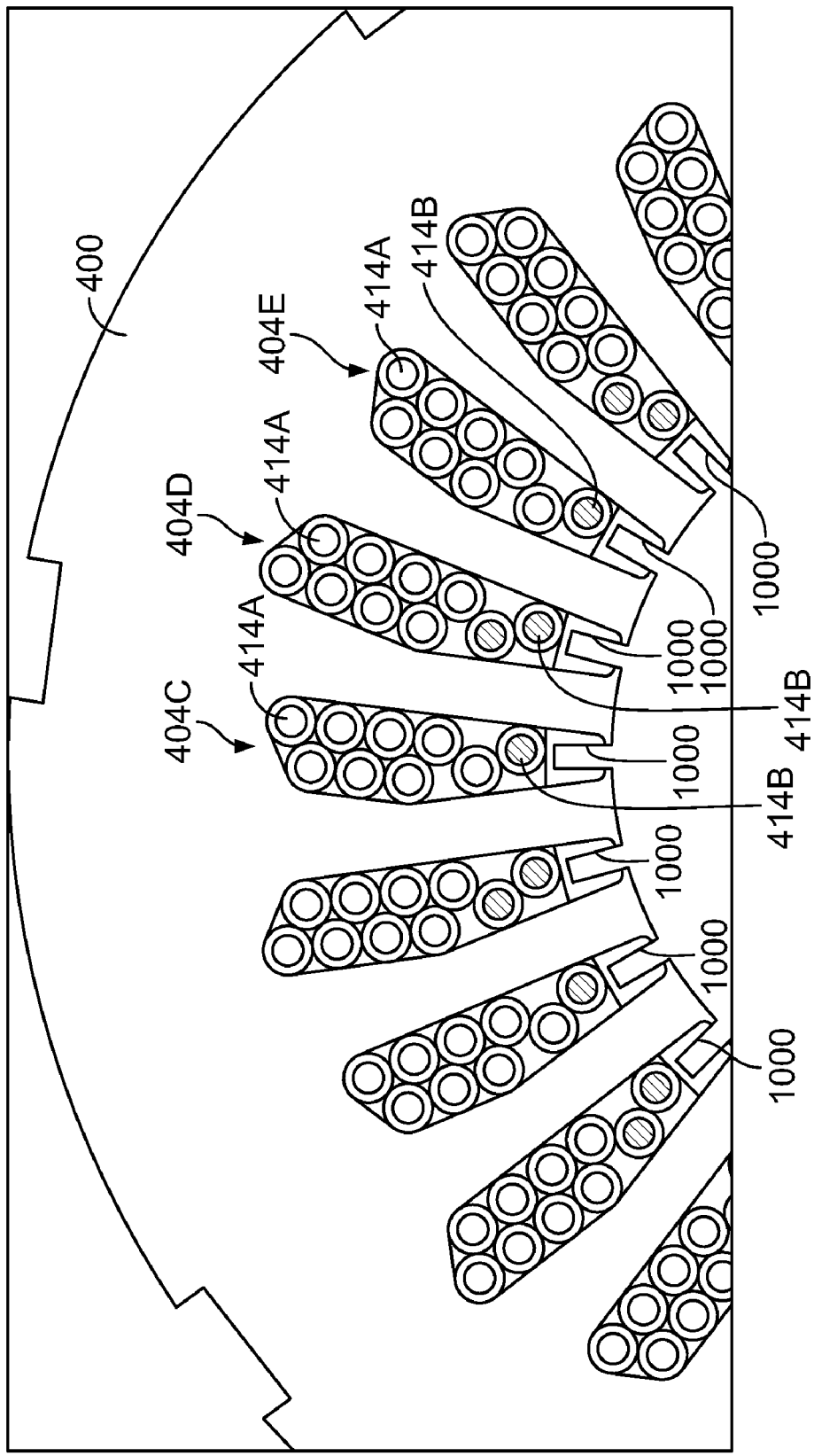
Figure 4D:
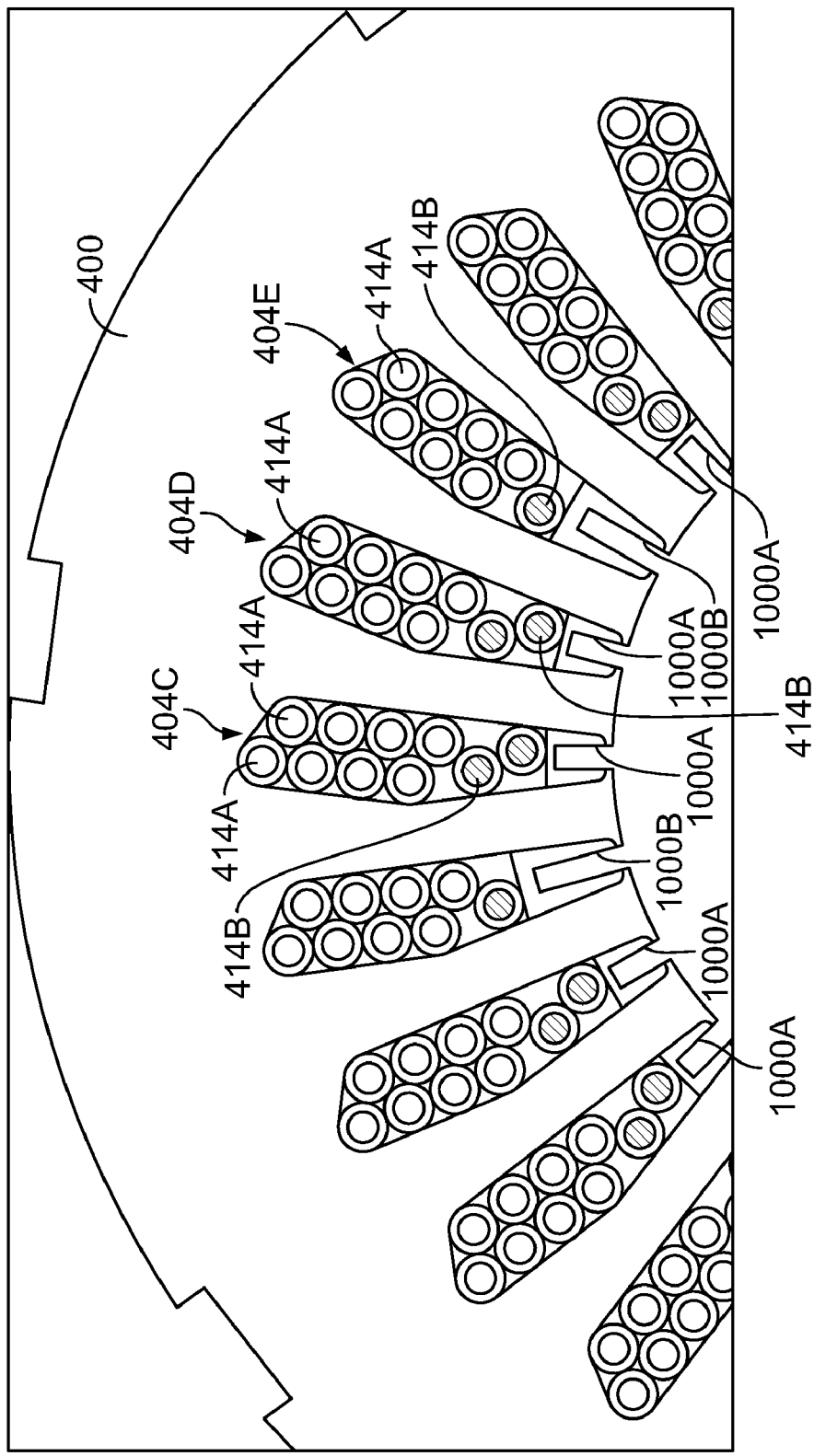
Figure 4E:
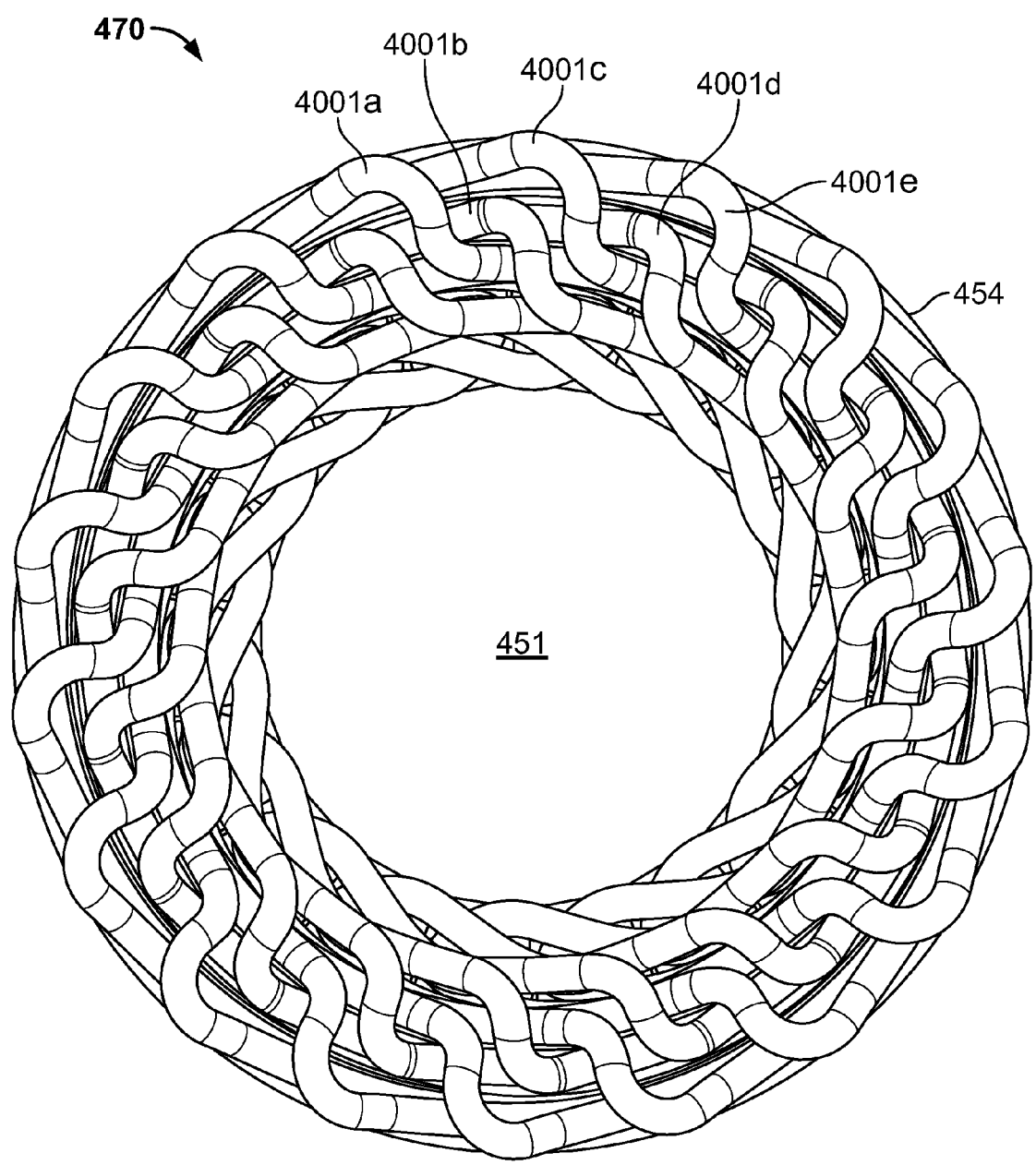
Figure 4F:
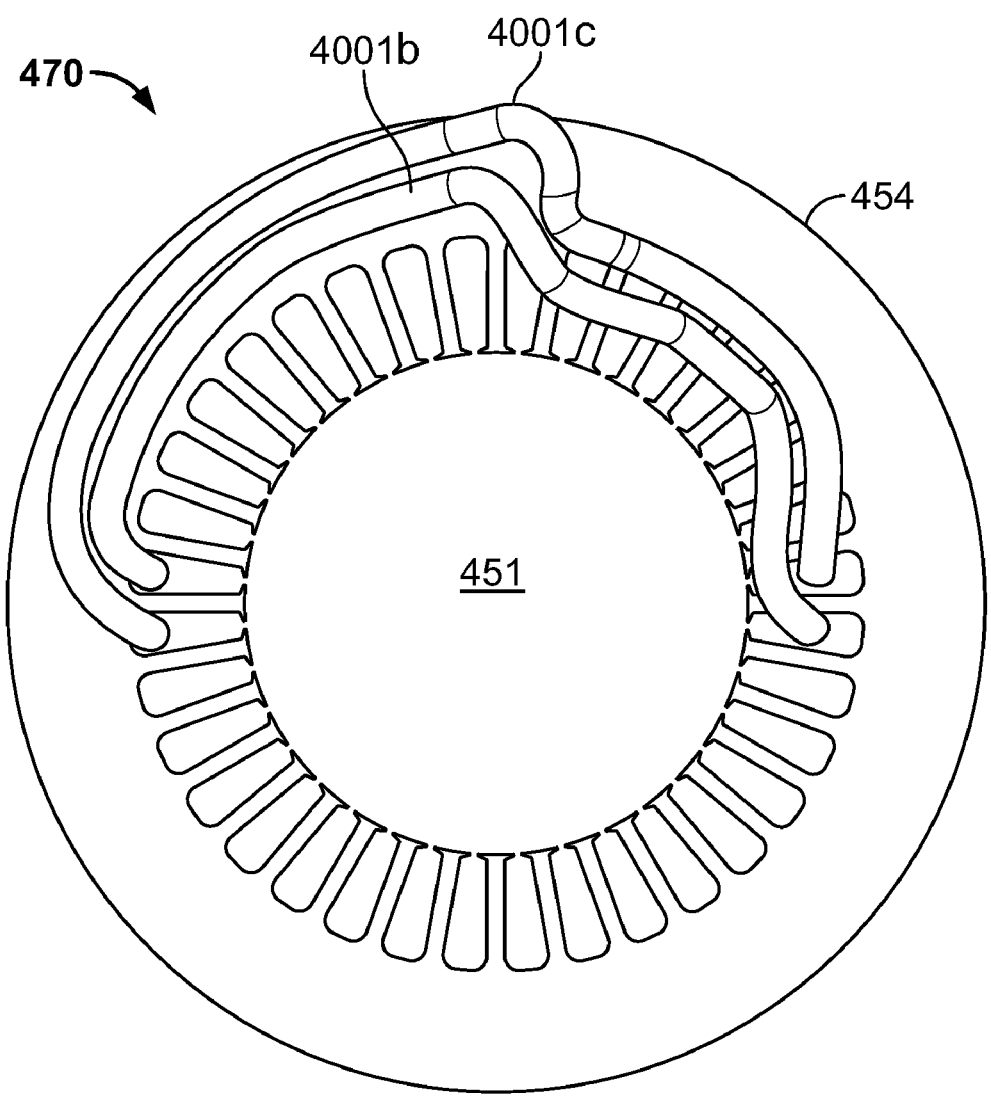
Figure 4G:
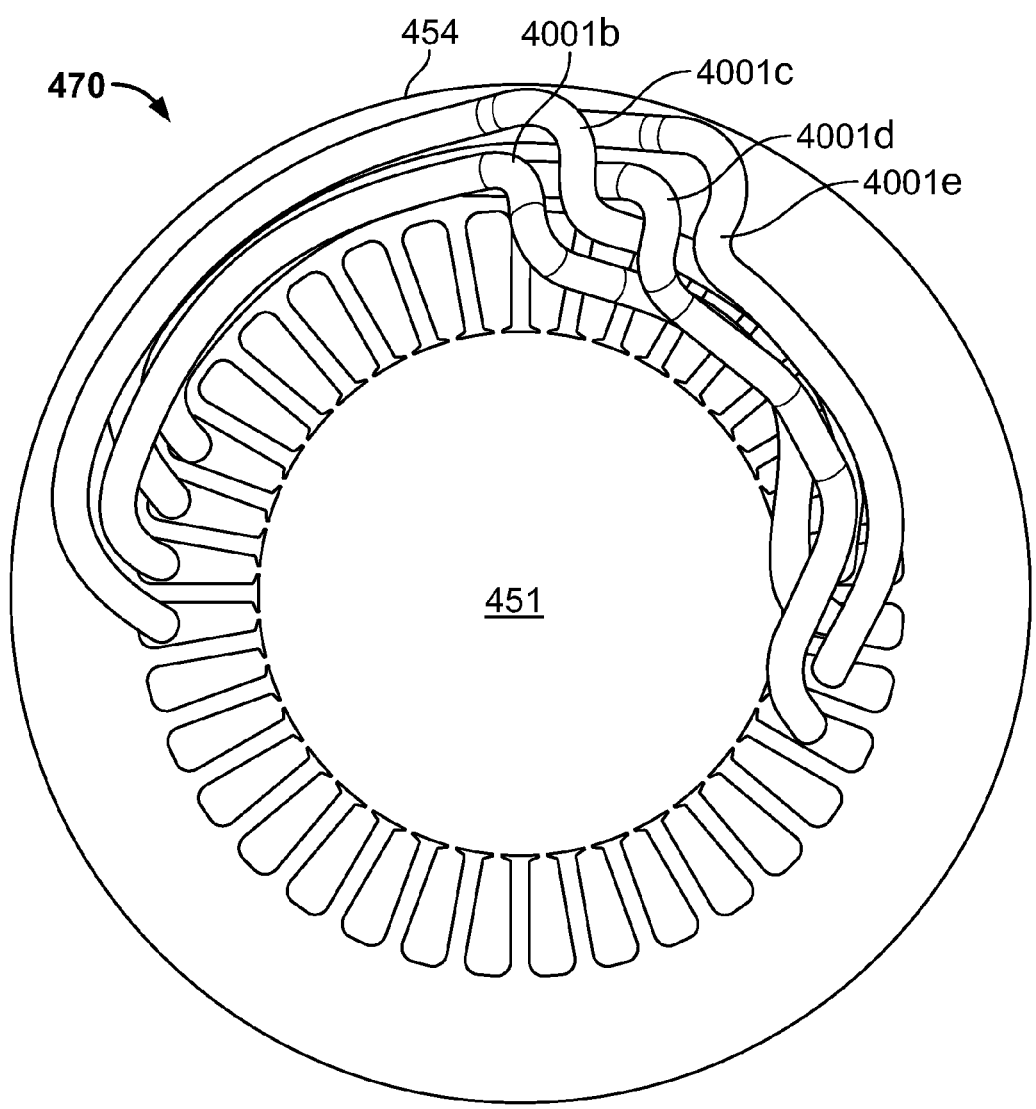
Figure 4H:
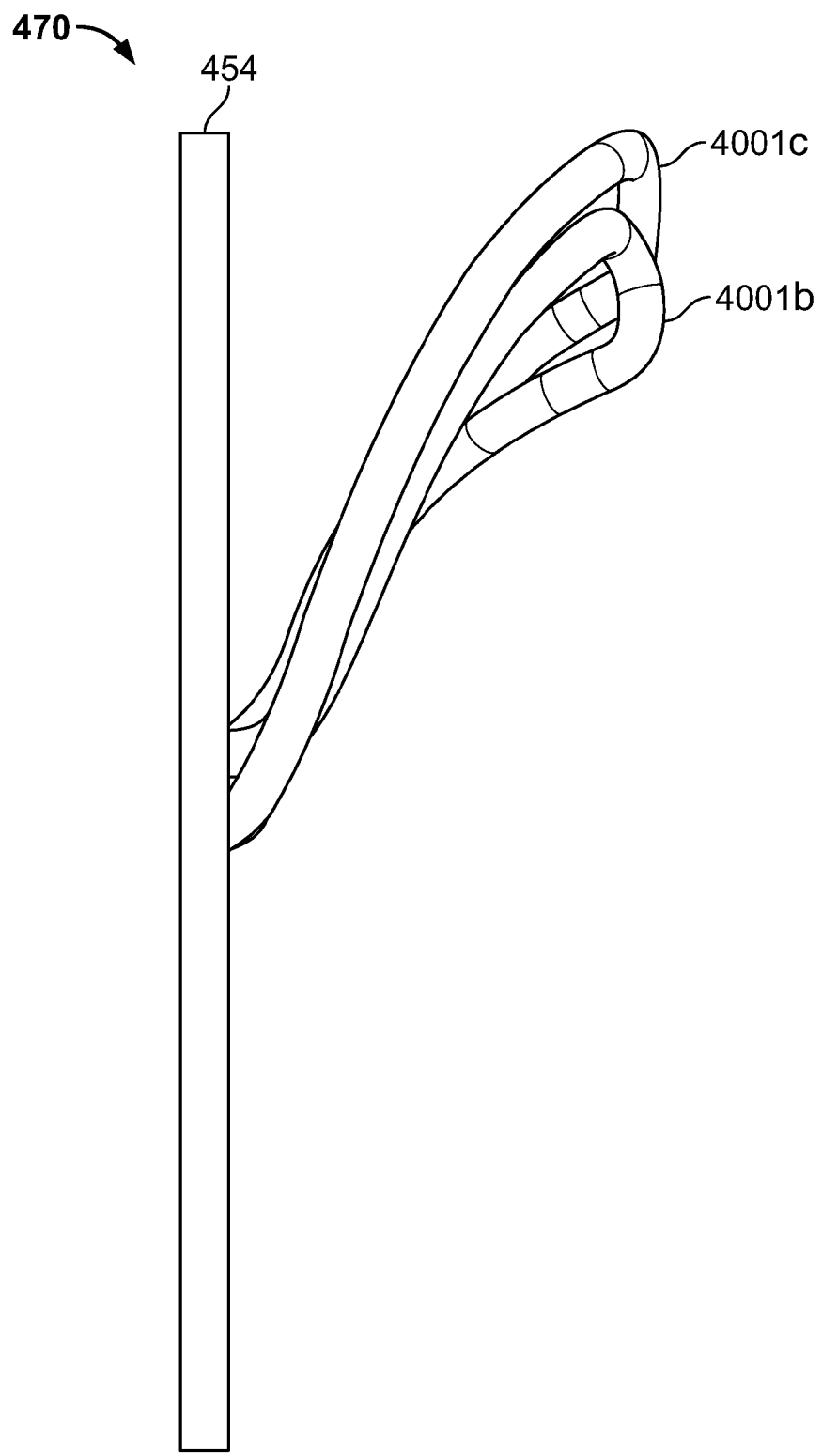
Figure 4I:
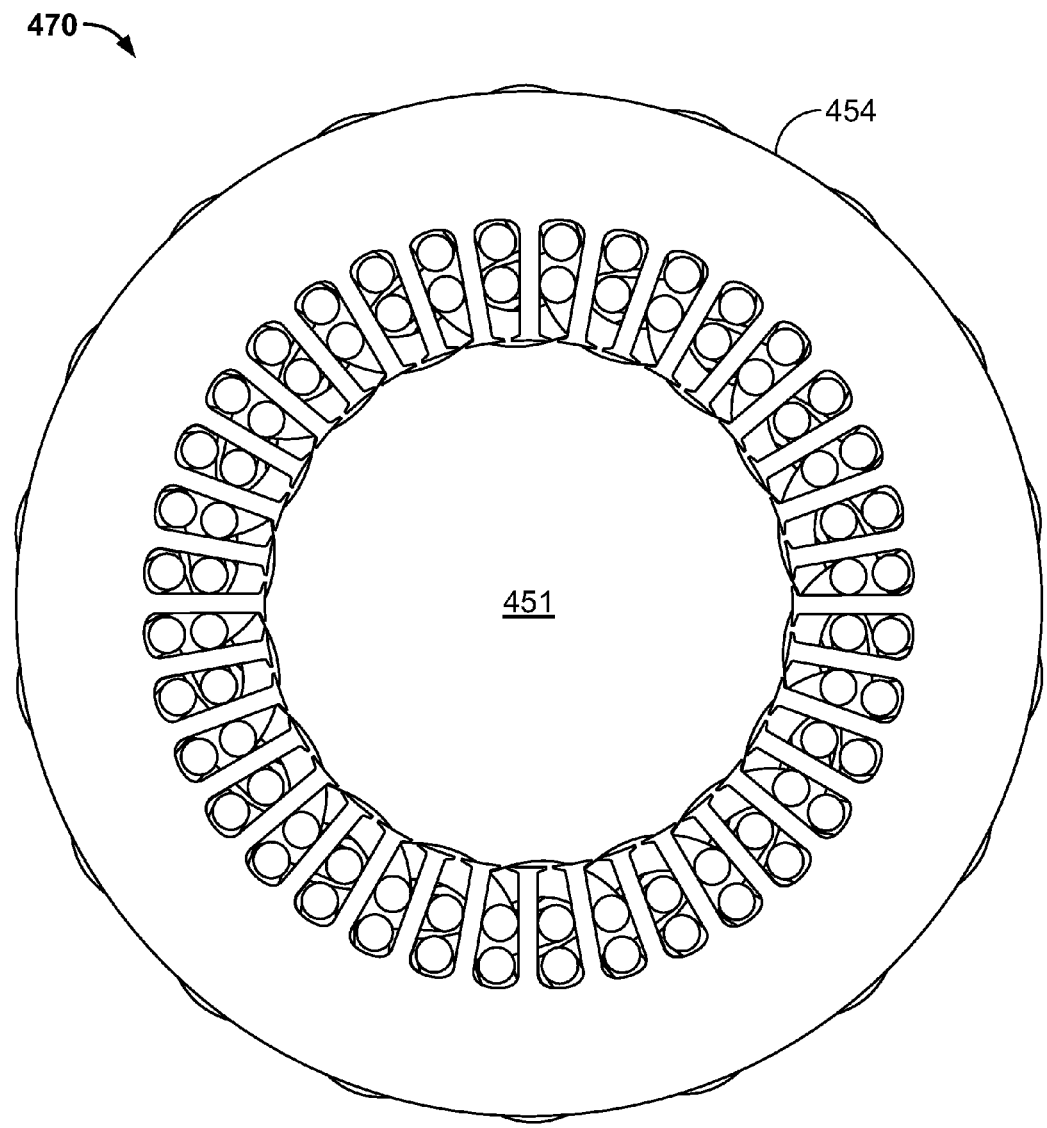
Figure 4J:
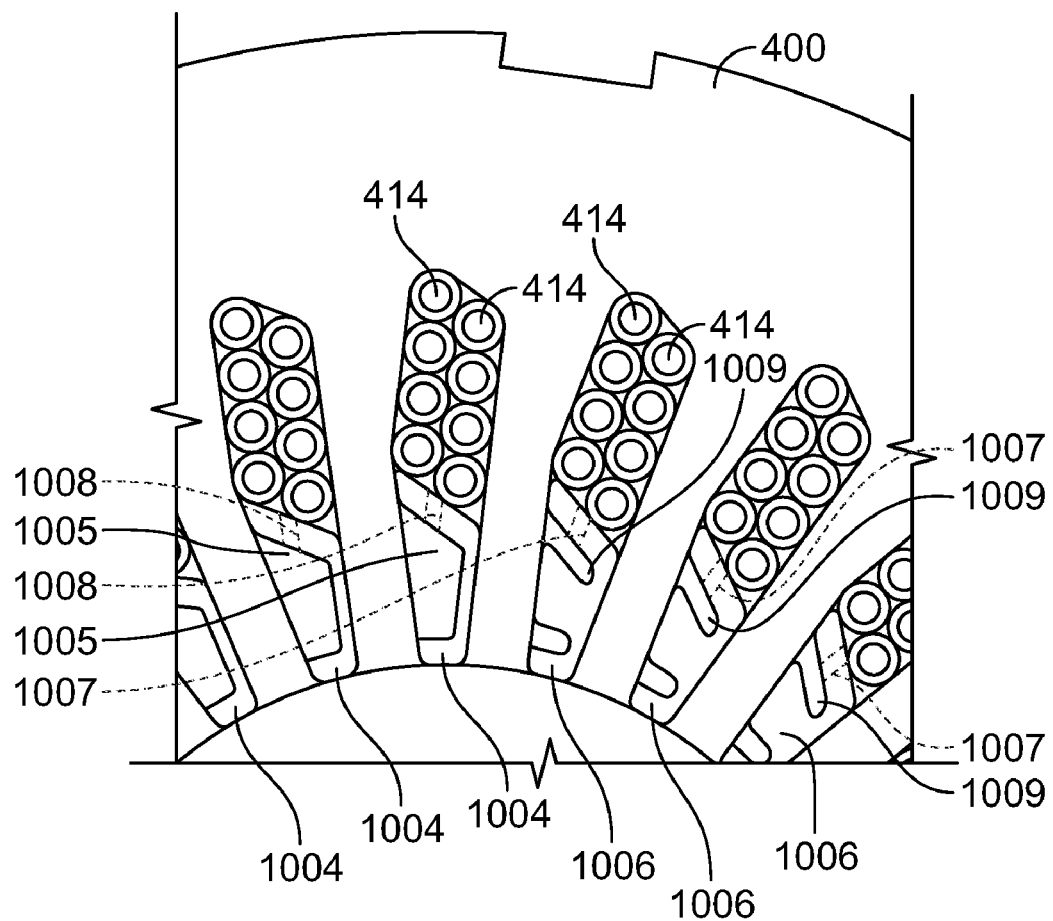
Figure 4K:
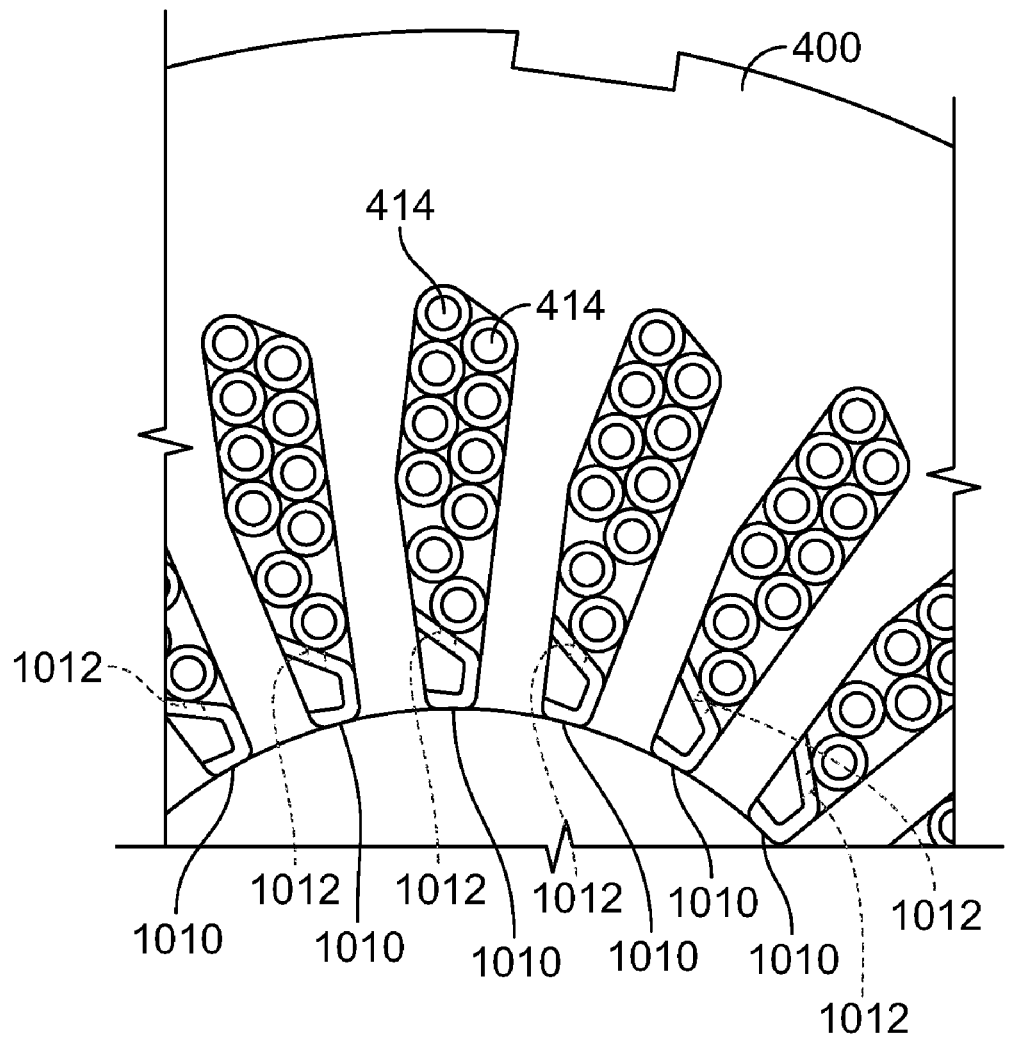
Figure 4L:
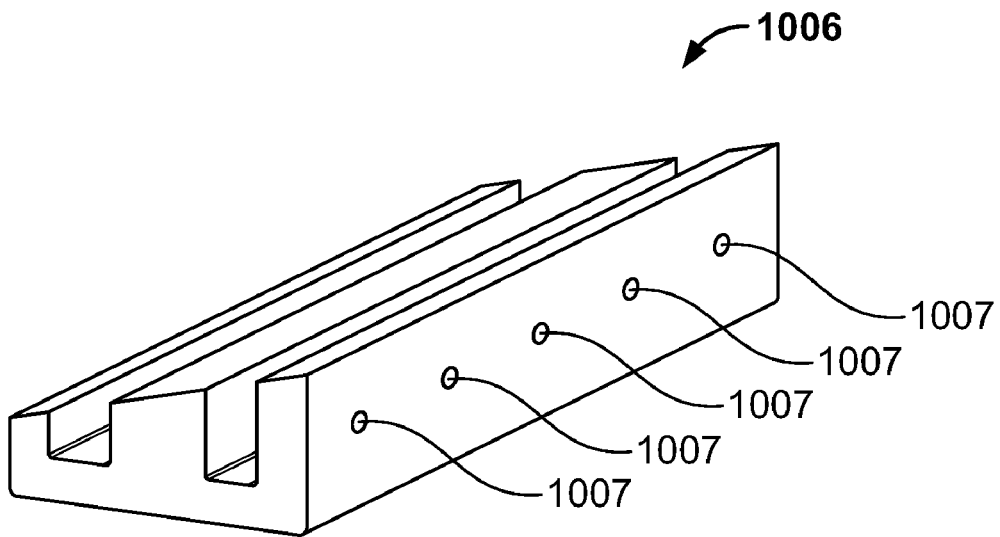
FIG. 4L is a schematic of two example end turns.
Figure 4M:
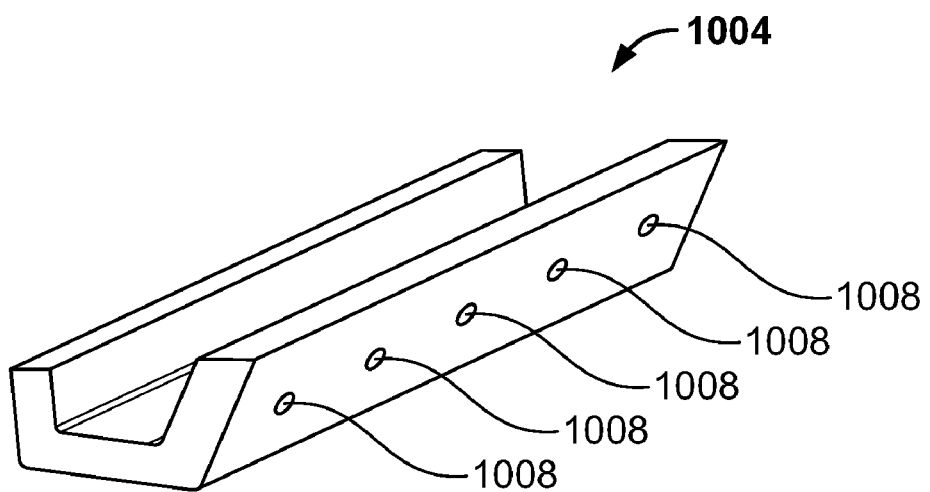
Figure 4N:
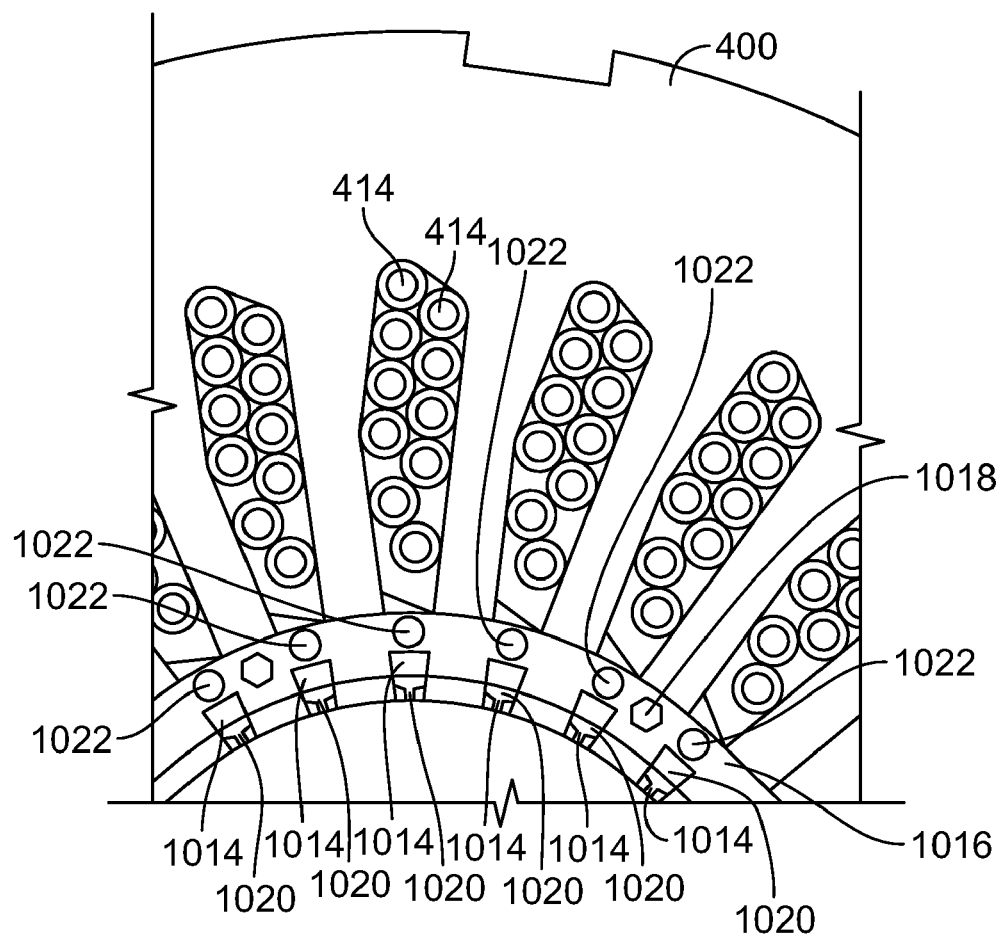

FIG. 4L is a schematic of an example end turn 460 and an example end turn 4200. The example end turn 460 can be included in the stator 108 of electric machine 102. The example end turn 460 can be included in a lap winding configuration that includes two interleaved sets of end turns that form an end turn bundle having four radial layers. The example end turn 4200 is designed for a traditional lap winding configuration that does not include interleaved sets of end turns. In their respective configurations in stators of substantially equal radial dimension, the example end turns 460 and 4200 can span the same azimuthal angle. FIG. 4L includes example dimensions of the end turns 460 and 4200. In some cases, an end turn has different dimensions.

FIG. 4M is a schematic perspective view of example end turns 460 and a portion of a stator core 462. The radial dimension of the stator is mapped to a linear dimension in FIG. 4M for purposes of illustration. The end turns 460 represent the end turns 452 in a rectilinear coordinate system. The core 462 represents the core 454 in a rectilinear coordinate system. The end turns 460 include two groups of end turns that form four interleaved radial layers of end turns represented in a rectilinear coordinate system. A first group of end turns, that includes end turn 460a, includes multiple end turns at the same radial position as end turn 460a and circumferentially offset from end turn 460a. A second group of end turns, that includes end turn 460b, includes multiple end turns at the same radial position as end turn 460b and circumferentially offset from end turn 460b.

FIG. 4N is a schematic perspective view of the portion of the example stator core 462 and the example end turns 460a and 460b represented in a rectilinear coordinate system. As illustrated in FIG. 4N, the ends of the end turns 460 and the core 462 define gaps 466 in the slots of the stator core. Each slot includes two gaps. One gap is between the ends of two different end turns. A gap 466a is formed in a first slot at a first radius between the stator core and the end of an end turn residing in the first slot; a gap 466b is formed in a second slot at a second radius between the ends of two end turns residing in the second slot; a gap 466c is formed in the first slot at a third radius between the ends of two end turns residing in the first slot; and a gap 466d is formed in the second slot at a fourth radius beyond the end of an end turn residing in the second slot. In some cases, coolant fluid (e.g., air, nitrogen, or another gas) can flow through the gaps 466 in the slots to cool the conductive windings. For example, the gaps 466 can extend axially between the axial ends of the stator and provide a coolant flow path along all or part of the axial length of the stator. Coolant fluid can flow between the axial sections of the conductive windings in the stator core (e.g., in gaps 466b and 466c). Coolant fluid can flow between an axial section of the conductive windings and the stator core (e.g., in gap 466a). Coolant fluid can flow between an axial section of the conductive windings and the rotor (e.g., in gap 466d). The coolant can flow from a mid-stack inlet to a volume surrounding the end turns to cool the end turns and the axial sections of the windings. The coolant can flow to a mid-stack outlet from a volume surrounding the end turns to cool the end turns and the axial sections of the windings. Coolant can additionally or alternatively flow in an gap between the rotor and the stator.

In some cases, the slots have alternating depths. For example, some of the slots in the core 462 may have a shallow slot depth, eliminating or reducing the volume of the gap 466a. This may enhance magnetic flux properties of the stator.

Figure 4O:
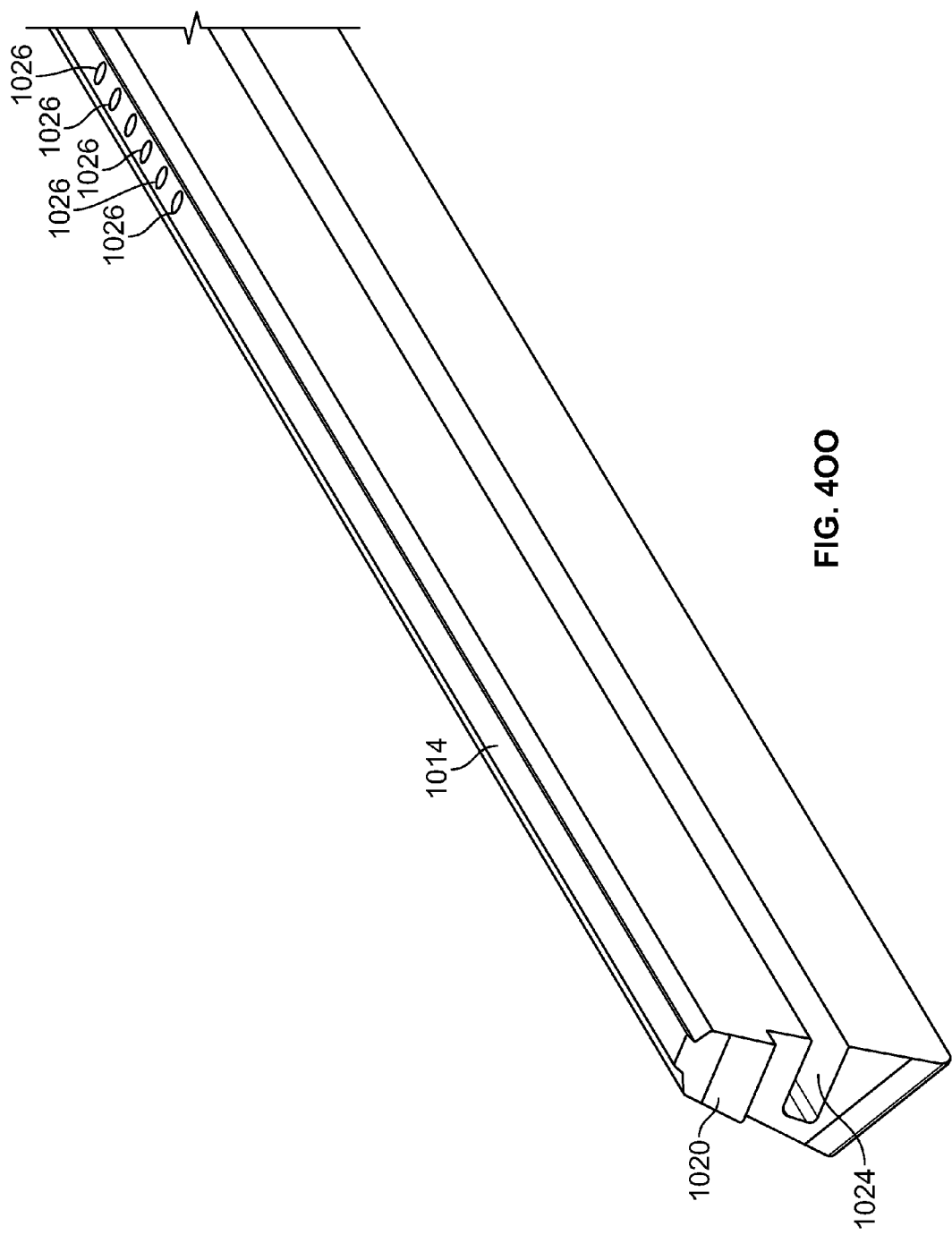
FIG. 4O is a schematic of example end turns.

FIG. 4O is a schematic perspective view of example end turns represented in a rectilinear coordinate system. Only two end turns 460a and 460b are shown in FIG. 4O for clarity of illustration.

Figure 4P:
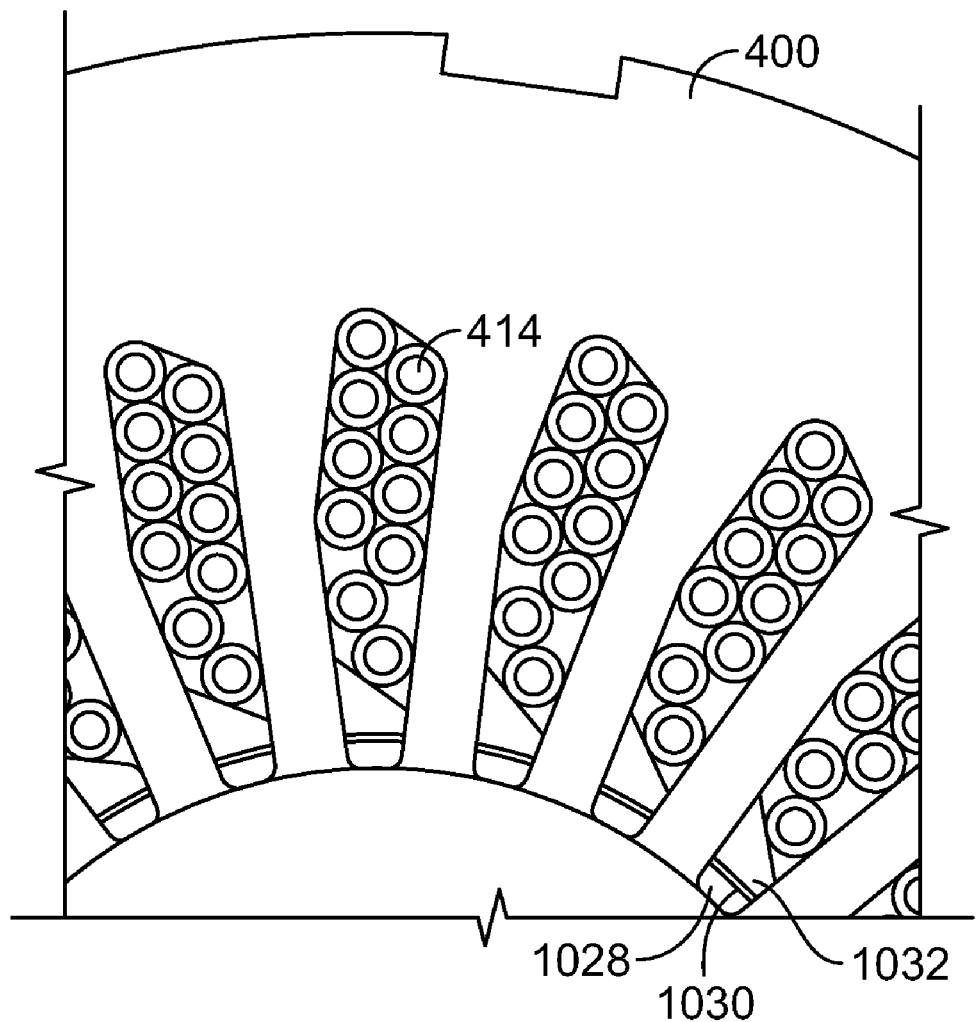
FIG. 4P is a schematic side view of example end turns of a stator for an electric machine.
Figure 4T:
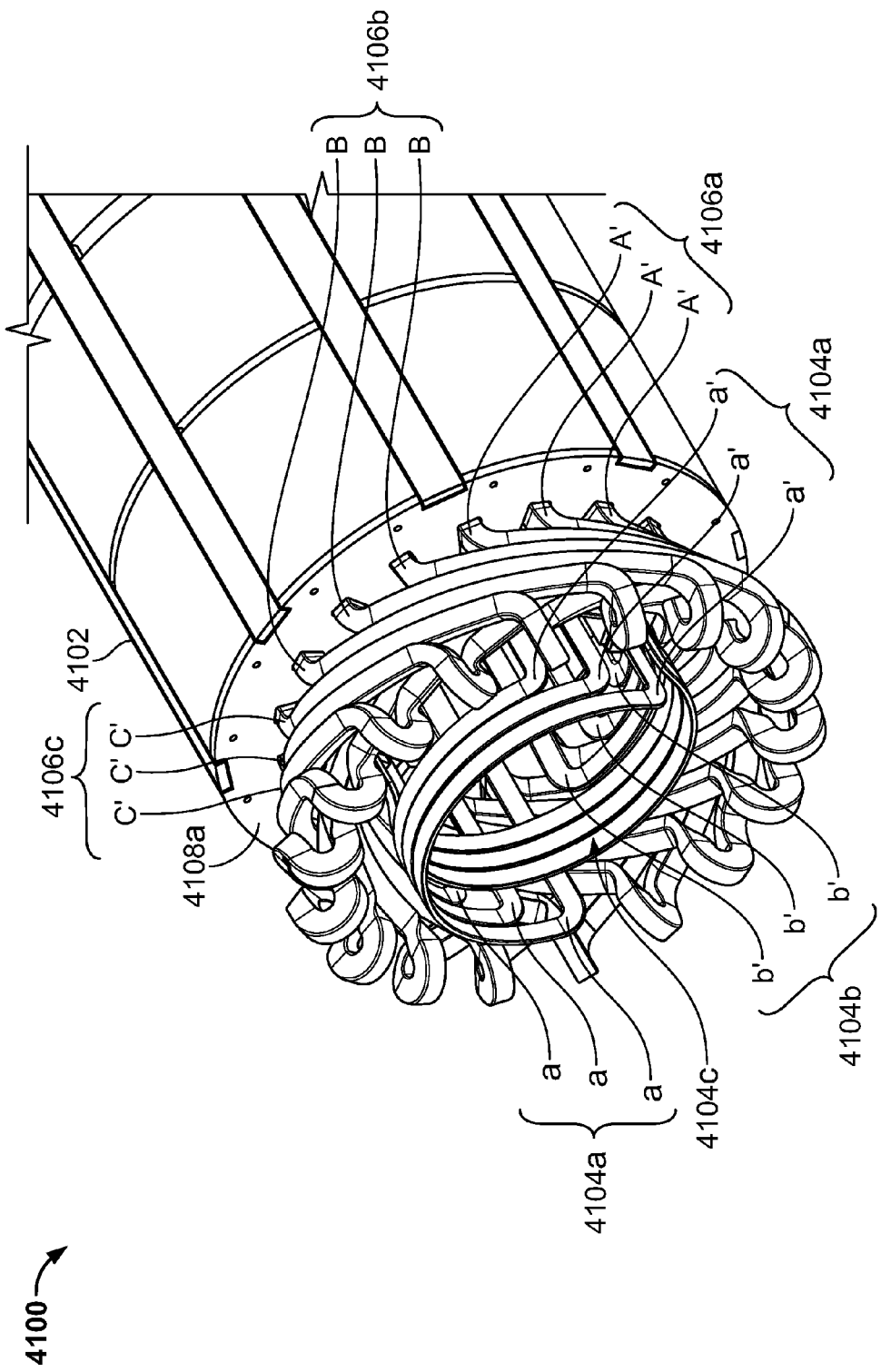
Figure 4U:
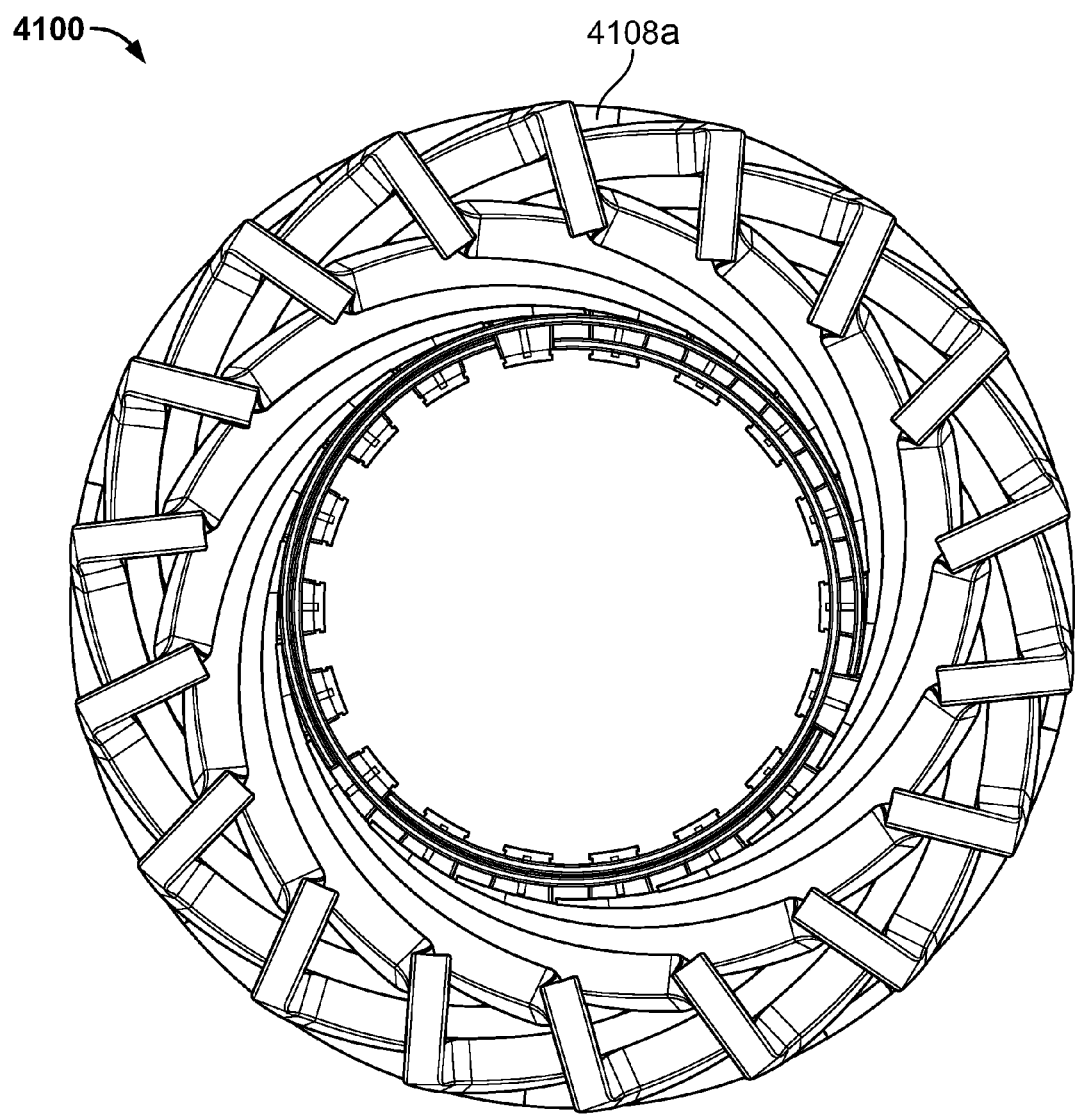
Figure 4V:
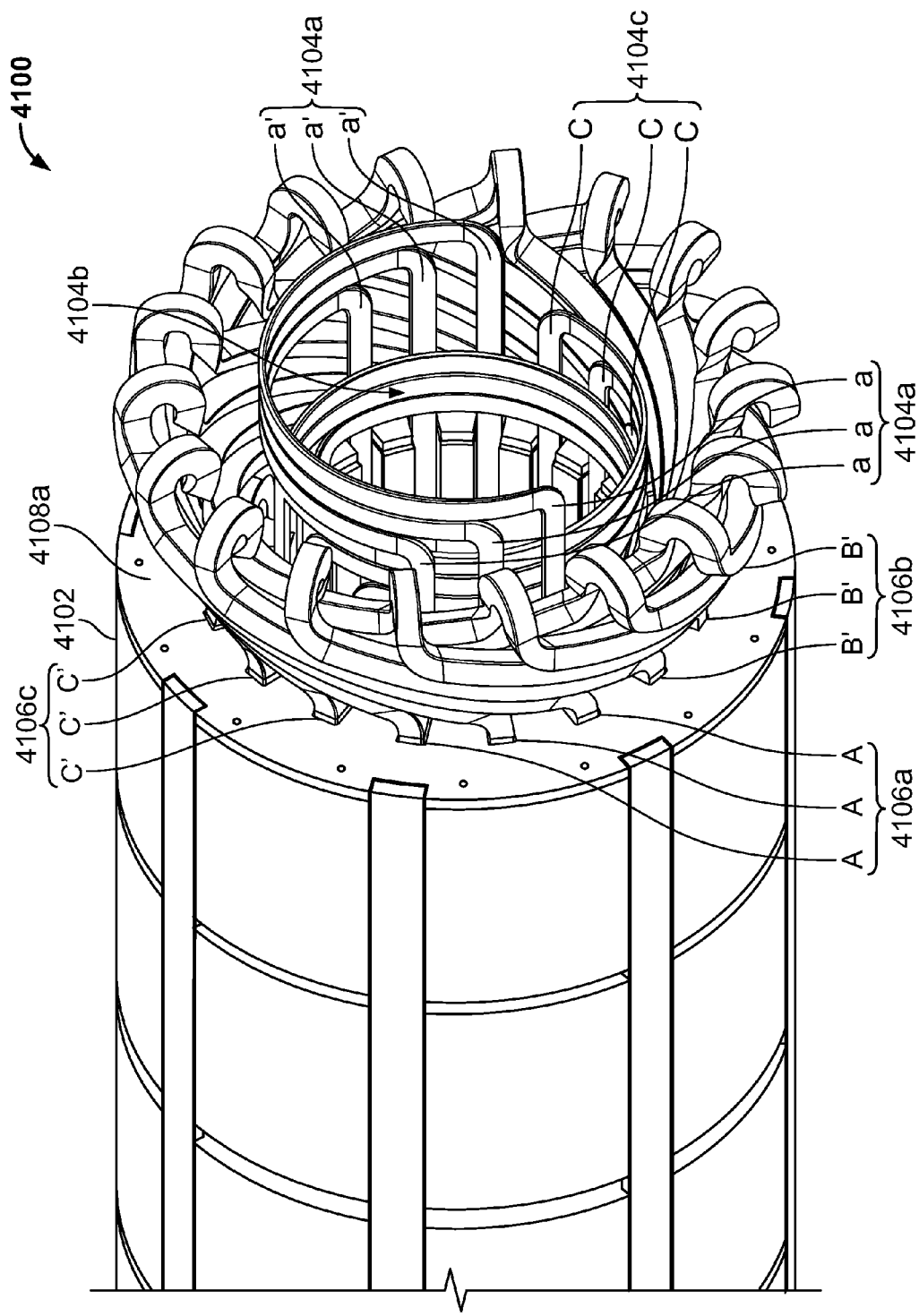
Figure 4W:
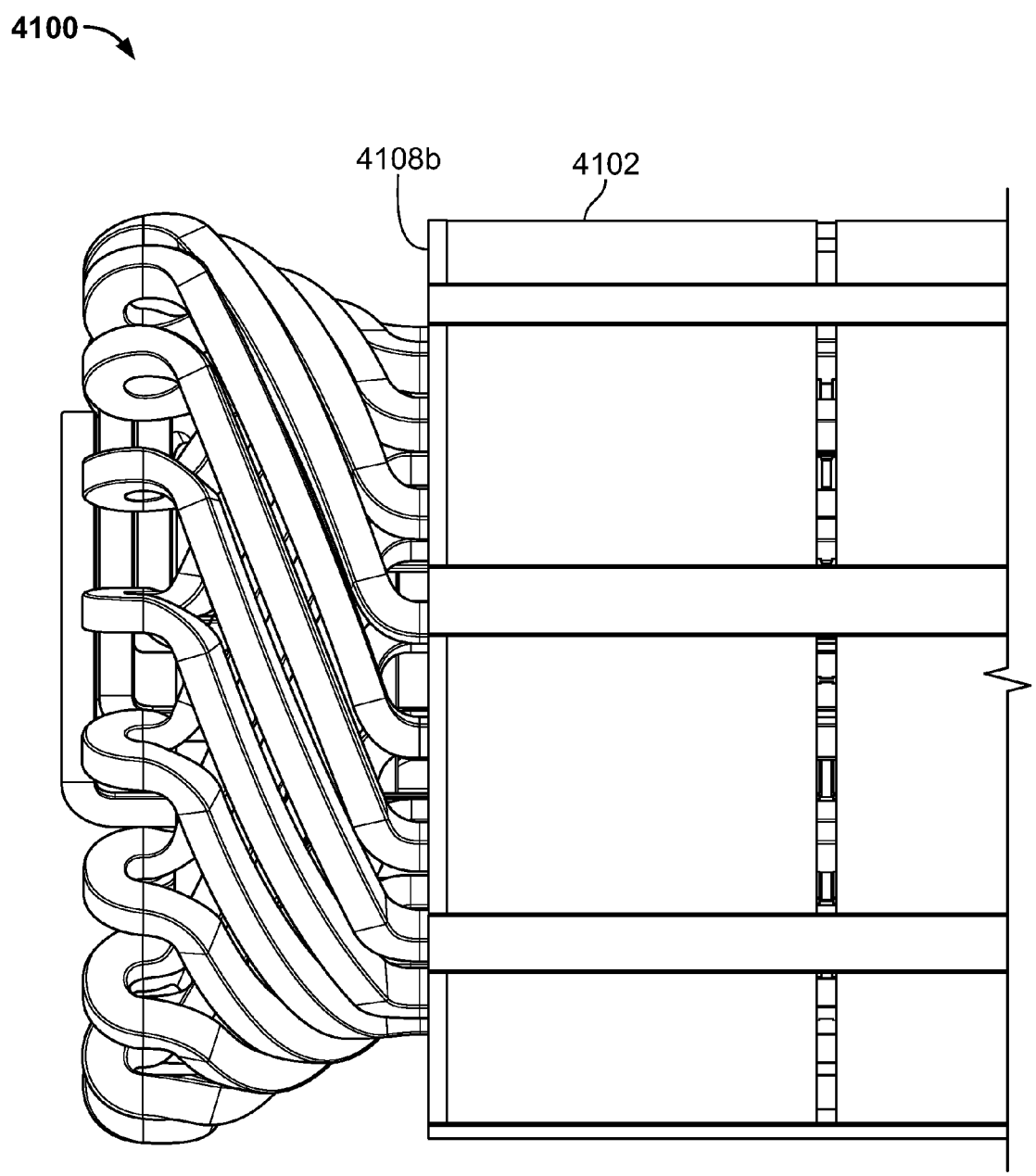
Figure 4X:
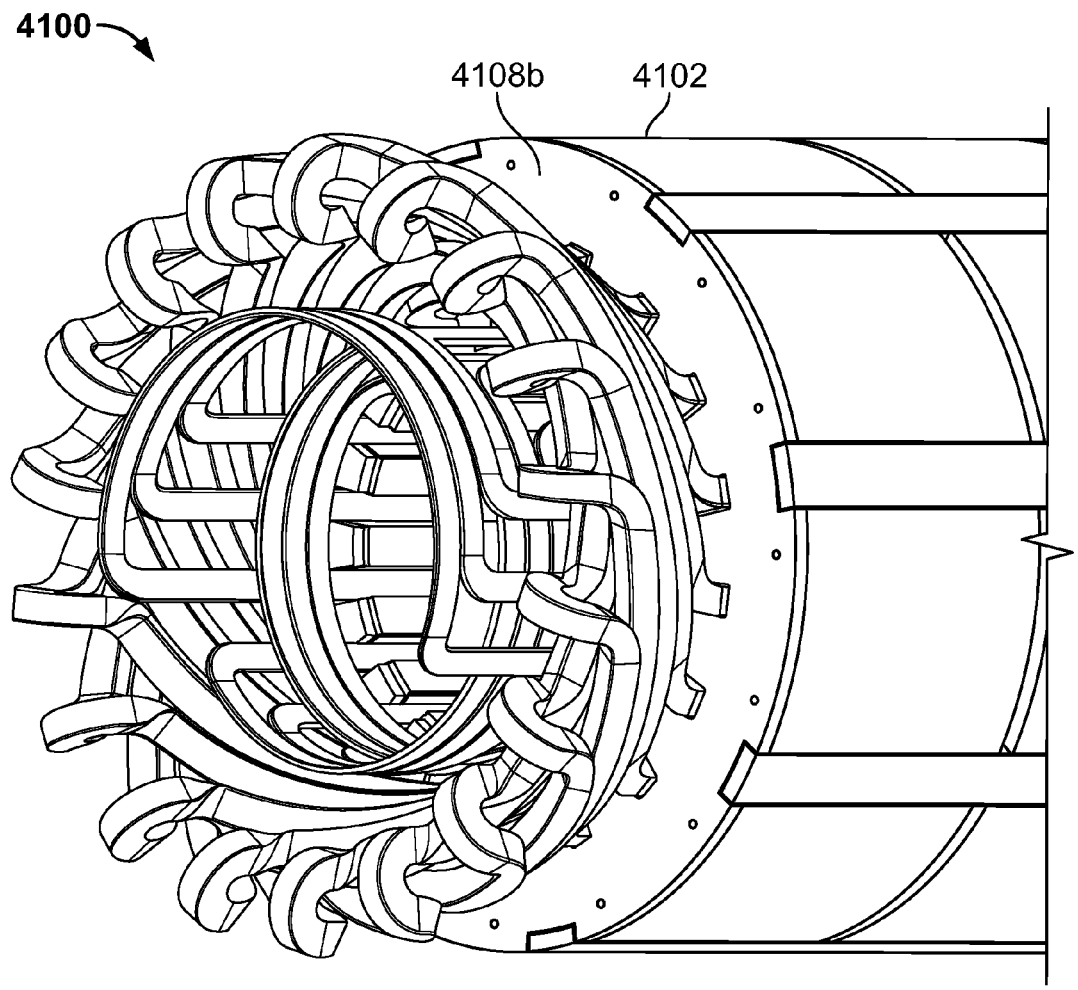

An end turn bundle that includes two groups of end turns interleaved to form four layers of end turns can include formed windings, cable windings, or a combination thereof. FIGS. 4F, 4G, 4H, 4I, 4J, 4K, 4L, 4M, 4N, and 4O illustrate aspects of an example of a formed end turn bundle that includes two groups of formed end turns interleaved to form four layers of formed end turns. Each of the illustrated end turns of FIGS. 4F, 4G, 4H, 4I, 4J, 4K, 4L, 4M, 4N, and 4O can be built using standard end turn-forming equipment. However, some un-illustrated implementations may require non-standard end-turn-forming processes. FIGS. 4P, and 4Q illustrate an example of a cable end turn bundle that includes two groups of cable end turns interleaved to form four layers of cable end turns.

FIG. 4P is a schematic side view of an example end turn bundle 470 of a stator of an electric machine. The example end turn bundle 470 can be included in the stator 108 of electric machine 102. FIG. 4Q is a schematic perspective view of the example end turn bundle 470. FIG. 4EE is a schematic end view of the example end turn bundle 470. FIG. 4FF is a schematic end view of two end turns of the example end turn bundle 470. FIG. 4GG is a schematic end view of four end turns of the example end turn bundle 470. FIG. 4HH is a schematic side view of two end turns of the example end turn bundle 470. FIG. 4II is a schematic cross-sectional view of the end turn bundle 470, viewed from near the axial center of an example stator toward the axial end of the example stator.

The illustrated example end turn bundle 470 includes cable windings. The coils of the cable windings include axial sections (not illustrated in FIGS. 4P, 4Q, 4EE, 4FF, 4GG, 4HH, and 4II) that extend the axial length of a stator core. The coils of the cable windings include a plurality of end turns that form the end turn bundle 470 beyond the axial end the stator core. The end turn bundle 470 includes two groups of end turns that form four interleaved radial layers of end turns. The first group of end turns includes end turns 4001a, 4001c, and 4001e. The second group of end turns includes end turns 4001b and 4001d. Each group forms two of the four layers. The first group forms a first (outermost) layer of end turns and a third layer of end turns. The second group forms a fourth (innermost) layer of end turns and a second layer of end turns. One layer in each group is radially between the two layers of the other group. In particular, the second layer is radially between the first and third layers, and the third layer is radially between the second and fourth layers.

As shown in FIGS. 4FF, 4GG, and 4II, the two groups of end turns in the example end turn bundle 470 form only two radial layers at an axial section of the end turn bundle closest to the stator. In particular, all of the end turns in the end turn bundle 470 exit the end face of the core at a first radius on the end face and reenter the core at a second radius on the end face. The first group of end turns (including 4001a, 4001c, and 4001e) exit the core through the end face of the core at an exit location on the first radius, turn toward the first radial layer, extend through the first radial layer, turn toward the third radial layer, extend through the third radial layer, and reenter the core through the end face at a reentry location on the second radius. In the example shown, before reentering the core, the first group end turns each curve radially inward from the third layer toward the second radius.

The second group of end turns (including 4001b and 4001d) exit the core through the end face at an exit location on the first radius, turn toward the second radial layer, extend through the second radial layer, turn toward the fourth radial layer, extend through the fourth radial layer, and reenter the core through the end face at a reentry location on the second radius. In the example shown, each end turn in the second group accommodates a neighboring coil in the first group. For example, as shown in FIG. 4GG, the end turn 4001d exits the end face on the first radius, turns radially outward, extends through the second layer of end turns, turn radially inward, extends through the fourth layer of end turns, turn radially inward to accommodate the end turn 4001e, and then turns radially outward to reenter the end face on the second radius.

FIGS. 4R and 4S show partial schematic end views of example cores 400 of a stator for an electric machine. The example cores 400 can be the core of the stator 108 of electric machine 102. The example cores 400 include slots 404 having different shapes according to some implementations of the electric machine. Although the slots 404 are shown as including an even number of coils 414, an odd number of coils 414 may be used. In some implementations, the shape of the slots 404 may carry a winding that includes coils in a lap winding configuration and coil in a concentric winding configuration, although the slots shapes may be used in other types of windings.

As shown in FIG. 4R, each slot 404 includes a first slot region 421 holding coils 414 and a second slot region 419 holding coils 414. The first slot region 421 is defined by two non-parallel opposing slot side portions 415c and 415d. The second slot region 419 is defined by two parallel opposing slot side portions 415a and 415b. The slot side portions 415a and 415c form part of one side of the slot. The slot side portions 415b and 415d form part of another side of the slot. The slot side portions 415a and 415c define a first angle at 417a, and the slot side portions 415b and 415d define a second angle at 417b. The first angle and the second angle are different angles, as shown in FIG. 4R. For example, the first angle at 417a is an obtuse angle less than 180 degrees, and the second angle at 417b is 180 degrees. Other angles may also be used.

FIG. 4T shows a partial schematic end view of an example core 400 of a stator for an electric machine in which the slots 404 include an odd number of coils 414. In the example shown, the coils 414 include coils 414A, 414B, and 414C. Although the coils 414A and 414B are shown as including an even number of coils, the coils 414A and 414B may include an odd number of coils. Further, the coils 414A may be a left-hand coil side of lap coils, and the coils 414B may be a right-hand coil side of lap windings. The coils 414C are the coils of concentric windings. Thus, by including the coils 414C in each slot 404, the number of total coils 414 contained in each slot 404 is made an odd number. By having an odd number of coils in each slot, the voltage of the associated electric machine may be changed at smaller incremental levels, providing better control of the electric machine output.

FIG. 4U shows another core 400 in which the coils 414 may be different sizes to provide better nesting or packing of the coils 414 within the slots 404. The coils 414A and the coils 414B may be of one size wire or cable, while the coils 414C may be at a different size, such as a smaller size. The different size coils provide for a more closely packed slot 404. Additionally, any of the coils 414A, 414B, or 414C may be produced by a single turn winding process but multiple cables may be wound in parallel. Further, a generally triangular or trapezoidal cross-section wedge 1000 may be included in one or more of the slots 404 to maintain the coils 414A and/or 414B in a packed state. Over time and operation of the electric machine, the coils may relax in the slots, which may have an adverse effect on machine performance. For example, if the coils become loose inside the slot, the coils may sag and/or shift in the slot. As a result, the coils may be subject to damage due to vibration and/or chafing. Accordingly, the wedges 1000 are included in the slot to maintain the coils 414A and/or 414B in a packed condition. According to some implementations, the wedges 1000 may apply a biasing force on the coils to maintain the coils in a packed state. For example, the wedge 1000 may have a longitudinal curvature, as shown in FIG. 4V In some implementations, the wedge 1000 becomes stressed when the wedge 1000 is inserted in a slot, and the stress results in the biasing force exerted on the coils in the slot. The biasing force applied by the wedge 1000 may hold the coils in a substantially fixed position, which may eliminate or reduce slack and/or sagging in the coils. For example, the wedge 1000 in the slot may hold the coils in place and prevent damage that could be caused by loose, sagging, and/or shifted coils.

In FIG. 4V, the example wedge 1000 is illustrated as having a C-cross-section. The wedge 1000 may be positioned in the slots 404 as shown in FIGS. 4U and 4Z with the open portion of the C-cross-section facing the radial center of the core 400. Alternately, the wedge 1000 may be inserted into the slots 404 so that the open portion of C-cross section faces away from the radial center of the core 400. The wedges may have other shapes. Planar strips 1002 may also be used.

In some implementations, for example when the wedge 1000 is positioned as shown in FIGS. 4U and 4Z with the open end of the wedge 1000 facing the center of the core 400, the cooling properties of the machine may be enhanced. Friction between the rotor and fluid surrounding the rotor (e.g., fluid in the machine gap between the rotor and the stator) can generate heat. To prevent overheating, cooling fluid (e.g. air or another type of fluid) may be directed through the machine gap between the rotor and the stator. The wedge 1000 can be configured to effectively increase the volume of the machine gap, as illustrated in FIGS. 4U and 4Z. For example, the wedge 1000 open to the center of the core 400 and the planar strip 1002 effectively lead to an increase in the volume of the machine gap. The increased volume in the machine gap may reduce demands on the machine's cooling system. For example, the increased volume may reduce the pressure drop along the machine gap, which may thus reduce the demands placed on the blower or pump that generates the flow of cooling fluid through the machine gap.

FIGS. 4AA-4DD show other example configurations of coils 414 and wedges 1000 in a stator 400 of an electric machine. FIG. 4AA shows a stator 400 that includes a first plurality of coils 414A in a lap winding configuration and a second plurality of coils 414B in concentric winding configuration. (The coils 414A in a lap winding configuration are unshaded in FIGS. 4AA-4DD, and the coils 414B in a concentric winding configuration are shaded in FIGS. 4AA-4DD.) The slots 404 of FIG. 4AA each have the same shape and carry the same number of conductors. In FIG. 4AA, each slot carries a concentric coil 414B having one turn, and each slot carries a wedge 1000. The concentric coils 414B shown in FIG. 4AA can be wired in a "1-1-1" concentric coil configuration of a two pole, three phase electric machine. The "1-1-1" concentric coil configuration is discussed further with respect to FIG. 4W.

FIG. 4BB shows a stator 400 that includes a first plurality of coils 414A in a lap winding configuration and a second plurality of coils 414B in a concentric winding configuration. The stator 400 of FIG. 4BB includes slots having different shapes. For example, the slots 404C and 404D have the same shape and each carry ten conductors, but the slot 404E has a different shape than the slots 404C and 404D and carries nine conductors. In FIG. 4BB, slots 404C and 404D each carry a concentric coil 414B having two turns, while slot 404E carries a concentric coil 414B having one turn. Also in FIG. 4BB, each of the slots includes a wedge 1000. The concentric coils 414B shown in FIG. 4AA can be wired in a "2-2-1" concentric coil configuration of a two pole, three phase electric machine.

FIG. 4CC shows a stator 400 that includes a first plurality of coils 414A in a lap winding configuration and a second plurality of coils 414B in a concentric winding configuration. The stator 400 of FIG. 4CC includes slots having different shapes. For example, the slots 404C and 404E have the same shape and each carry nine conductors, but the slot 404D has a different shape than the slots 404C and 404E and carries ten conductors. In FIG. 4CC, slots 404C and 404E each carry a concentric coil 414B having one turn, while slot 404D carries a concentric coil 414B having two turns. Also in FIG. 4CC, each of the slots includes a wedge 1000. The concentric coils 414B shown in FIG. 4CC can be wired in a "2-1-2/1-2-1" concentric coil configuration of a two pole, three phase electric machine.

FIG. 4DD shows a stator 400 that includes a first plurality of coils 414A in a lap winding configuration and a second plurality of coils 414B in a concentric winding configuration. The stator 400 of FIG. 4DD includes slots that all have the same shape, but do not all carry the same number of conductors. For example, the slots 404C and 404D each carry ten conductors, but the slot 404E carries nine conductors. In FIG. 4DD, slots 404C and 404D each carry a concentric coil 414B having two turns, while slot 404E carries a concentric coil 414B having one turn. Also in FIG. 4DD, each of the slots includes either a first wedge 1000A or a second wedge 1000B. The first wedge 1000A in the slots 414C and 414D is smaller to leave more space for the conductors in the slots 414C and 414D. The second wedge 1000B in the slot 414E is larger and leaves less space for the conductors in the slot 414E. The concentric coils 414B shown in FIG. 4DD can be wired in a "2-2-1" concentric coil configuration of a two pole, three phase electric machine.

FIG. 4JJ is a schematic cross-sectional view of an example core 400 for an electric machine. The core 400 defines multiple slots, and each slot carries conductive coils 414 and a wedge. Two different types of wedges are shown in FIG. 4JJ. A first type of wedge 1004 has a C-shaped cross-sectional profile. FIG. 4MM shows a perspective view of the example wedge 1004. A second type of wedge 1006 has an E-shaped cross-sectional profile. FIG. 4LL shows a perspective view of the example wedge 1006. Both of the wedges 1004 and 1006 define holes 1008 that allow fluid to flow radially from a first region of the slot to a second region of the slot. For example, in the slots that carry a C-shaped wedge 1004, the wedge 1004 defines a first region 1005 in the slot, and the coils 414 reside in a second region in the slot. The first region 1005 allows an axial flow of cooling fluid through the slot. The holes 1008 defined in the wedge 1004 allow fluid to flow from the first region 1005 to the second region in order to cool the coils 414. The holes 1008 also allow fluid to flow from the second region into the first region 1005, for example, after the fluid has contacted the coils 414. As another example, in the slots that carry an E-shaped wedge 1006, the wedge 1006 defines a first region 1009 in the slot, and the coils 414 reside in a second region in the slot. The first region 1009 allows axial flow of cooling fluid through the slot. The holes 1007 defined in the wedge 1006 allow fluid to flow from the first region 1009 to the second region in order to cool the coils 414. The holes 1007 also allow fluid to flow from the second region into the first region 1005, for example, after the fluid has contacted the coils 414.

Each wedge may define multiple holes along the axial length of the wedge, as shown in FIGS. 4LL and 4MM. The holes may be spaced at regular intervals, random intervals, or in another manner. A single wedge 1006 or 1004 may define holes of different sizes, shapes, or dimensions in order to control fluid flow to the coils 414. For example, larger holes may be defined in some locations on a wedge 1006 in order to promote a greater flow rate through the larger holes, and smaller holes may be defined in other locations on the wedge 1006 in order to limit a flow rate through the smaller holes. The size, shape, spacing, and other parameters of the holes in a wedge may be configured to improve cooling in a stator of an electrical machine and thereby improve efficiency of the electrical machine. Thus, in some cases, a wedge can be used as a flow control device within the stator. In FIGS. 4LL and 4MM, a single hole is defined at each of multiple locations along the axial length of the wedge. In some implementations, there may be multiple holes defined at each location along the axial length.

The wedges 1004 and 1006 may have a longitudinal curvature, as the wedge 1000 shown in FIG. 4V. As a result of the longitudinal curvature, the wedges 1004 and 1006 may exert a biasing force on the coils 414 that helps stabilize the coils 414 within a slot. For example, the biasing force exerted by a wedge may prevent sagging of the coils 414.

As seen in FIG. 4PP the wedges can be formed in two or more parts, such as a first part 1028 and a second part 1032, longitudinally separated by a shim or stack of shims 1030. When installed in the slot, the first part 1028 would reside adjacent the open end of the slot and the second part 1032 would reside adjacent the coils. Different thicknesses of the shim or shim stack 1030 can be selected to control the force exerted by the second part 1032 on the coils. For example, the first and second parts 1028, 1032 can be installed into a given slot, and one or more shims 1032, of the same and/or different thickness, added to increase the force exerted by the second part 1032 on the coils. In certain instances, different slots of the same electric machine may require different shims to achieve the same force exerted on the coils. The shim or shim stack 1030 can be installed after one or more of the first part 1028 or second part 1032 is installed in the slot to facilitate achieving the desired force without damaging the insulation or coating of the coils. Alternately, the shim or shim stack 1030 can be installed substantially simultaneously with installing the first and second parts 1028, 1032. The shims 1032 thus allow for an adjustable tight fit between the wedge, the coils and the slot without damaging the cables during wedge insertion. Although shown as solid, the first and/or second parts 1028, 1032 can each have a C-shaped cross-section or other cross-section providing an axial channel for fluid flow and holes for radial flow, as described above.

FIG. 4KK is a schematic cross-sectional view of an example core 400 for an electric machine. The core 400 in FIG. 4KK defines multiple slots, and each slot carries coils 414 and a wedge 1010. The C-shaped wedges 1010 each define holes 1012 that allow fluid to flow radially between regions of the slot.

FIG. 4NN is an is a schematic end view of an example core 400 having wedges 1014 similar to any of the configurations described above, and/or of another configuration, retained using retaining rings 1016. The wedge retaining rings 1016 encircle the central opening in the stator core 400 and are fixed (e.g., by bolt, screw and/or otherwise) to the end face of the core 400. Retaining rings 1016 can be provided at both ends of the stator core 400 to capture the wedges 1014 and prevent the wedges 1014 from moving axially along the stator core 400. The retaining rings 1016 have slots that receive and interlock with protrusions 1020 at the ends of each wedge 1014, preventing the wedges 1014 from moving radially. The retaining ring 1016 also press the wedges 1014 against the top of the stator slot. In instances, such as FIG. 4PP, where the wedges are formed in multiple parts and/or include one or more shims, the retaining ring 1016 can also retain the multiple wedge parts and shims. FIG. 4OO is a perspective view of an example C-shaped wedge 1014 better illustrating the protrusion 1020 and also having holes 1026. The C-shaped defines an axial passage 1024 through the wedge 1014. As seen in FIG. 4NN, the retaining rings 1016 can have apertures 1022 that align with the axial passage 1024 to allow flow of fluids through the retaining rings 1016.

FIG. 4QQ shows an slot liner 1034 for lining the interior of a stator slot in a stator core 400 of an electric machine. The slot liner 1034 is made of a flexible, tear and temperature resistant film, such as polyester, polyamide and/or other material. FIG. 4QQ shows the liner 1034 laid flat. When installed in a slot, as in FIG. 4RR, the liner 1034 extends from the slot at both ends of stator core 400, and can be folded onto the end faces of the stator core 400. The protruding ends of liner 1034 are clamped to the end faces of the stator core 400 with a retaining ring (as in FIG. NN) and/or with other clamps to retain the liner 1034 in position. FIG. 4RR shows single bar clamps 1036a, retained to the end face with fasteners 1038 (e.g., bold, screw and/or other fastener), that clamp a portion of two adjacent liners to the end of the stator core 400. FIG. 4SS shows U-shaped clamps 1036b, likewise retained to the end face with fasteners 1038. The clamps can be retained to the stator core 400 in other manners. The slot liners 1038 are installed prior to winding the coils into the slots to protect cables and the insulation on the cables during winding. In certain instances, the liners 1034 can be removed from the slots. In certain instances, the liners 1034 can remain in the slots while the remainder of the electric machine is assembled, and remain in the slots during operation of the electric machine. Because the slot liners 1034 are retained against the end faces of the stator core 400 the liners resist shifting during winding and subsequent operation of the machine, and prevent the cables from rubbing against the stator core. In instances where the liners 1034 will be removed, a multipart wedge and shim(s) (as in FIG. 4PP) can be used such that with the shim not installed, the coils are loose in the slot and the liner 1034 can more easily withdrawn from the slot. Thereafter, the shim would be installed to secure the coils in the slots.

FIG. 4W shows a windings schematic according to some implementations. The windings scheme shown in FIG. 4W utilizes both concentric coils and lap coils in a single stator. The schematic illustrates windings of a two pole, three phase electric machine. The letter group A, A', a, and a' represent the first phase winding. The letter group B, B', b, and b' represent the second phase winding. The letter group C, C', c, and c' represent the third phase winding. The three coils represented by A and A' are the lapped portion of the first phase winding. The three coils a and a' represent the concentric portion of the first phase winding. The solid and dashed lines represent the end turn connections for the first phase winding. Each line may represent a single or multiple turns. The end turn connections for the second and third phase are not shown, but the same connection configuration for the first phase may also be used for the second and third phases.

FIG. 4W shows an example of a "1-1-1" concentric coil configuration. In the "1-1-1" concentric coil configuration shown, each of the three coils of the concentric portion of the first phase winding includes a single turn. As such, each slot of the stator in the "1-1-1" concentric coil configuration carries the same number of turns, namely one turn each. The concentric coils 414B shown in FIG. 4AA are in a "1-1-1" concentric coil configuration. More generally, an "n-n-n" concentric coil configuration carries "n" concentric coil turns in each slot. Example values of "n" can include 1, 2, 3, . . . 10, and higher values. Other types of concentric coil configurations are also possible. Other example concentric coil configurations include a "2n-n-2n/n-2n-n" concentric coil configuration (e.g., the "2-1-2/1-2-1" concentric coil configuration shown in FIG. 4CC, or another), a "2n-2n-n" concentric coil configuration (e.g., the "2-2-1" concentric coil configuration shown in FIG. 4DD, or another), and/or others. Example values of "n" can include 1, 2, 3, . . . 10, and higher values.

Two other example concentric coil configurations are shown in FIGS. 4X and 4Y. FIG. 4X shows an example of a "2-1-1" concentric coil configuration. In the "2-1-1" concentric coil configuration shown, the outermost coil of the concentric portion of the first phase winding includes a two turns, and each of the two inner coils of the concentric portion of the first phase winding include a single turn. As such, different slots of the stator in the "2-1-1" concentric coil configuration carry different numbers of turns. In particular, a first slot carries two turns of the concentric portion of the first phase winding, and a second and a third slot each carry only one turn of the concentric portion of the first phase winding. Other types of "2n-n-n" concentric coil configurations may also be used. Example values of "n" can include 1, 2, 3, . . . 10, and higher values.

FIG. 4Y shows an example of a "2-1-0" concentric coil configuration. In the "2-1-0" concentric coil configuration shown, the concentric coil configuration includes two concentric coils for each phase winding and three lap coils for each phase winding. The outer concentric coil includes a two turns, and the inner concentric coil includes one turn. As such, different slots of the stator in the "2-1-0" concentric coil configuration carry different numbers of turns. In particular, a first slot carries two turns of the concentric portion of the first phase winding, a second slot carries one turn of the concentric portion of the first phase winding, and a third slot carries no concentric coil turns. Other types of "2n-n-0" concentric coil configurations may also be used. Example values of "n" can include 1, 2, 3, . . . 10, and higher values.

FIGS. 4TT, 4UU, 4VV, 4WW, and 4XX show a solid model of an example stator 4100 of an electric machine that includes the windings represented in the diagram of FIG. 4W. The example stator 4100 can be used for the stator 108 of electric machine 102. FIGS. 4TT and 4VV are perspective views of a first end of the example stator 4100. FIG. 4UU is an end view of the example stator 4100, viewed from the first end of the stator. FIG. 4WW is a side view of a second end of the example stator 4100. FIG. 4XX is a perspective view of the second end of the example stator 4100. As shown in FIGS. 4TT, 4UU, 4VV, 4WW, and 4XX, the example stator includes an elongate stator core 4102 and three conductive windings carried by the core 4102. A first winding includes concentric-wound coils 4104a and lap-wound coils 4106a. A second winding includes concentric-wound coils 4104b and lap-wound coils 4106b. A third winding includes concentric-wound coils 4104c and lap-wound coils 4106c. The letter labels A, A', B, B', C, and C' for the lap-wound coils and the letter labels a, a', b, b', c, and c' for the concentric-wound coils are included to show correspondence with FIG. 4W. While the end turns of the coils are primarily visible in FIGS. 4TT, 4UU, 4VV, 4WW, and 4XX, the coils also include axial portions that extend between the end turns within the stator core 4102. As shown in FIG. 4UU, the elongate core 4102 is adapted to internally receive a rotor of an electric machine.

The coils in each winding are connected in series. Each coil may include multiple turns connected in series or in parallel. Each slot can carry an odd number of turns or an even number of turns. In some implementations, the slots in the stator 4102 do not all carry the same number of turns. In some implementations, the concentric-wound coils in a winding all have a first number of turns, and the lap-wound coils in the same winding all have a second number of turns, unequal to the first number of turns. Installing one or more of the coils may include forming a winding structure outside of the core 4102 and installing the formed winding structure in the core 4102. Installing one or more of the coils may include successively forming each of the individual coils in the core 4102.

The core 1402 includes a first end face 4108a shown in FIGS. 4TT and 4VV The core 1402 includes a second, opposing end face 4108b shown in FIGS. 4WW and 4XX. The coils 4104a, 4104b, 4104c, 4106a, 4106b, and 4108c each define a loop that extends axially through the elongate core 4102, exits the core 4102 through the end face 4108a at an exit location, and reenters the core through the end face 4108a at a reentry location. Each of the coils spans a distance on the end face between its exit location and its reentry location.

The lap-wound coils 4106a in the first winding each span a distance that is substantially equal to the distance spanned by each of the other lap-wound coils 4106a in the first winding, while the concentric-wound coils 4104a in the first winding each span a distance that is unequal to a distance spanned by any of the other concentric-wound coils 4104a in the first winding. Similarly, the lap-wound coils 4106b in the second winding each span a distance that is substantially equal to the distance spanned by each of the other lap-wound coils 4104b in the second winding, the concentric-wound coils 4104b in the second winding each span a distance that is unequal to the distance spanned by any of the other concentric-wound coils 4104b in the second winding, the lap-wound coils 4106c in the third winding each span a distance that is substantially equal to the distance spanned by each of the other lap-wound coils 4106c in the third winding, and the concentric-wound coils 4104c in the third winding each span a distance that is unequal to the distance spanned by any of the other concentric-wound coils 4104c in the third winding.

The distance on the end face spanned each coil can be an angular distance on the end face between the exit location of the coil and the reentry location of the coil. For example, when the end face of the core defines a circumference, the distance on the end face spanned by a coil can be an angle between the exit location of the coil and the reentry location of the coil with respect to the center point of the circumference. In the example, each coil defines a mid-point on the circumference between its exit location and its reentry location. For the concentric-wound coils 4104a, 4104b, and 4104c, the mid-point of each coil is substantially at the same angle on the circumference as the mid-point of each other concentric-wound coil in the same winding. For the lap-wound coils 4106a, 4106b, and 4106c, the mid-point of each coil is at a different angle on the circumference than the mid-point of any other lap-wound coil in the same winding.

The core 4102 includes teeth that extend radially toward an axial center of the core 4102. The teeth define radial slots between the teeth, and the coils are carried in the slots. Thus, the core defines an array of slots to carry the windings. Each coil resides in a pair of non-adjacent slots, and thus, each coil spans a number of slots between the non-adjacent slots in which the coil resides. Each of the lap-wound coils 4106*a* in the first winding spans a number of slots that is equal to the number of slots spanned by each of the other lap-wound coils 4106*a* in the first winding, while each of the concentric-wound coils 4104*a* in the first winding spans a number of slots that is unequal to the number of slots spanned by any of the other concentric-wound coils 4104*a* in the first winding. For example, each of the lap-wound coils 4106*a* spans eight slots, while the three concentric-wound coils 4104*a* span 6, 8, and 10 slots, respectively. Similarly, each of the lap-wound coils 4106*b* in the second winding spans a number of slots that is equal to the number of slots spanned by each of the other lap-wound coils 4106*b* in the second winding, each of the concentric-wound coils 4104*b* in the second winding spans a number of slots that is unequal to the number of slots spanned by any of the other concentric-wound coils 4104*b* in the second winding, each of the lap-wound coils 4106*c* in the third winding spans a number of slots that is equal to the number of slots spanned by each of the other lap-wound coils 4106*c* in the third winding, and each of the concentric-wound coils 4104*c* in the third winding spans a number of slots that is unequal to the number of slots spanned by any of the other concentric-wound coils 4104*c* in the third winding.

A number of implementations have been described. Nevertheless, it will be understood that various modifications may be made. Accordingly, other implementations are within the scope of the following claims.

What is claimed is:

1. A rotor for use in a fluid filled housing of an electric machine, the rotor comprising:
   an elongate cylindrical rotor core;
   a plurality of permanent magnets arranged around a circumference of the rotor core; and
   a covering around the permanent magnets adapted to seal the permanent magnets against contact with the fluid in the housing, the covering comprises:
      first and second end plates at opposing ends of the rotor core, a perimeter surface of the end plates being sealed with a sleeve;
      the sleeve comprising a fiber and polymer composite formed around a fiber and polymer composite hoop carried on each end plate; and
      on each end plate, a seal sealed to the composite hoop carried on the end plate.

2. The rotor of claim 1, wherein an innermost layer of the sleeve composite is a layer of axially oriented fibers.

3. The rotor of claim 1, wherein the rotor core is coated with one or more of nickel alloy, epoxy, polyetheretherketone, or ethylene chlorotrifluoroethylene copolymer.

4. A subsea electric machine system, comprising:
   a main housing adapted to contain a fluid at a pressure above an ambient pressure about the main housing;
   an electric machine in the main housing, the electric machine comprising
      a stator; and
      a rotor supported in the stator that, by interaction of magnetic fields between the stator and the rotor, at least one of moves relative to the stator or operates in generating electricity when moved relative to the stator, the rotor having:
         an elongate rotor core;
         a plurality of permanent magnets arranged around the rotor core; and
         a sleeve around the permanent magnets that provides primary radial support for retaining the permanent magnets to the rotor core during operation of the electric machine, the sleeve sealed to the rotor core to isolate the magnets from the fluid in the main housing;
         an end plate about an end of the rotor core, a perimeter surface of the end plate sealed with the sleeve, wherein the end plate comprises a seal sealed to a fiber and polymer composite hoop carried on the end plate, and the sleeve is formed around the composite hoop; and
   a companion device coupled to the rotor of the electric machine.

5. The electric machine system of claim 4, wherein the companion device comprises a pump.

6. The electric machine system of claim 4, wherein the companion device comprises a compressor.

7. The electric machine system of claim 6, wherein the compressor compresses the fluid contained in the main housing.

8. The electric machine system of claim 4, further comprising a stator housing around at least a portion of the stator and isolating the stator from the fluid in the main housing.

9. The electric machine system of claim 8, wherein the stator housing is sealed to an interior of the main housing.

10. The electric machine system of claim 8, wherein the stator housing comprises a non-conductive material in at least a portion proximate the permanent magnets of the rotor.

11. The electric machine system of claim 4, wherein the sleeve comprises a fiber and polymer composite and an innermost layer of the composite is a layer of axially oriented fibers.

12. The electric machine system of claim 4, further comprising an intermediate housing within the main housing, the intermediate housing removable from the main housing while carrying at least the stator and the rotor.

13. The electric machine system of claim 4, wherein at least a portion of the stator is treated for corrosive resistance with one or more of epoxy, polyetheretherketone, or ethylene chlorotrifluoroethylene copolymer.

14. An electric machine system, comprising:
   a main housing adapted to contain a fluid at a pressure above an ambient pressure about the main housing;
   an electric machine in the main housing, the electric machine comprising
      a stator;
      a stator housing around at least a portion of the stator and sealed to prevent contact of fluid in the main housing with the stator; and
      a rotor supported in the stator that, by interaction of magnetic fields between the stator and the rotor, at least one of moves relative to the stator or generates electricity when moved relative to the stator, the rotor having a plurality of permanent magnets arranged around a rotor core and a covering that is sealed to prevent fluid in the main housing from contacting the permanent magnets;
   wherein the covering includes:
      a sleeve that includes a fiber and polymer composite formed around a fiber and polymer composite hoop;
      a first and second end plates about opposing ends of the rotor core, a perimeter surface of the end plates sealed with the sleeve;

on each end plate, a seal on a circumferential surface of the end plate sealed to the fiber and polymer composite hoop; and a compressor coupled to the rotor of the electric machine.

15. The electric machine system of claim 14, wherein the stator housing is sealed to an interior of the main housing.

16. The electric machine system of claim 14, wherein the stator housing comprises a non-conductive material in at least a portion proximate the permanent magnets of the rotor.

* * * * *